United States Patent
Yano et al.

(10) Patent No.: US 7,089,572 B2
(45) Date of Patent: *Aug. 8, 2006

(54) ELECTRONIC APPARATUS

(75) Inventors: Kazuyoshi Yano, Tokyo (JP); Akifumi Nonaka, Kanagawa (JP); Masafumi Tamura, Kanagawa (JP); Masahide Nakazawa, Tokyo (JP)

(73) Assignee: Sony Corporation, Tokyo (JP)

( * ) Notice: Subject to any disclaimer, the term of this patent is extended or adjusted under 35 U.S.C. 154(b) by 149 days.

This patent is subject to a terminal disclaimer.

(21) Appl. No.: 10/858,796

(22) Filed: Jun. 2, 2004

(65) Prior Publication Data

US 2004/0218517 A1   Nov. 4, 2004

(51) Int. Cl.
*G11B 17/03*   (2006.01)
(52) U.S. Cl. ..................................... 720/655
(58) Field of Classification Search .................. None
See application file for complete search history.

(56) References Cited

U.S. PATENT DOCUMENTS 6,208,506 B1   3/2001   Pao

FOREIGN PATENT DOCUMENTS

| JP | 7-152458 | 6/1995 |
|---|---|---|
| JP | 7-160361 | 6/1995 |
| JP | 9-62398 | 3/1997 |
| JP | 2000-47801 | 2/2000 |
| JP | 2000-151140 | 5/2000 |
| JP | 2002-268567 | 9/2002 |
| JP | 2003-58280 | 2/2003 |

*Primary Examiner*—Allen Cao
(74) *Attorney, Agent, or Firm*—Finnegan, Henderson, Farabow, Garrett & Dunner, L.L.P.

(57) ABSTRACT

An electronic apparatus includes an apparatus main body, a lid body turnable with respect to the apparatus main body and having a display portion for displaying information, and a lid body turnably supporting mechanism for turnably supporting the lid body with respect to the apparatus main body. The lid body turnably supporting mechanism has a first turning shaft with its axial direction extending in parallel to a principal surface of the apparatus main body, and a second turning shaft provided at one end of the first turning shaft in such a manner as to be perpendicular to the principal surface of the apparatus main body. In this electronic apparatus, the second turning shaft of the lid body turnably supporting mechanism is located at one of corners of the apparatus main body or the lid body.

6 Claims, 38 Drawing Sheets

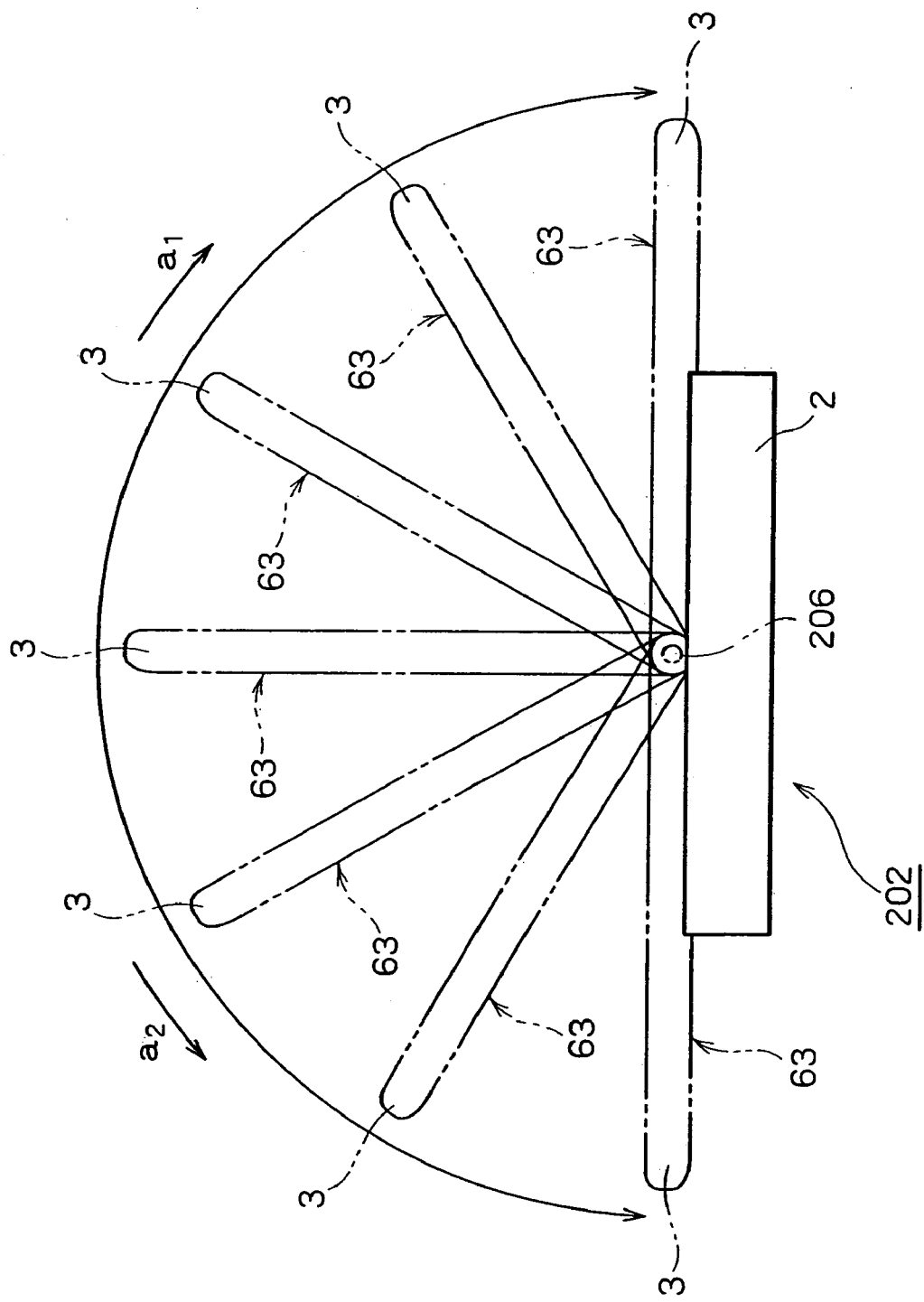

ELECTRONIC APPARATUS

BACKGROUND OF THE INVENTION

The present invention relates to an electronic apparatus including a display portion for displaying information, and particularly to an optical disc apparatus including a display portion for displaying information recorded and/or reproduced on or from an optical disc or a magneto-optical disc.

The present invention also relates to an electronic apparatus including a lid body, which is openable/closable with respect to an apparatus main body, and particularly, which has a display portion on its one surface.

Disc players of a type in which video information or music information is reproduced from a DVD (Digital Versatile Disc) representative of an optical disc are known.

A portable disc player of this type includes a player main body for reproducing information from an optical disc, and a lid body openable/closable with respect to the player main body and having a display portion for displaying the information reproduced by the player main body.

The player main body includes a disc rotating mechanism for rotating an optical disc, and a reproducing mechanism having an optical pickup for reproducing information from an optical disk. The disc rotating mechanism has a disc table on which an optical disc is to be mounted, and a spindle motor for rotating the disc table. The reproducing mechanism has the optical pickup for reproducing information from an optical disc and a feeding mechanism for moving the optical pickup in the radial direction of an optical disc.

The lid body is turnably supported, at its one side end portion, by the player main body via a lid body turnably supporting mechanism, and has a display portion provided on its surface opposed to a principal surface of the player main body. The lid body is supported in such a manner as to be closable in a closed state in which the lid body is closed with the display portion being in contact with the principal surface of the player main body and to be openable in an open state in which the display portion is opened with respect to the principal surface of the player main body. The lid body turnably supporting mechanism has a turning shaft for openably/closably supporting the one side end portion of the lid body, and a bearing portion provided on the player main body in such a manner as to support both ends of the turning shaft.

The disc player configured as described above is operated as follows. First, the lid body is opened with respect to the player main body. At this time, the lid body is turned via the turning shaft of the lid body turnably supporting mechanism, and the display portion of the lid body is directed outwardly. Next, an optical disc is rotated by the disc rotating mechanism of the player main body and information is reproduced from the optical disc by the optical pickup. The reproduced information is displayed on the display portion of the lid body.

As described above, in the related art display player, a space occupied by the disc player in the open state in which the lid body is opened with respect to the player main body with a display screen of the display portion directed outwardly becomes larger than a space occupied by the disc player in the closed state. As a result, when the disc player is used in a passenger room, for example, in a railroad vehicle or a passenger airplane, there arises an inconvenience that the disc player in the open state occupies a space on a placing surface of a tray provided for a passenger seat.

In the related art disc player of this type, since the open state in which the display portion is opened with respect to the player main body is bulky, it is difficult for a user to certainly hold the disc player in a state in which the display portion is directed outwardly. Accordingly, the disc player of this type causes a practical problem that it is difficult for a user who straphangs, for example, in a railroad vehicle to use the disc player in the state in which the display portion is directed outwardly while holding the player main body by the disengaged hand.

A disc player of a type in which a display screen of a display portion is previously directed outwardly is known. Such a disc player, however, has a problem that the display screen of the display portion is liable to be damaged during a period in which the disc player is carried by a user. Accordingly, the disc player of this type is required to include a cover member for covering the display screen of the display portion. In this case, there occurs an inconvenience that the mounting/dismounting of the cover member is laborious.

A portable type or on-vehicle type navigation device for displaying topographic features is known. In this navigation device, a lid body having a displaying portion is turnable with respect to a device main body in a state in which the display portion is directed outwardly. The navigation system of this type, however, has a problem that since the display portion of the lid body is usually directed outwardly, the display screen of the display portion is easy to be damaged.

A portable video camera device of a type in which a display portion is movable to be reversed with respect to a device main body via a display portion turnably supporting mechanism is known. The video camera device of this type, however, has a problem that since an approximately central portion of one side portion of the display portion turnably supported by the device main body is turned via a turning shaft, the display portion turnably supporting shaft must be enlarged, with a result that the thickness of the entire video camera device becomes large.

By the way, a related art disc player includes a lid body opening/closing detecting mechanism for detecting a turning position of a lid body with respect to a player main body, wherein a display portion of the lid body is lighted out when the lid body is closed with respect to the player main body.

In general, the lid body opening/closing detecting mechanism of the related art disc player has a projecting portion for detection, which projects outwardly from the lid body side or the apparatus main body, and a detecting switch for detecting a turning position of the lid body when the projecting portion for detection is depressed along with the opening/closing operation of the lid body with respect to the apparatus main body. The projecting portion for detection and the detecting switch are provided at opposed positions of the apparatus main body and the lid body closed with respect to the apparatus main body.

The disc player having the lid body opening/closing mechanism, however, has an inconvenience that since the projecting portion for detection projects outwardly from the principal surface of the lid body on which the display portion is provided or the principal surface of the apparatus main body, the external appearance of the entire apparatus is degraded.

A related art disc player including another lid body opening/closing detecting mechanism is known. This detecting mechanism has a projecting portion for detection, which projects from an outer peripheral portion of a turning shaft provided in the lid body. In the disc player of this type, however, since the turning shaft having, on its outer peripheral portion, the projecting portion for detection must be sufficiently smaller than a thickness of the lid body, the total thickness of the disc player is required to be relatively large.

Accordingly, in the above-described related art disc player, since the projecting portion for detection is provided on the outer peripheral portion of the turning shaft provided in the lid body, the thickness of the lid body becomes larger, with a result that it is difficult to thin the entire disc player.

A disc player shown in FIG. 1 is also known.

Referring to FIG. 1, there is shown a portable disc player 301 including a player main body 302 for reproducing information from an optical disc, and a lid body 303 openable/closable with respect to the player main body 302 and having a display portion 304 for displaying the information reproduced by the player main body 302.

While not shown, the player main body 302 includes a disc rotating mechanism for rotating an optical disc and a reproducing mechanism for reproducing information from an optical disc. While not shown, the disc rotating mechanism has a disc table on which an optical disc is to be mounted and a spindle motor for rotating the disc table. The reproducing mechanism has an optical pickup for reproducing information from an optical disc and a feeding mechanism for moving the optical pickup in the radial direction of an optical disc.

As shown in FIG. 1, the lid body 303 is turnably supported, at its approximately central portion of one side end portion, by the player main body 302 via a lid body turnably supporting mechanism 306. A display portion 304 is provided on a surface, opposed to a principal surface of the player main body 302, of the lid body 303. The lid body 303 is supported in such a manner as, to be closable in a closed state in which the display portion 304 is in contact with the principal surface of the player main body 302 and to be openable in an open state in which the display portion 304 is opened with respect to the principal surface of the player main body 302. The lid body turnably supporting mechanism 306 has a turning shaft 307 for openably/closably supporting the one side end portion of the lid body 303, and a bearing portion 308, provided on the player main body 302, for supporting the turning shaft 307.

The disc player 301 configured as described above is operated as follows. First, the lid body 303 is opened with respect to the player main body 302. At this time, the lid body 303 is turned via a turning shaft of the lid body turnably supporting mechanism 306, so that the display portion 304 of the lid body 303 is directed outwardly. Next, an optical disc is rotated by the disc rotating mechanism of the player main body 302, and information is reproduced from an optical disc by the optical pickup. The reproduced information is displayed on the display portion 304 of the lid body 303.

As shown in FIG. 1, the related art disc player 301 includes a locking mechanism 310 for holding the lid body 303 in a closed state in which the lid body 303 is closed with respect to the player main body 302. The locking mechanism 310 has a locking member 311 to be engaged with the lid body 303, an engagement recess 312 provided in the lid body 303, in which the locking member 311 is to be engaged, an operating member 313 for releasing the engagement state between the locking member 311 and the engagement recess 312 by the contact with the locking member 311, and a tensile coil spring (not shown) for biasing the operating member 313 in the direction where the operating member 313 is separated from the locking member 311. The locking member 311, which is typically made from a resin material, is provided in such a manner as to be projectable from the principal surface of the player main body 302. The engagement recess 312 is located at a position corresponding to that of the locking member 311 on the player main body 302 side. The operating member 313 is slidably provided on the player main body 302 at a position adjacent to the locking member 311, and is biased by a biasing force of the tensile coil spring in the direction where the operating member 313 is separated from the locking member 311. When the operating member 313 is slid against the biasing force of the tensile coil spring and is brought into contact with the locking member 311, to move the locking member 311 in the state being engaged in the engagement recess 312 into the player main body 302, thereby releasing the engagement state between the locking member 311 and the engagement recess 312.

In the above-described locking mechanism 310, when the lid body 303 is closed with respect to the player main body 302, the locking member 311 on the player main body 302 side is engaged in the engagement recess 312 of the lid body 303, to hold the closed state in which the lid body 303 is closed with respect the player main body 302. On the other hand, when the operating member 313 is slid, the engagement state between the locking member 311 of the locking mechanism 310 and the engagement recess 312 is released, to open the lid body 303 with respect to the player main body 302.

The above-described related art disc player 301, however, has the following problem. When an external force is applied to the lid body 303 closed with respect to the player main body 302, for example, by an impact caused by erroneous drop, the external force is directly applied to the bearing portion 308 of the lid body turnably supporting mechanism, and the locking member 311 engaged with the engagement recess 312 of the lid body 303, with a result that the locking member 311 made from a resin is easy to be broken.

The related art disc player 301 has another problem that in the case of providing the operating member 313 on the player main body 302 side, when the engagement state between the engagement recess 312 and the locking member 311 is released to open the lid body 303 with respect to the player main body 302, if the operation of the operating member 313 is stopped, the engagement state between the engagement recess 312 and the locking member 311 is returned, and consequently, it is required to slightly open the lid body 303 with respect to the player main body 302 while continuing the operation of the operating member 313 to release the engagement state. To solve such a problem, it may be considered to provide the operating member and the tensile coil spring on the lid body side; however, in this case, there arises an inconvenience that the thickness of the lid body becomes large.

The related art disc player 301 has a further problem that since it is difficult to catch the lid body 303 closed with respect to the player main body 302 by a finger after the engagement state between the engagement recess 312 and the locking member 311 is released, the operability in opening the lid body 303 with respect to the player main body 302 is degraded.

The related art disc player 301 has a further problem that in the case where the locking mechanism 310 has a mechanism (not shown) for allowing the locking member 311 to project from the principal surface of the player main body 302 by making use of a torsion coil spring or the like, such a mechanism can be easily operated by a user's finger, to allow undesirable projection of the locking member 311.

The related art disc player 301 has an additional problem. Since the locking member 311 on the player main body 302 side is engaged in the engagement recess 312 of the lid body 303 side when the lid body 303 is closed with respect to the player main body 302, if an accuracy of the assembly of the lid body 303 with the player main body 302 is poor, there may occur a positional deviation between the player main body 302 and the lid body 303 turned with respect to the player main body 302. If such a positional deviation occurs, then the locking member 311 cannot be certainly engaged in the engagement recess 312 and, more concretely, the engagement state between the engagement recess 312 and the locking member 311 cannot be released, with a result that the closed lid body 303 cannot be opened.

SUMMARY OF THE INVENTION

A first object of the present invention is to provide an electronic apparatus capable of miniaturizing the entire apparatus in a state in which a display portion is directed outwardly, and certainly protecting the displaying portion and reducing a size and thickness of the entire electronic apparatus.

A second object of the present invention is to provide an electronic apparatus capable of thinning a lid body, and improving a reliability in operation of detecting a turning position of the lid body with respect to an apparatus main body.

A third object of the present invention is to provide an electronic apparatus capable of certainly holding a lid body closed with respect to an apparatus main body and easily opening the closed lid body.

To achieve the above first object, according to a first aspect of the present invention, there is provided an electronic apparatus including: an apparatus main body; a lid body provided in such a manner as to be turnable with respect to the apparatus main body, the lid body having a display portion for displaying information; and a lid body turnably supporting mechanism for turnably supporting the lid body with respect to the apparatus main body, the lid body turnably supporting mechanism having a first turning shaft with its axial direction extending in parallel to a principal surface of the apparatus main body, and a second turning shaft provided at one end of the first turning shaft in such a manner as to be perpendicular to the principal surface of the apparatus main body; wherein the second turning shaft of the lid body turnably supporting mechanism is located at one of corners of the apparatus main body or the lid body.

With this configuration, the lid body is turned around the first and second turning shafts of the lid body turnably supporting mechanism, so that the lid body is turned with respect to the electronic apparatus. Since the lid body turnably supporting mechanism is configured such that the first turning shaft is provided in parallel to the principal surface of the apparatus main body and the second turning shaft is perpendicular to the principal surface of the apparatus main body and is located at a corner on the apparatus main body or lid body, it is possible to miniaturize the entire electronic apparatus.

To achieve the above first object, according to a second aspect of the present invention, there is provided an electronic apparatus including: an apparatus main body; a lid body turnably provided on the apparatus main body, the lid body having a display portion for displaying information; a lid body turnably supporting mechanism for turnably supporting the lid body with respect to the apparatus main body via a supporting shaft, the supporting shaft having a first turning shaft with its axial direction extending in parallel to a principal surface of the apparatus main body and a second turning shaft provided at one end of the first turning shaft in such a manner as to be perpendicular to the principal surface of the apparatus main body; and a connection wire for electrically connecting the apparatus main body to the display portion; wherein a hollow portion, in which the connection wire is inserted, is formed in the first and second turning shafts of the supporting shaft member.

With this configuration, the lid body is turned around the first and second turning shafts via the supporting shaft member of the lid body turnably supporting mechanism, so that the lid body is turned with respect to the apparatus main body. The connection wire is inserted in the hollow portion which is provided in such a manner as to be communicated to the first and second turning shafts of the supporting shaft member, so that the apparatus main body is electrically connected to the display portion of the lid body.

In the electronic apparatuses according to the first and second aspects of the present invention, it is possible to miniaturize the entire apparatus in a state in which a display portion is directed outwardly, and certainly protecting the displaying portion and reducing a size and thickness of the entire apparatus.

To achieve the above second object, according to a third aspect of the present invention, there is provided an electronic apparatus including: an apparatus main body; a lid body provided in such a manner as to be openable/closable with respect to the apparatus main body via a turning shaft, the lid body having a display portion for displaying information; a detecting portion provided at a portion of the turning shaft; and a detecting element for detecting an opening/closing position of the lid body with respect to the apparatus main body, the detecting element being located at a position facing, to the portion of the turning shaft in the apparatus main body or the lid body and operated by the detecting portion displaced along with turning of the turning shaft.

With this configuration, the turning shaft is turned by opening/closing the lid body with respect to the apparatus main body, and the detecting portion provided at one end of the turning shaft is displaced. In this electronic apparatus, the detecting element is operated by the displaced detecting portion, and a turning position of the lid body with respect to the apparatus main body is detected by the detecting element.

In the electronic apparatus according to the third aspect of the present invention, it is possible to thin a lid body, and to improve a reliability in operation of detecting a turning position of the lid body with respect to an apparatus main body.

To achieve the above third object, according to a fourth aspect of the present invention, there is provided an electronic apparatus including: an apparatus main body; a lid body provided in such a manner that one side end portion thereof is openably/closably supported by the apparatus main body via a lid body turnably supporting mechanism; and locking means for holding a closed state in which the lid body is closed with respect to the apparatus main body. The locking means includes: an engagement portion provided at the other side end portion, opposite to the lid body turnably supporting mechanism, of the lid body, wherein the engagement portion is to be engaged with the apparatus main body; a claw portion provided on a principal surface of the apparatus main body, wherein the claw portion is engaged with the engagement portion of the lid body when the lid body is closed with respect to the apparatus main body and is brought into contact with the principal surface of the apparatus main body; and a projecting portion provided in the vicinity of the claw portion of the apparatus main body in such a manner as to be projectable from the principal surface of the apparatus main body, wherein the projecting portion is depressed by the lid body when the lid body is closed with respect to the apparatus main body, to thereby engage the claw portion with the engagement portion, and the projecting portion projects when the engagement state between the claw portion and the engagement portion is released, to thereby bias the lid body in a direction where the lid body is opened with respect to the apparatus main body.

With this configuration, when the lid body is closed with respect to the apparatus main body, the lid body is brought into contact with the projecting portion of the locking means, so that the projecting portion engages the claw portion on the apparatus main body side with the engagement portion on the lid body side, whereby the closed state of the lid body is held. When the lid body is opened with respect to the apparatus main body, the engagement state between the claw portion and the engagement portion is released, and the lid body is opened with respect to the apparatus main body by the projecting portion of the locking member.

To achieve the third object, according to a fifth aspect of the present invention, there is provided an electronic apparatus including: an apparatus main body; a lid body provided in such a manner that one side end portion thereof is openably/closably supported by the apparatus main body via a lid body turnably supporting mechanism; and locking means for holding a closed state in which the lid body is closed with respect to the apparatus main body. The locking means includes: an engagement portion provided for the apparatus main body at a position facing to the other side end portion, opposite to the lid body turnably supporting mechanism, of the lid body, wherein the engagement portion is to be engaged with the lid body; a claw portion provided on a principal surface of the lid body, wherein the claw portion is engaged with the engagement portion of the apparatus main body when the lid body is closed with respect to the apparatus main body and the principal surface of the lid body is brought into contact with the apparatus main body; and a projecting portion provided in the vicinity of the claw portion of the lid body in such a manner as to be projectable from the principal surface of the lid body, wherein the projecting portion is depressed by the apparatus main body when the lid body is closed with respect to the apparatus main body, to thereby engage the claw portion with the engagement portion, and the projecting portion projects when the engagement state between the claw portion and the engagement portion is released, to thereby bias the apparatus main body in a direction where the lid body is opened with respect to the apparatus main body.

With this configuration, when the lid body is closed with respect to the apparatus main body, the apparatus main body is brought into contact with the projecting portion of the locking means, so that the projecting portion engages the claw portion on the lid body side with the engagement portion on the apparatus main body side, whereby the closed state of the lid body is held. When the lid body is opened with respect to the apparatus main body, the engagement state between the claw portion and the engagement portion is released, so that the lid body is opened with respect to the apparatus main body by the projecting portion of the locking means.

In the electronic apparatuses according to the fourth and fifth aspects of the present invention, it is possible to certainly hold a lid body closed with respect to an apparatus main body and easily open the closed lid body.

BRIEF DESCRIPTION OF THE DRAWINGS

These and other objects of the invention will be seen by reference to the description, taken in connection with the accompanying drawing, in which:

FIG. 41 is a front view showing a state in which the lid body is turned around the second turning shaft of another lid body turnably supporting mechanism shown in FIG. 36 with respect to the player main body and then turned around the first turning shaft of another lid body turnably supporting mechanism shown in FIG. 36 with respect to the player main body.

DETAILED DESCRIPTION OF THE PREFERRED EMBODIMENTS

Hereinafter, preferred embodiments, in each of which an electronic apparatus of the present invention is exemplified by a portable disc player, will be described with reference to the drawings. In this disc player, a DVD (Digital Versatile Disc), in which video or audio information has been recorded, is typically used as an optical disc.

Figure 1:
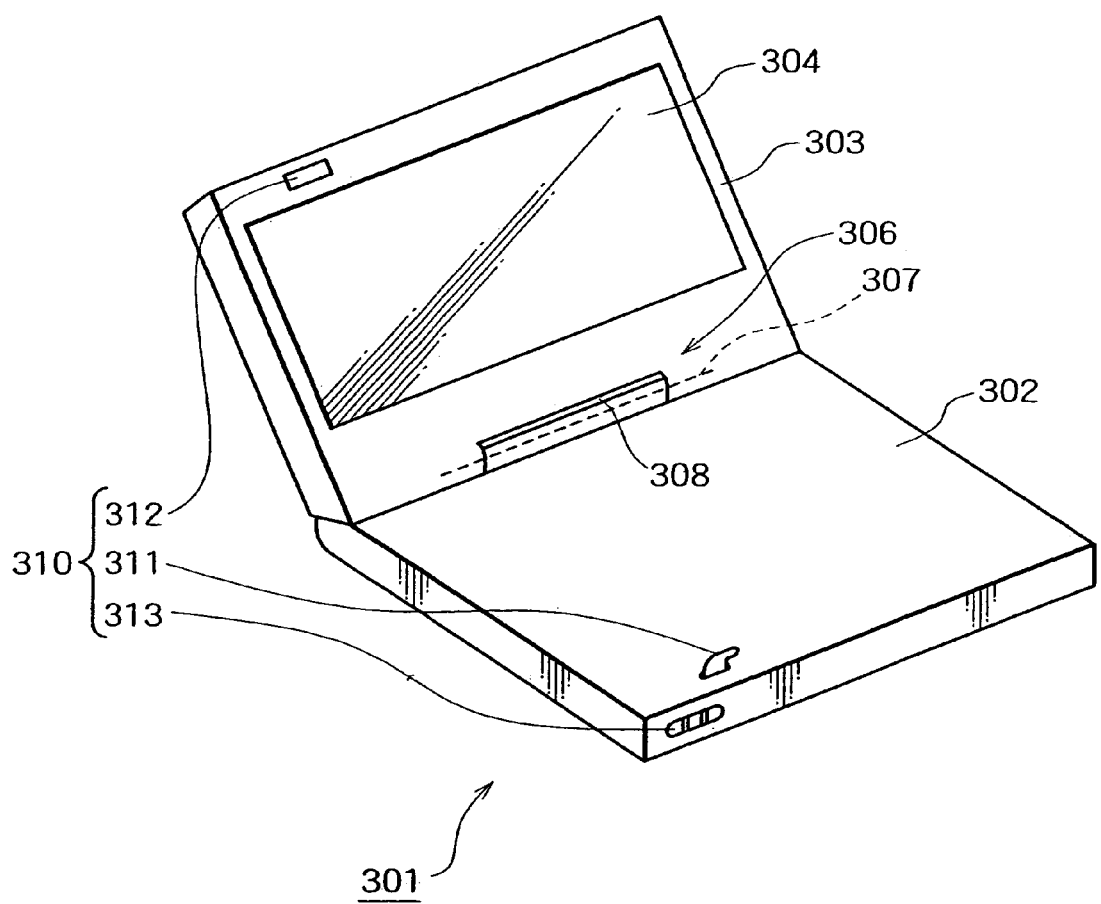
FIG. 1 is a perspective view illustrating a locking mechanism of a related art disc player.
Figure 2:
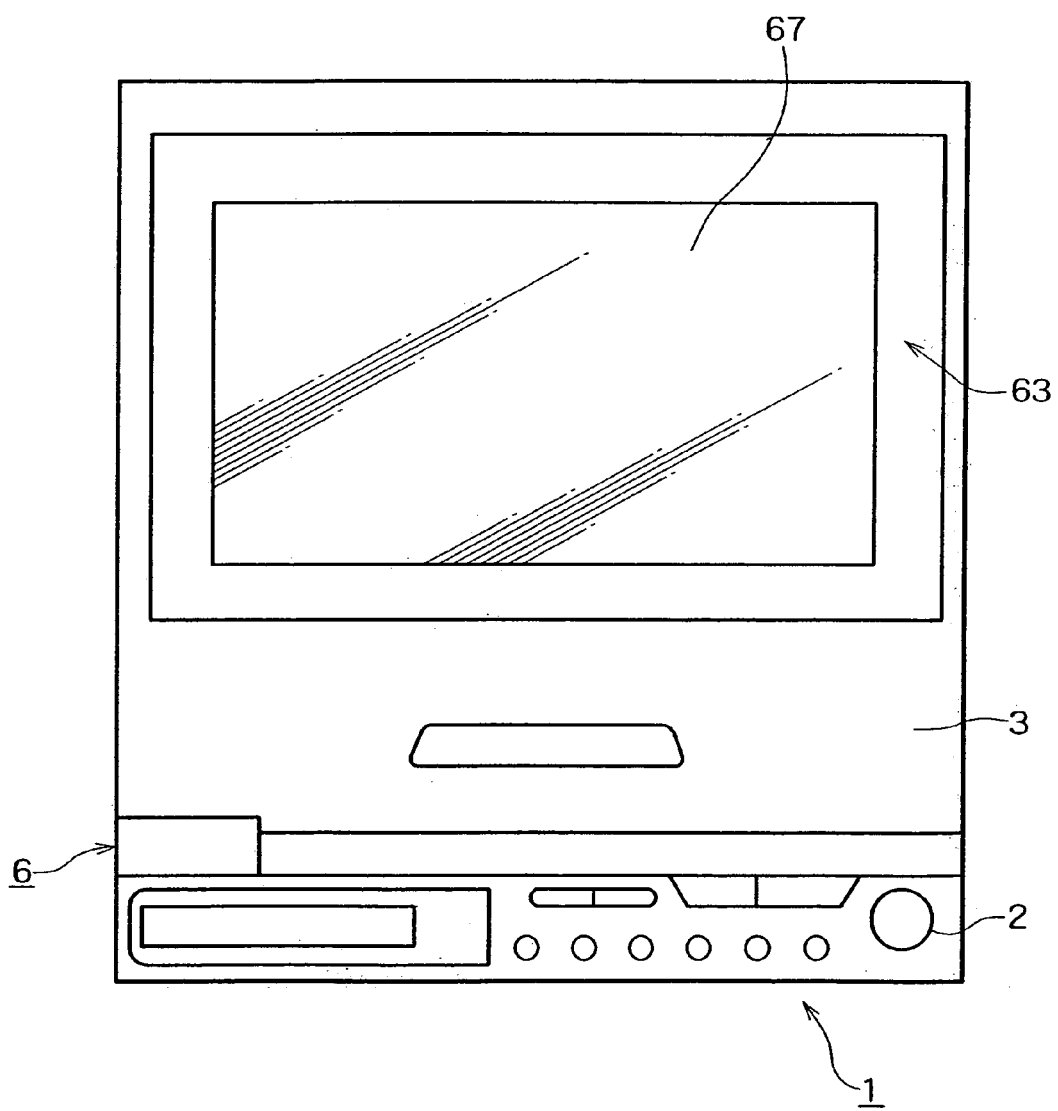
FIG. 2 is front view showing a disc player of the present invention.
Figure 3:
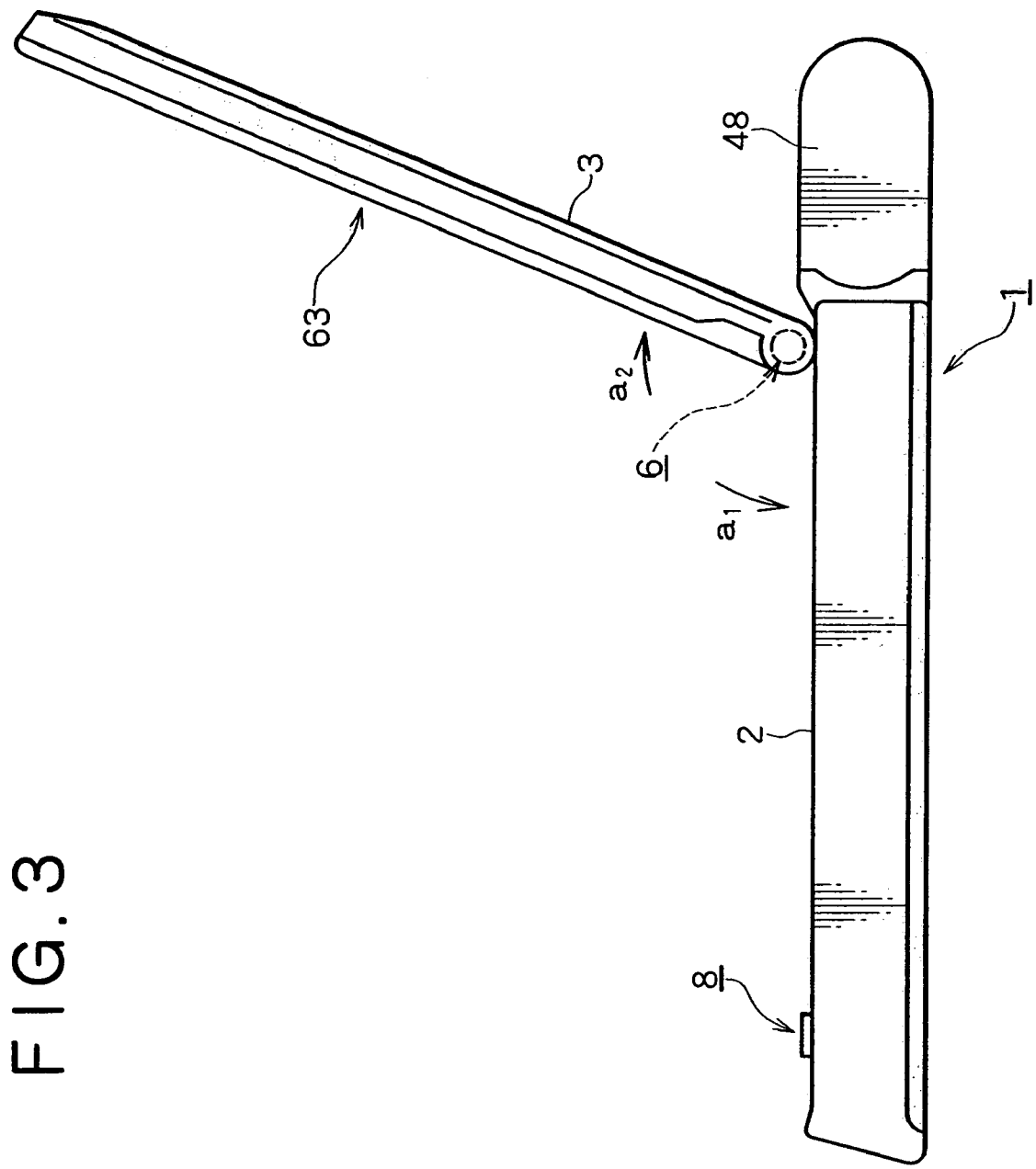
FIG. 3 is a side view of the disc player shown in FIG. 2.
Figure 5:
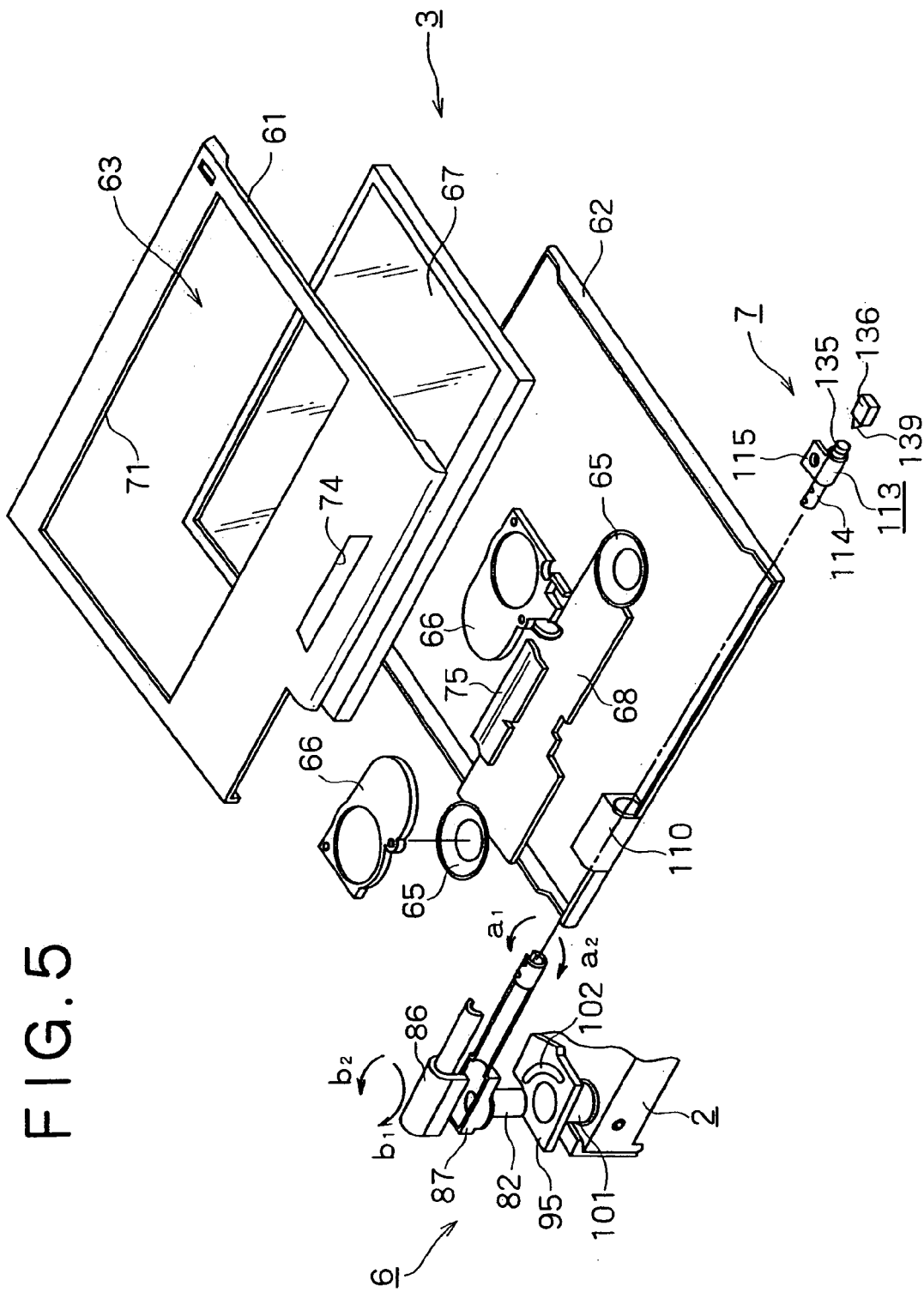
FIG. 5 is an exploded perspective view of a lid body of the disc player.

Referring to FIGS. 2, 3 and 5, a disc player 1 includes a player main body 2 for reproducing information from an optical disc 5, and a lid body 3 which is openable in a direction shown by arrow $a_2$ and closable in a direction shown by an arrow $a_1$ with respect to the player main body 2, and which is also turnable in a direction shown by an arrow $b_1$ and in a direction shown by an arrow $b_2$ with respect to the player main body 2.

Figure 4:
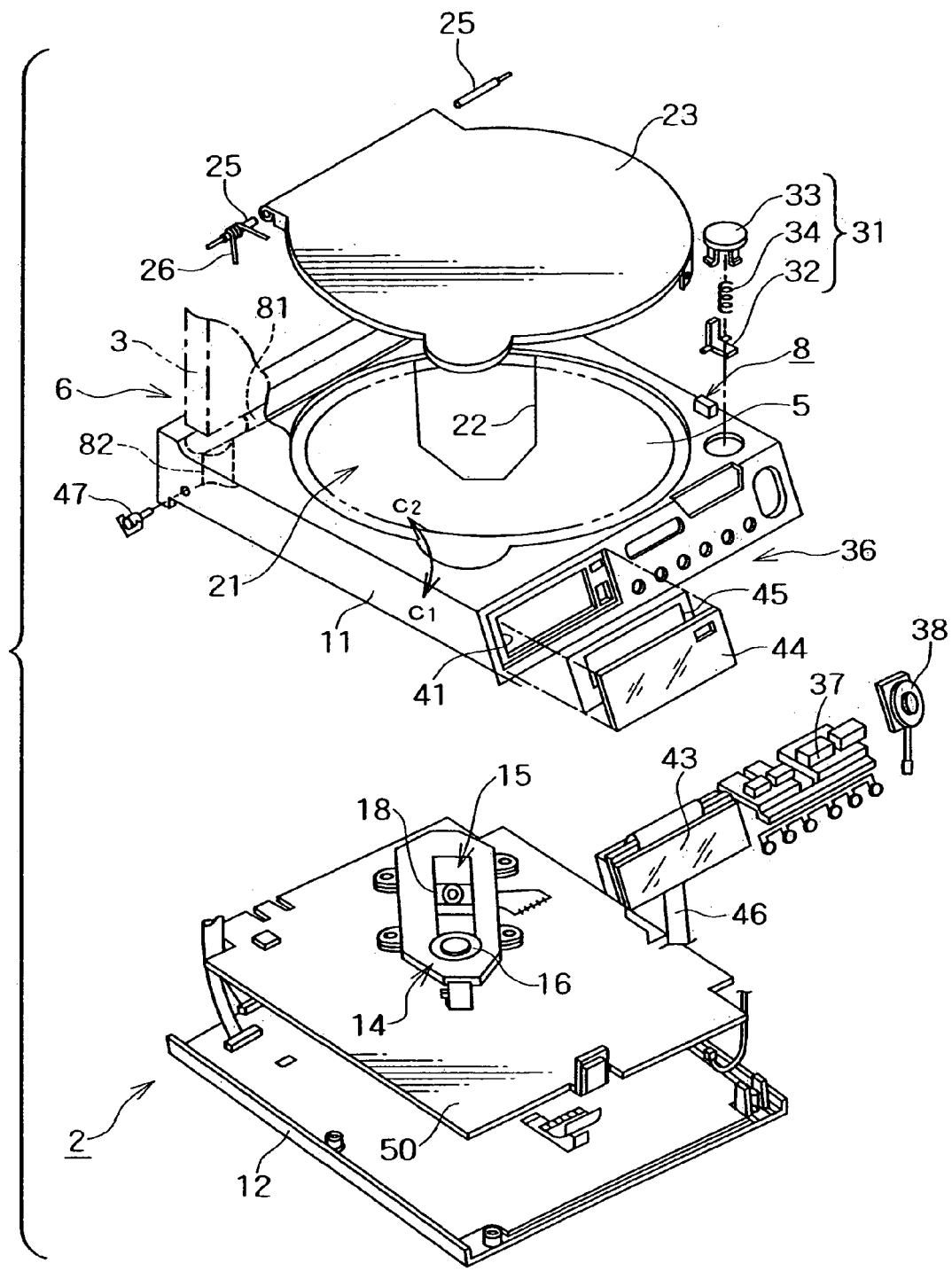
FIG. 4 is an exploded perspective view of a player main body of the disc player;.

Referring to FIGS. 4 and 5, the disc player 1 includes a lid body turnably supporting mechanism 6 for openably/turnably supporting the lid body 3 with respect to the player main body 2, a lid body opening/closing detecting mechanism 7 for detecting an opening position of the lid body 3 which is openable/closable with respect to the player main body 2, and a lid body locking mechanism 8 for restricting a opening motion of the lid body 3 which has been closed with respect to the player main body 2.

Referring to FIG. 4, there is shown the player main body 2 having a set of housing bodies 11 and 12 assembled with each other. Each of the housing bodies 11 and 12 has a principal surface formed into an approximately square shape. The player main body 2 also has a disc rotating mechanism 14 for rotating the optical disc 5, and a reproducing mechanism 15 for reproducing information from the optical disc 5.

Figure 6:
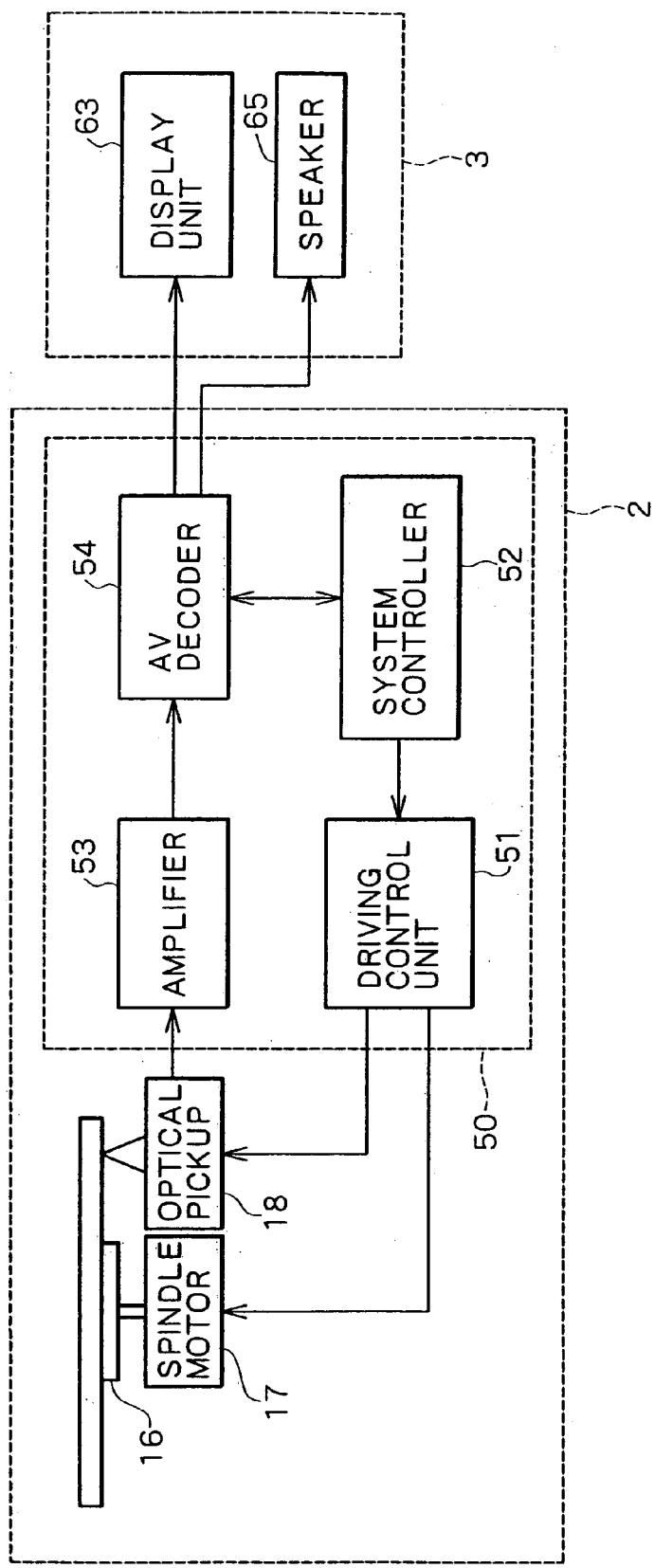
FIG. 6 is a diagram illustrating a signal processing for the player main body.

Referring to FIGS. 4 and 6, the disc rotating mechanism 14 has a disc table 16 on which the optical disc 5 is to be mounted, and a spindle motor 17 for rotating the disc table 16.

Referring to FIG. 4, the reproducing mechanism 15 has an optical pickup 18 for reproducing information from the optical disc 5, and a feeding mechanism (not shown) for moving the optical pickup 18 in a radial direction of the optical disc 5.

Referring to FIG. 4, the player main body 2 has a disc containing recess 21 formed into an approximately circular shape, in which the optical disc 5 is to contained. A bottom surface of the disc containing recess 21 has an opening portion 22 for reproducing, which allows the reproducing mechanism 15 to be moved in the radial direction of the optical disc 5. The optical pickup 18 is movably disposed in the opening portion 22 for reproducing. The disc table 16 of the disc rotating mechanism 14 is disposed at an approximately center of the bottom surface of the disc containing recess 21.

The player main body 2 has a containing lid 23 formed into an approximately circular shape. The containing lid 23 opens or closes the disc containing recess 21. The containing lid 23 has a size being large enough to close the disc containing recess 21. One end of an outer peripheral portion of the containing lid 23 is fixed on the player main body 2 via two containing lid turnably supporting shafts 25 in such a manner that the containing lid 23 is turnable in a direction shown by an arrow $c_1$ and a direction shown by an arrow $c_2$. A torsion coil spring 26 is mounted to one of the containing lid turnably supporting shafts 25. The containing lid 23 is biased in the direction where the containing lid 23 is opened with respect to the disc containing recess 21, by an elastic force of the torsion coil spring 26.

Referring to FIG. 4, a containing lid opening mechanism 31 for opening the containing lid 23 which has been closed with respect to the disc containing recess 21 is provided on the principal surface of the player main body 2 at a front side corner. The containing lid opening mechanism 31 has a locking member 32, a containing lid opening button 33, and a compression coil spring 34. The locking member 32 functions to be engaged with the containing lid 23 having been closed with respect to the disc containing recess 21, thereby holding the closed state of the containing lid 23. The containing lid opening button 33 functions to release the engagement state of the locking member 32 with the containing lid 23, thereby opening the containing lid 23. The compression coil spring 34 functions to return the containing lid opening button 33 to an initial position.

Referring to FIG. 4, an operating portion 36 is provided on a front surface of the player main body 2. A group of operating buttons 37 for operating the reproducing mechanism 15 and the like are assembled in the operating portion 36. A direction indicating button 38 for moving a cursor and the like on a menu displayed on a display portion (to be described later) assembled in the lid body 3 is also provided on the operating portion 36.

Referring to FIG. 4, the operating portion 36 also has an opening 41 in which a liquid crystal display board 43 for displaying an operational state of the optical disc 5 or the like is to be assembled. The liquid crystal display board 43 is assembled in the opening 41, and a transparent protective plate 44 for protecting a display plane of the liquid crystal display board 43 is joined to the liquid crystal display board 43 via an adhesive sheet 45. Referring to FIGS. 4 and 6, the liquid crystal display board 43 is electrically connected, via a connection wire 46 provided with a flexible circuit, to a drive control unit 51 for controlling the drive of the reproducing mechanism 15.

Referring to FIG. 4, a mounting pin 47 is provided on a side surface of the player main body 2 at an end portion on the bask side. A hand strap (not shown), which is used for carrying the disc player 1, is to be mounted to the mounting pin 47. A connection terminal (not shown) to which a battery pack 48 is removably connected is provided on a back surface of the player main body 2. The battery pack 48 is used for supplying a power to the disc player 1 as needed, for example, in the case of prolonging a service time of the disc player 1 being carried by a user.

Referring to FIGS. 4 and 6, the player main body 2 has a circuit board 50. The circuit board 50 includes the drive control unit 51 for controlling the drive of the spindle motor 17 of the disc rotating mechanism 14 and the optical pickup 18 of the reproducing mechanism 15, a system controller 52 for controlling the drive control unit 51, an amplifier 53 for amplifying a reproducing signal reproduced by the optical pick up 18, and an AV (Audio Visual) decoder 54 for decoding the reproducing signal outputted from the amplifier 53. The circuit board 50 outputs the reproducing signal thus decoded as a video signal and an audio signal to the liquid crystal board and speakers (to be described later) provided on the lid body 3, respectively.

The player main body 2 configured as described above is operated to reproduce information from the optical disc 5 as follows. The optical disc 5 mounted on the disc table 16 disposed in the disc containing recess 21 is rotated by the spindle motor 17 of the disc rotating mechanism 14. The optical pickup 18 of the reproducing mechanism 15 provided in the player main body 2 is moved in the radial direction of the rotating optical disc 5, to reproduce information from the optical disc 5.

Referring to FIG. 5, the lid body 3 has a set of housing bodies 61 and 52 assembled with each other. A principal surface of each of the housing bodies 61 and 62 is formed into an approximately square shape having a size being nearly equal to that of the principal surface of the player main body 2. Referring to FIGS. 2, 3, and 5, one side of an outer peripheral portion of the lid body 3 is supported by the lid body turnably supporting mechanism 6 in such a manner that the lid body 3 is openable in the direction $a_2$ and closable in the direction $a_1$ with respect to the player main body 2 and also turnable in the direction $b_1$ and the direction $b_2$ with respect to the player main body.

Referring to FIG. 5, a display portion 63 for displaying information such as video information reproduced by the reproducing mechanism 15 of the player main body 2 is provided on the principal surface of the lid body 3. A set of right and left speakers 65 for outputting information such as audio information reproduced by the reproducing mechanism 15 are disposed at positions adjacent to the display portion 63 via two mounting plates 66.

The display portion 63 has a liquid crystal display board 67, for example, a TFT (Thin Film Transistor) type liquid crystal display board. The liquid crystal display board 67 is electrically connected to the player main body 2 side via a circuit board 68 provided in the lid body 3. A display window 71 formed into an approximately square shape is formed in the principal surface of the lid body 3. The liquid crystal display board 67 is assembled in the display window 71 with its display plane directed outwardly. The speakers 65 are electrically connected to the player main body 2 side via a connection wire (not shown) provided with a flexible circuit. The principal surface of the lid body 3 also has an opening 74 through which an operating button 75 for adjusting a lightness or the like of the liquid crystal display board 67 is directed outwardly. The operating button 75 is assembled in the opening 74.

Figure 7:
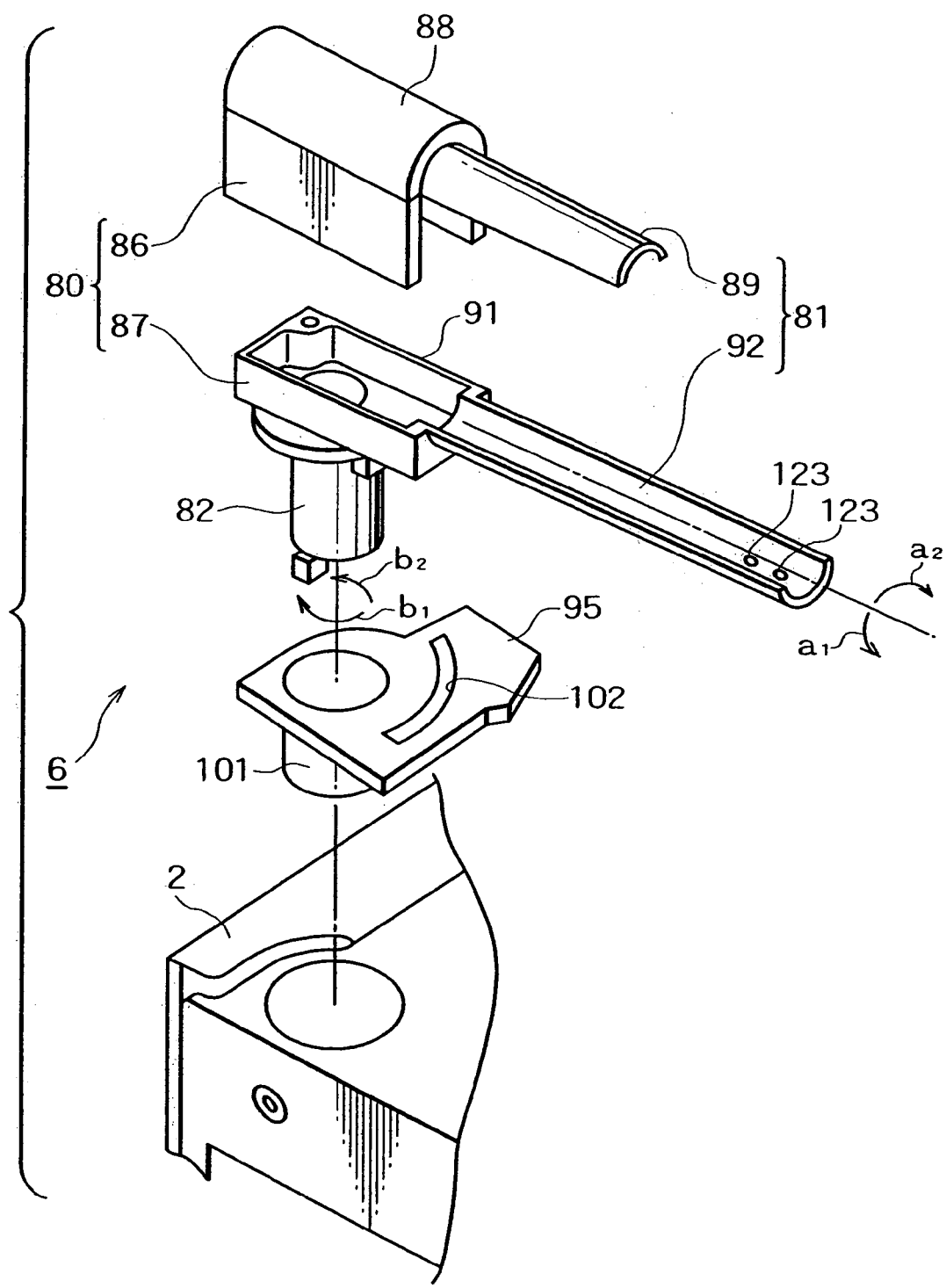
FIG. 7 is an exploded perspective view showing a lid body turnably supporting mechanism of the disc player.

Referring to FIG. 7, there is shown the lid body turnably supporting mechanism 6 having a supporting shaft member 80. The supporting shaft member 80 has a first turning shaft 81 for supporting the lid body 3 in such a manner as to allow the lid body 3 to be opened in the direction $a_2$ and closed in the direction $a_1$, and a second turning shaft 82 for supporting the lid body 3 in such a manner as to allow the lid body 3 to be turned in the direction $b_1$ and the direction $b_2$. An axial line of the second turning shaft 82 is perpendicular to an axial line of the first turning shaft 81. The supporting shaft member 80 is formed into an approximately L-shape as a whole in which the second turning shaft 82 is positioned at one end of the first turning shaft 81.

Each of the first turning shaft 81 and the second turning shaft 82 of the supporting shaft member 80 has a hollow structure. The hollow of the first turning shaft 81 is communicated to the hollow of the second turning shaft 82. Connection wires 84 for electrically connecting the player main body 2 to the liquid crystal display board 67, the speakers 65, and the like of the lid body 3, and connection terminals 85 provided for the connection wires 84 are inserted in the communicated hollow of the supporting shaft member 80.

Figure 8:
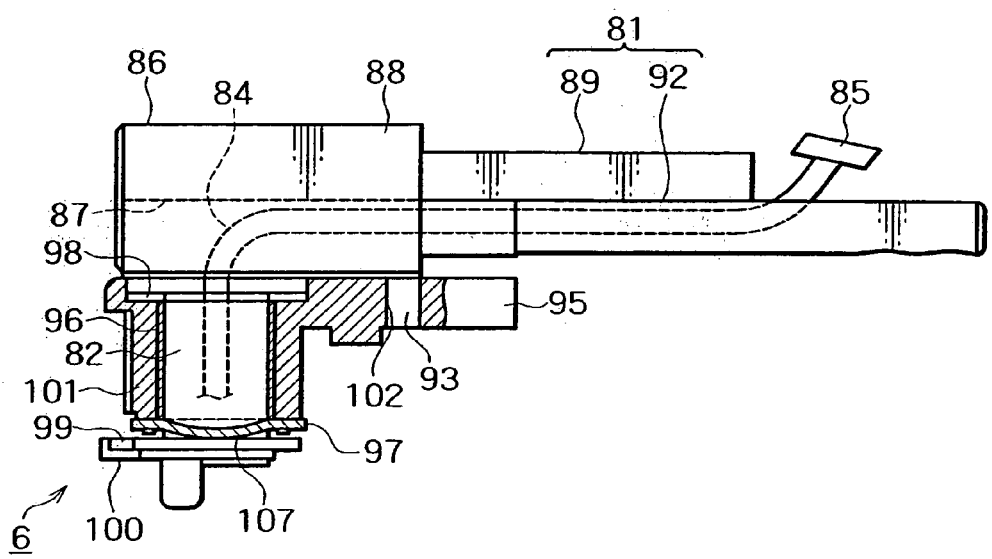
FIG. 8 is a vertical sectional view of the lid body turnably supporting mechanism.

Referring to FIGS. 7 and 8, to easily, certainly insert the connection wires 84 and the connection terminals 85 in the supporting shaft member 80, the first turning shaft 81 is divided, along a division line parallel to the axial direction of the first turning shaft 81, into an upper divided body 86 and a lower divided body 87.

The upper divided body 86 is made from a metal material such as zinc. As shown in FIGS. 7 and 8, the upper divided body 86 has a base end portion 88 to be fitted to the lower divided body 87, and an upper shaft portion 89 which forms the first turning shaft 81 when the upper divided body 86 is assembled with the lower divided body 87.

Figure 9:
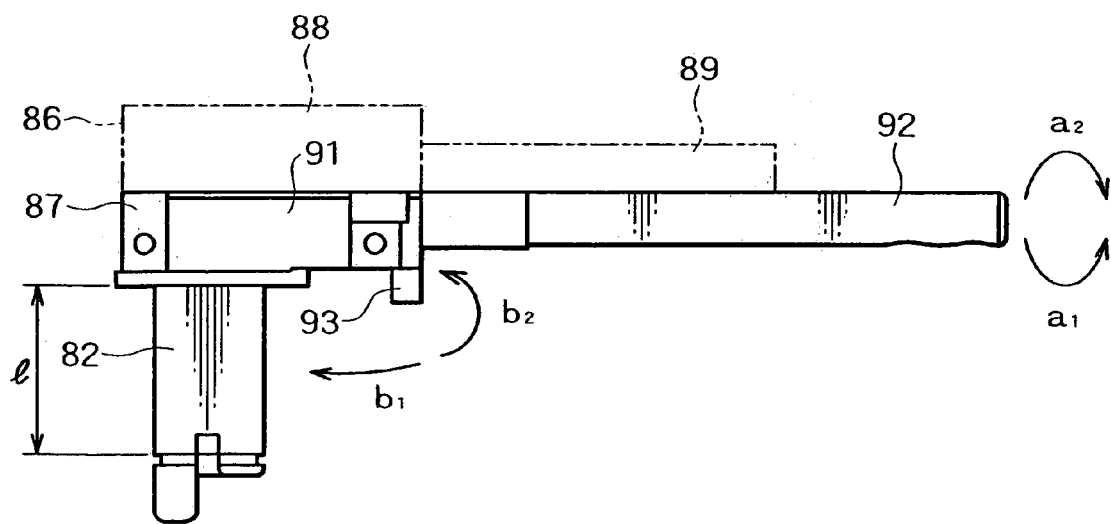
FIG. 9 is a side view of a supporting shaft member of the lid body turnably supporting mechanism.

The lower divided body 87 is made from a metal material such as a stainless steel. As shown in FIGS. 7, 8 and 9, the lower divided body 87 has a base end portion 91 to which the base end portion 88 of the upper divided body 86 is fitted, a lower shaft portion 92 which forms the first turning shaft 81 when assembled with the upper shaft portion 89 of the upper divided body 86, and the second tuning shaft 82 which is provided integrally with the base end portion 88 and which is supported by the player main body 2 in such a manner as to be turnable in the direction $b_1$ and the direction $b_2$.

Referring to FIGS. 8 and 9, a position restricting pin 93 for restricting a turning position of the second turning shaft 82 turned around its axis is provided integrally with the base end portion 91 of the lower divided body 87 at a position separated from a turning center of the second turning shaft 82.

An axial length l of the second turning shaft 82 of the lower divided body 87 is set depending on a desired resistance obtained at the time of turning operation of the second turning shaft 82 turned around its axis. A rigidity of the lower shaft portion 92 formed into a semi-cylindrical shape is set to a value sufficiently withstanding a stress caused by torsion of the first turning shaft 81 turned around its axis. With respect to arrangement of the supporting shaft member 80, the axial direction of the first turning shaft 81 extends in the direction parallel to the principal surface of the player main body 2, the axial direction of the second turning shaft 82 extends in the direction perpendicular to the principal surface of the player main body 2, and the second turning shaft 82 is located at one of corners on the rear surface side of the principal surface of the player main body 2.

Referring to FIGS. 7, 8 and 9, the lid body turnably supporting mechanism 6 includes a mounting plate 95 for supporting the supporting shaft member 80 in such a manner as to allow the supporting shaft member 80 to be turned in the direction $b_1$ and the direction $b_2$, a sleeve 96 provided around an outer peripheral portion of the second turning shaft 82 of the supporting shaft member 80, a flat spring 97 for giving a desired rotational resistance to the second turning shaft 82 at the time of turning operation of the second turning shaft 82 turned around its axis, (an upper fixing plate 98 and a lower fixing plate 99 for restricting an axial position of the second turning shaft 82 relative to the mounting plate 95, and a stop ring 100 for fixing one end of the second turning shaft 82.

Referring to FIGS. 7 and 8, the mounting plate 95 is made from a metal material such as zinc and is formed into an approximately flat-plate shape. A bearing portion 101 for turnably supporting the second turning shaft 882 is formed integrally with a principal surface, substantially parallel to the principal surface of the player main body 2, of the mounting plate 95. A circular-arc shaped guide slit 102, in which the position restricting pin 93 provided on the lower divided body 87 of the supporting shaft member 80 is movably engaged, is provided in the principal surface of the mounting plate 95 at a position separated from the bearing portion 101. To be more specific, the guide slit 102 is provided around the second turning shaft 82 in such a manner as to be located along a concentric circle centered at the second turning shaft 82.

Figure 10:
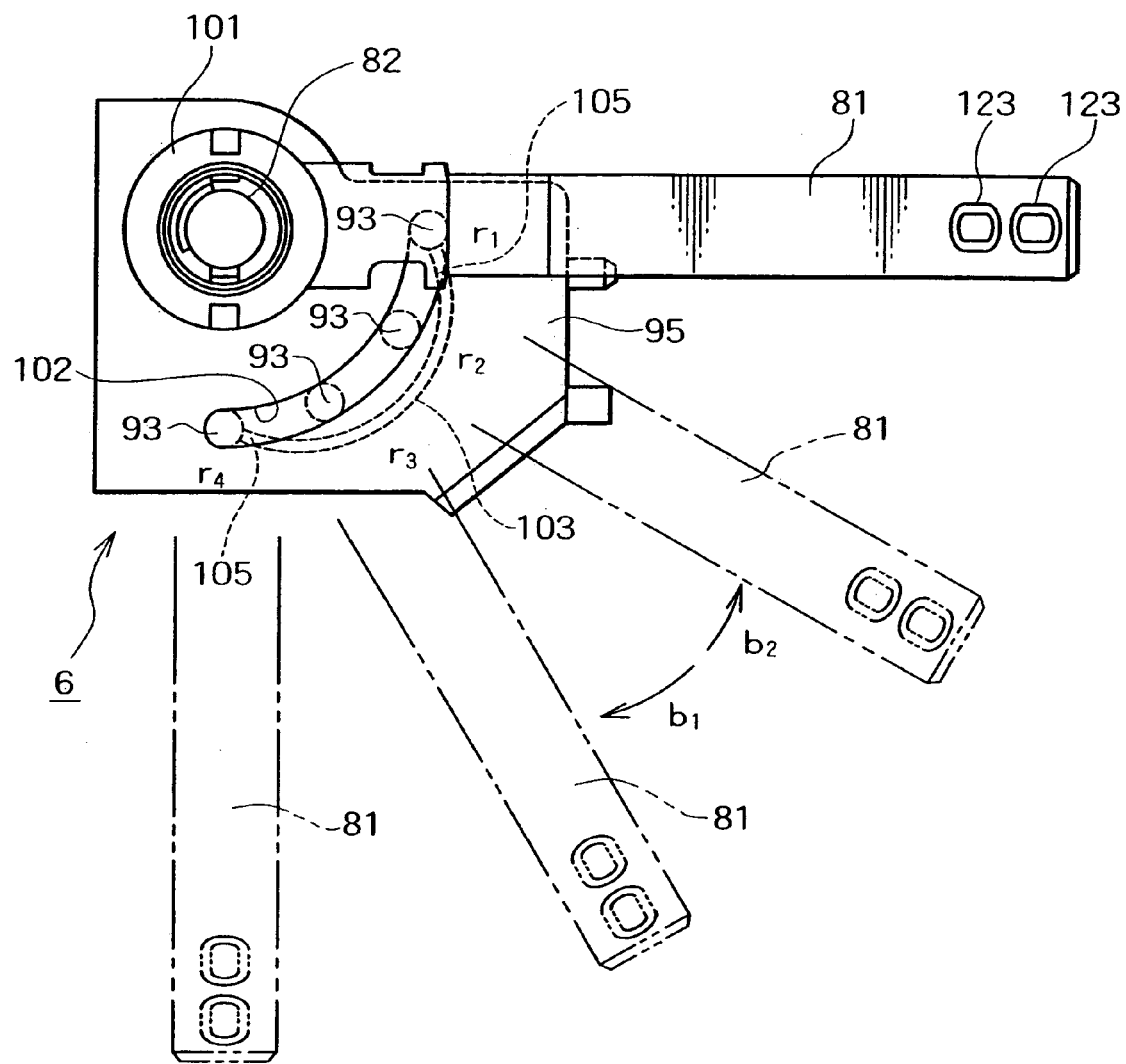
FIG. 10 is a plan view showing upper and lower fixing plates of the lid body turnably supporting mechanism.

Referring to FIG. 10, a circular-arc flat spring 103 for restricting a turning position of the second turning shaft 82 turned around its axis is provided for the guide slit 102. The flat spring 103 extends along the guide slit 102, and both ends of the flat spring 103 are located at both ends of the guide slit 102. To be more specific, two restricting claws 105 for restricting a position of the position restricting pin 93 moved along the guide slit 102 are formed at both end portions of the flat spring 103 in such a manner as to project in the guide slit 102.

Referring to FIG. 10, when the supporting shaft member 80 is turned around the axis of the second turning shaft 82 and thereby the position restricting pin 93 is moved to either of both the ends of the guide slit 102, since the position restricting pin 93 is biased by an elastic spring 103 via one of the restricting claws 105, the turning position of the position restricting pin 93 is held at either of turning positions $r_1$ and $r_2$ shown in FIG. 10.

It is to be noted that when a user turns the supporting shaft member 80 around the axis of the second turning shaft 82, since the position restricting pin 93 rides across either of the restricting claws 105 projecting the guide slit 102, the user has a feel of so-called "clicking".

When the position restricting pin 93 is located at either of turning positions $r_2$ and $r_3$ on its way of turning along the guide slit 102, the position restricting pin 93 is not biased by the elastic force of the flat spring 103; however, since a turning resistance due to a biasing force of the flat spring 97 provided on the second turning shaft 82 acts on the position restricting pin 93, the position restricting pin 93 can hold its stopped state at an arbitrary turning position along the guide slit 102.

Since the position restricting pin 93 is provided at a position separated from the turning center of the second turning shaft 82, the turning position of the second turning shaft 82 turned around its axis can be highly accurately positioned, to thereby improve the operation reliability.

The mounting plate 95 is fixed to a corner on the back side of the principal surface of the player main body 2 via a set screw (not shown). The sleeve 96 is made from a resin material such as polyacetal (POM) and formed into a cylindrical shape.

The flat spring 97 is made from a metal material such as stainless steel, and as shown in FIG. 8, the flat spring 97 is disposed on an outer peripheral portion of the second turning shaft 82. The flat spring 97 has at its central portion a sliding contact portion 107 swelled in the thickness direction. The sliding contact portion 107 is disposed in such a manner as to be in sliding-contact with the lower fixing plate 99. The flat spring 97 has a sliding resistance due to sliding-contact of the sliding-contact portion 107 with the lower fixing plate 99, to give a turning resistance to the second turning shaft 82 at the time of turning operation of the second turning shaft 82 turned around its axis.

Figure 11:
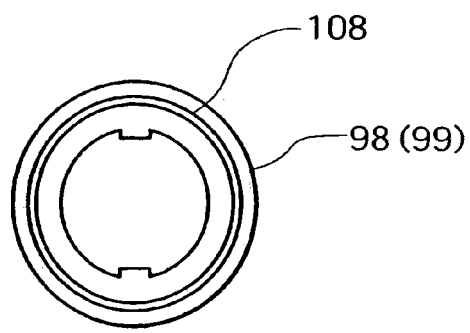
FIG. 11 is a plan view illustrating the lid body turnably supporting mechanism.

Each of the upper fixing plate 98 and the lower fixing plate 99 is made from a metal material such as a stainless steel and is formed into an annular shape. The upper and lower fixing plates 98 and 99 are located at both ends of the bearing portion 101 of the mounting plate 95. If a region, being in sliding-contact with the flat spring 97, of each of the upper and lower fixing plates 98 and 99 is large, the flat spring 97 may be brought into sliding-contact with an outer periphery or an inner periphery of each of the upper and lower fixing plates 98 and 99 by the effect of a variation in assembly of the lid body turnably supporting mechanism 6 and an accuracy of each of parts, resulting in a variation in torque. To cope with such an inconvenience, as shown in FIG. 11, in order to reduce a region, being in sliding-contact with the flat spring 97, of each of the upper and lower fixing plates 98 and 99, a sliding-contact projection 108 to be in sliding-contact with the sliding-contact portion 107 of the flat spring 97 is formed at a position, corresponding to the sliding-contact portion 107, of an inner peripheral portion of each of the upper and lower fixing plates 98 and 99. With this configuration, it is possible to equalize a torque of the second turning shaft 82 turned around its axis.

The stop ring 100 is made from a metal material such as a stainless steel. The stop ring 100 is engaged with an end portion of the second turning shaft 82, to prevent the second turning shaft 82 from being slipped off from the bearing portion 101.

By the way, in the lid body turnably supporting mechanism 6, assuming that a torque required for opening the lid body 3 in the direction $a_2$ or closing the lid body 3 in the direction $a_1$ with respect to the player main body 2 is set to 30 kgf·mm and a distance between the position restricting pin 93 and the turning center of the second turning shaft 82 is set to 13 mm, a force acting on the position restricting pin 93 in the rotational direction becomes 2.3 kgf (=30 kgf·mm/13 mm). Accordingly, in the lid body turnably supporting mechanism 6, a holding force of the flat spring 103 for biasing the position restricting pin 93 so as to restrict the turning of the lid body 3 in the direction $b_1$ may be desirable to be set to 2.3 kgf or more.

Figure 12A:
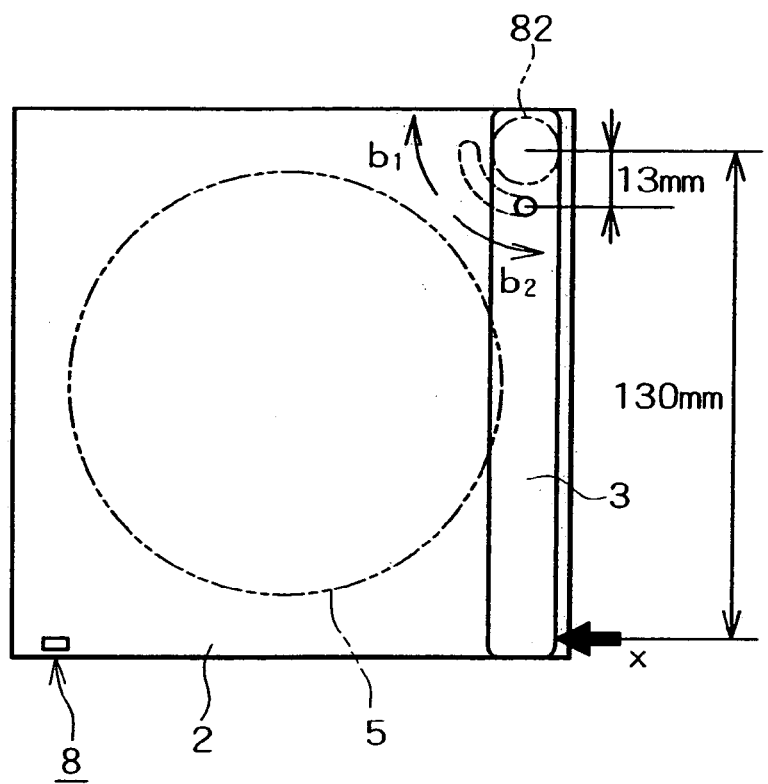
FIGS. 12A and 12B are a plan view and a side view illustrating a method of calculating a mechanism strength of the lid body turnably supporting mechanism, respectively.
Figure 12B:
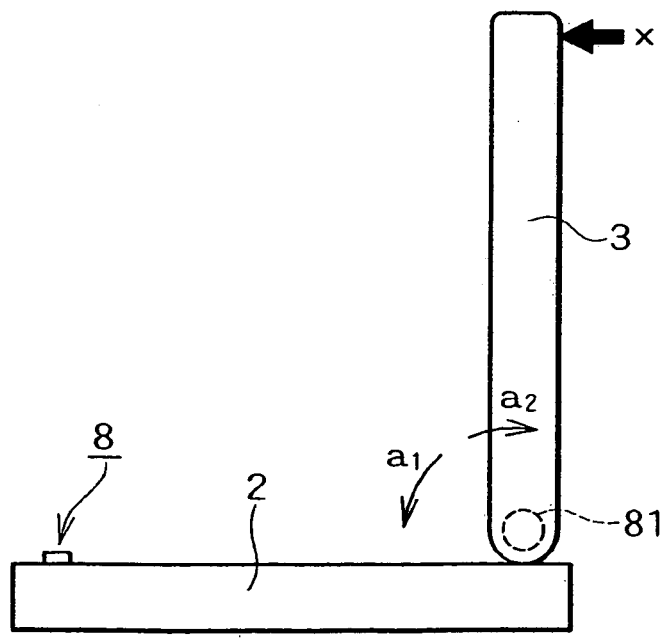

Since the biasing force of the flat spring 103 for biasing the position restricting pin 93 is set to 2.3 kgf or more, when a pressing force is applied to the player main body 2 in the direction shown by an arrow x as shown in FIGS. 12A and 12B, the lid body 3 operated to be closed with respect to the player main body 2 is prevented from being erroneously turned around the second turning shaft 82, that is, in the direction $b_1$ with respect to the player main body 2, and can be certainly closed in the direction $a_1$ with respect to the player main body 2.

The position restricting pin 93 functions as a stopper which is, at the time of turning operation of the lid body 3 around the second turning shaft 82, brought into contact with either of both the ends of the guide slit 102, to thereby restrict a turning position of the lid body 3. To realize such a function of the position restricting pin 93, a so-called QA (Quality Assurance) of the position restricting pin 93 for assuring a strength of the position restricting pin 93 in the rotational direction is 3 kgf, and therefore the strength of the position restricting pin 93 may be set to a value more than 3 kgf, for example, 5 kgf.

Assuming that a load applied to a portion, separated from the turning center of the second turning shaft 82 by a distance of 130 mm, of the lid body 3 is set to 5 kgf, a load applied to the position restricting pin 93 separated from the turning center of the second turning shaft 82 by a distance of 13 mm becomes 50 kgf (=130 mm×5 kgf÷13 mm).

The load of 50 kgf is applied to the position restricting pin 93 separated from the turning center of the second turning shaft 82 by the distance of 13 mm, and accordingly, assuming that a cross-sectional area of a shaft portion of the pin restricting pin 93 is 3.26 mm$^2$, a shear force applied to the position restricting pin 93 becomes 15.3 kgf/mm$^2$ (150 N/mm$^2$) (=50 kgf÷3.26 mm$^2$).

Accordingly, the position restricting pin 93 is required to be made from a material having a shear force of 150 N/mm$^2$ or more. Concretely, the position restricting pin 93 may be formed integrally with the lower divided body 87 of the supporting shaft member 80 by MIM (Metal Injection Molding) using a soft steel, for example, a stainless steel having a shear force of 275 N/mm$^2$.

A method of assembling the supporting shaft member 80 of the lid body turnably supporting mechanism 6 configured as described above will be briefly described with reference to the drawings.

Figure 13A:
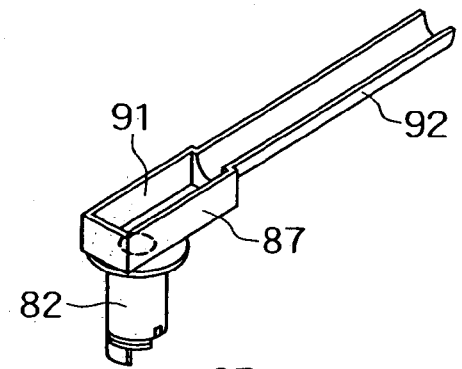
FIGS. 13A to 13D are perspective views illustrating a method of assembling the lid body turnably supporting mechanism.
Figure 13B:
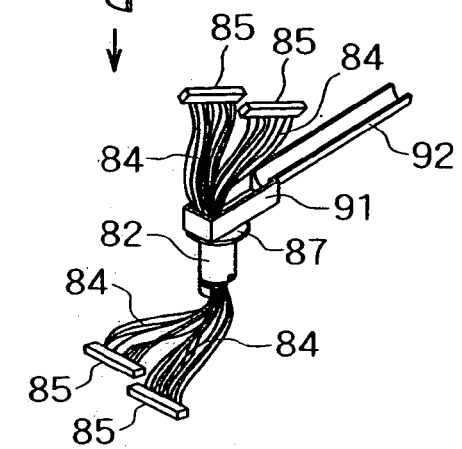
Figure 13C:
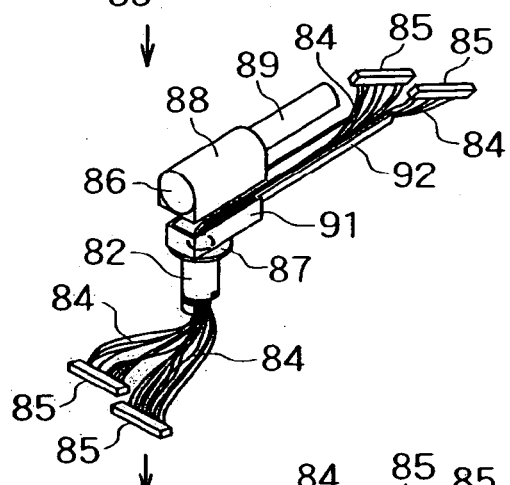

Referring first to FIGS. 13A and 13B, in the supporting shaft member 80, the connection wires 84 and the connection terminals 85 are inserted in an end portion of the second turning shaft 82 of the lower divided body 87 and are pulled out of the base end portion 91 of the lower divided body 87. The connection wires 84 and the connection terminals 85 thus pulled out of the base end portion 91 of the lower divided body 87 are, as shown in FIG. 13C, contained along the lower shaft portion 92 of the lower divided body 87.

Figure 13D:
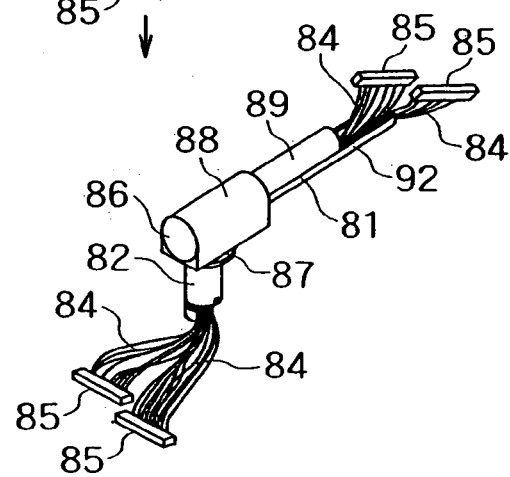

In the state that the connection wires 84 and the connection terminals 85 are pulled out of an end portion of the second turning shaft 82, as shown in FIG. 13D, the upper divided body 86 is fixedly assembled with the lower divided body 87. The supporting shaft member 80 thus contains the connection wires 84 and the connection terminals 85 inserted from the end portion of the first turning shaft 81 to the end portion of the second turning shaft 82.

As described above, since the supporting shaft member 80 is composed of the upper and lower divided bodies 86 and 87, the connection wires 84 and the connection terminals 85 can be easily, certainly inserted in the supporting shaft member 80. Also since the supporting shaft member 80 is composed of the upper and lower divided bodies 86 and 87, it is not required to insert the connection terminals 85 having a relatively large size in the hollow portion of the first turning shaft 81, but only required to insert the connection wires 84 having a relatively small size in the hollow portion of the first turning shaft 81. As a result, it is possible to reduce a diameter of the first turning shaft 81, and therefore, according to the supporting shaft member 80, it is possible to make the lid body 3 thin.

Figure 14A:
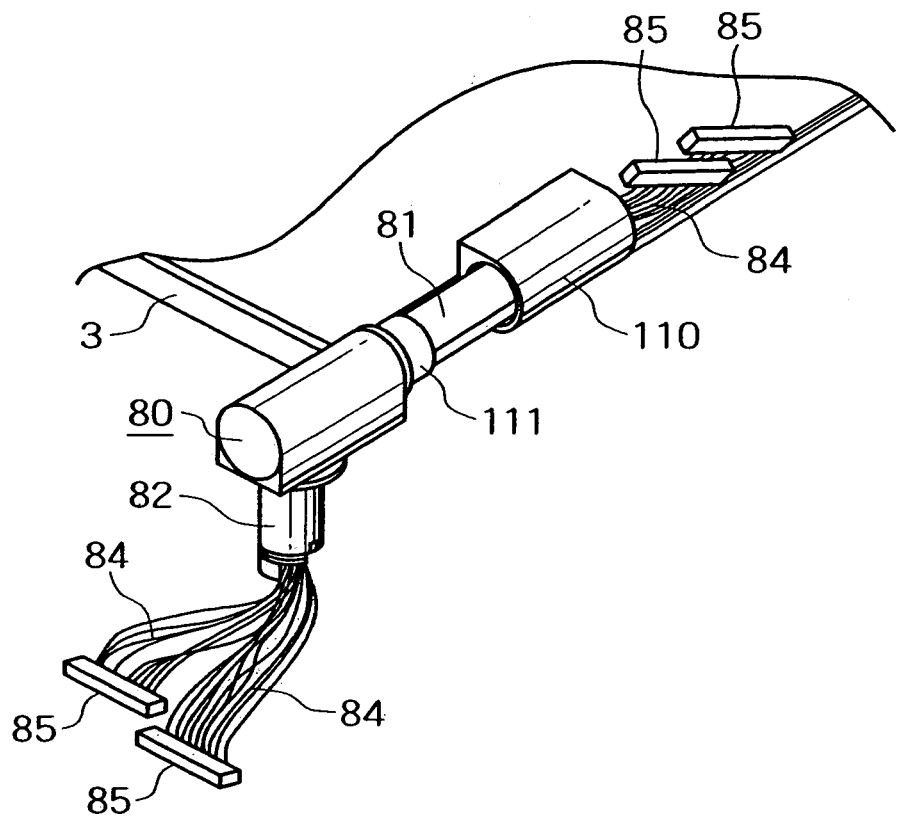
FIGS. 14A and 14B are perspective views showing a state in which the supporting shaft member of the lid body turnably supporting mechanism is mounted to the lid body.
Figure 14B:
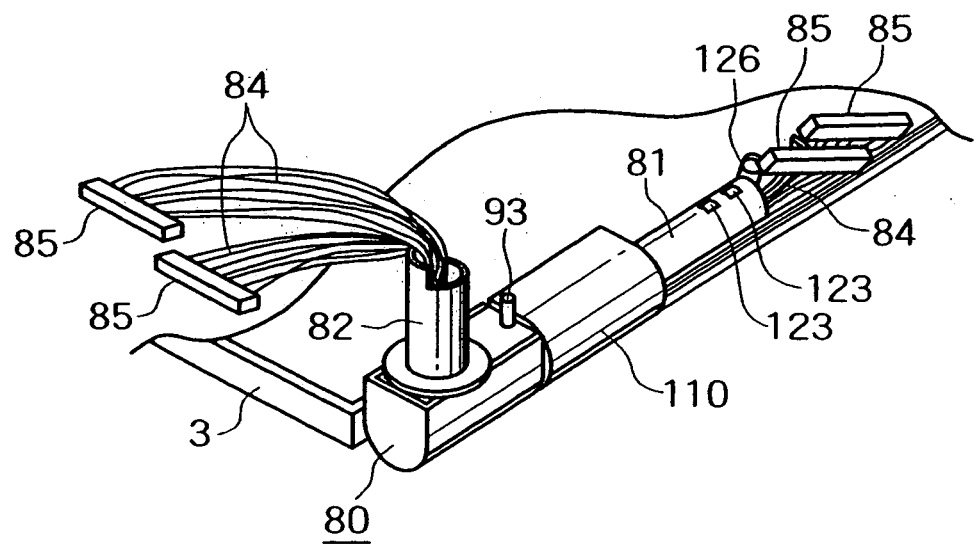

The player main body 2 to which the lid body turnably supporting mechanism 6 is mounted is provided with a fixing, portion (not shown) for fixing the mounting plate 95. As shown in FIGS. 5, 14A and 14B, a bearing portion 110 for turnably supporting the first turning shaft 81 of the supporting shaft member 80 is formed integrally with one side edge of the lid body 3. An inner diameter of the bearing portion 110 is set to be slightly larger than an outer diameter of the first turning shaft 81. Accordingly, the connection wires 84 and the connection terminals 85, which have been inserted in the first turning shaft 81, can be easily inserted in the bearing portion 110. As shown in FIGS. 14A and 14B, a resin made sleeve 111 is disposed around an outer peripheral portion of the first turning shaft 81, in which the connection wires 84 and the connection terminals 85 have been inserted, of the supporting shaft member 80. The first turning shaft 81 is inserted in the bearing portion 110 of the lid body 3 via the sleeve 111 and turnably supported by the bearing portion 110.

Figure 15A:
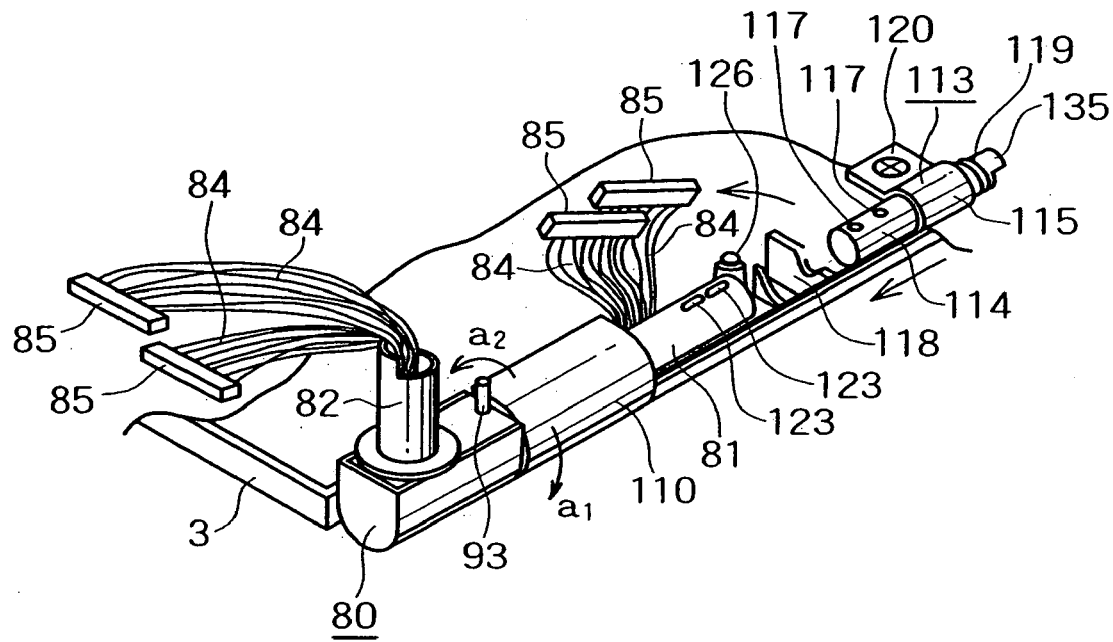
FIGS. 15A and 15B are perspective views showing a state in which a hinge member is mounted to the supporting shaft member.
Figure 15B:
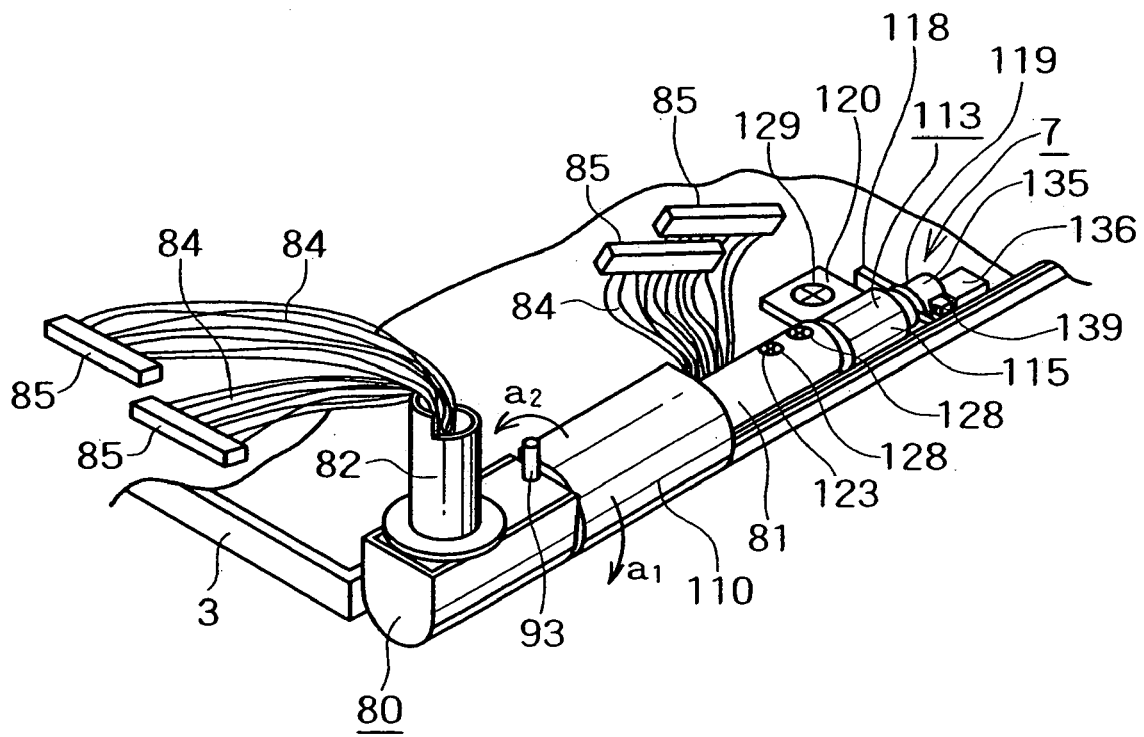

Referring to FIGS. 5, 15A and 15B, a hinge member 113 for turnably supporting the first turning shaft 81 and giving a specific turning resistance to the first turning shaft 81 is provided at an end portion of the first turning shaft 81 of the supporting shaft member 80. The hinge portion 113 has a supporting shaft 114 fixed to the end portion of the first turning shaft 81, and a bearing member 115 for turnably supporting the supporting shaft 114 and giving a specific turning resistance to the supporting shaft 114 turned around its axis.

Referring to FIGS. 15A and 15B, one end portion, to be connected to the first turning shaft 81, of the supporting shaft 114 has two threaded holes 117 for fixing the supporting shaft 114 to the first turning shaft 81. The other end portion of the supporting shaft 114 has a guide groove 119 to be turnably engaged with a supporting piece 118 provided on the lid body 3. A fixed piece 120 to be fixed to the lid body 3 side is formed integrally with the bearing portion 115.

Referring to FIG. 14B, a leading end portion of the first turning shaft 81 of the supporting shaft member 80 has two threaded holes 123 corresponding to the threaded holes 117 of the supporting shaft 114. A portion, located at a central portion of the lid body 3, of the leading end of the first turning shaft 81 of the supporting shaft 80 has a slit (not shown) extending in the axial direction of the first turning shaft 81. As shown in FIG. 15A, the connection wires 84 and the connection terminals 85, which have been inserted in the first turning shaft 81, are pulled out on the central side of the lid body 3 through the slit.

Referring to FIGS. 15A and 15B, a stay 126 to which the fixing piece 120 of the bearing member 115 is to be fixed is formed integrally with the lid body 3.

Referring to FIG. 15A, the supporting shaft 114 is inserted in the end portion of the first turning shaft 81 of the supporting shaft member 80. The threaded holes 117 of the supporting shaft 114 are aligned with the threaded holes 123 of the first turning shaft 81, so that the axial position of the supporting shaft 114 to the first turning shaft 81 is determined. In such a state, as shown in FIG. 15B, the first turning shaft 81 is rigidly fixed to the supporting shaft 114 by means of two fixing screws 128 screwed in the threaded holes 123 and the threaded holes 117. The bearing portion 115 for turnably supporting the first turning shaft 81 is, as shown in FIG. 15B, fixed by fixing the fixing piece 120 to the stay 126 via a fixing screw 129 in the state that the supporting shaft 114 is supported by the supporting piece 118.

An action of the lid body turnably supporting mechanism 6. at the time when the lid body 3 is turned around each of the first turning shaft 81 and the second turning shaft 82 will be described with reference to the drawings. When the lid body 3 is opened in the direction $a_2$ or closed in the direction $a_1$ with respect to the player main body 3, the lid body 3 is turned around the first turning shaft 81 of the lid body turnably supporting mechanism 6. At this time, since a specific turning resistance is biased to the first turning shaft 81 by the hinge member 113 connected to the first turning shaft 81, the lid body 3 can be stopped at an arbitrary position to which the lid body 3 is opened or closed with respect to the player main body 2.

When the lid body 3 is turned in the direction $b_1$ or the direction $b_2$ with respect to the player main body 2, the lid body 3 is turned around the second turning shaft 82 of the lid body turnably supporting mechanism 6. At this time, the position restricting pin 93 of the, supporting shaft member 80 is moved along the guide slit 102. Since the elastic force of the flat spring 103 is biased to the position restricting pin 93 at each of the positions $r_1$ and $r_4$ at which the position restricting pin 93 is brought into contact with each of both the ends of the guide slit 102, the turning motion of the lid body 3 around the second turning shaft 82 is restricted. As a result, the turning position of the lid body 3 turned around the second turning shaft 82 is certainly held.

In other words, according to the lid body turnably supporting mechanism 6, when the lid body 3 is turned around the second turning shaft 82, the lid body 3 can be certainly fixed at a position at which the axial direction of the first turning shaft 81 is in parallel to the rear surface of the player main body 2 and at a position at which the axial direction of the first turning shaft 81 is in parallel to a side surface of the player main body 2.

With respect to the lid body turnably supporting mechanism 6, the elastic force of the flat spring 103 is not biased to the position restricting pin 93 at each of the positions $r_2$ and $r_3$ on the way of turning of the position restricting pin 93 along the guide slit 102; however, since the turning resistance is biased to the second turning shaft 82 by the flat spring 97, the lid body 3 can be stopped at an arbitrary turning position in the turning direction around the second turning shaft 82.

Figure 16:
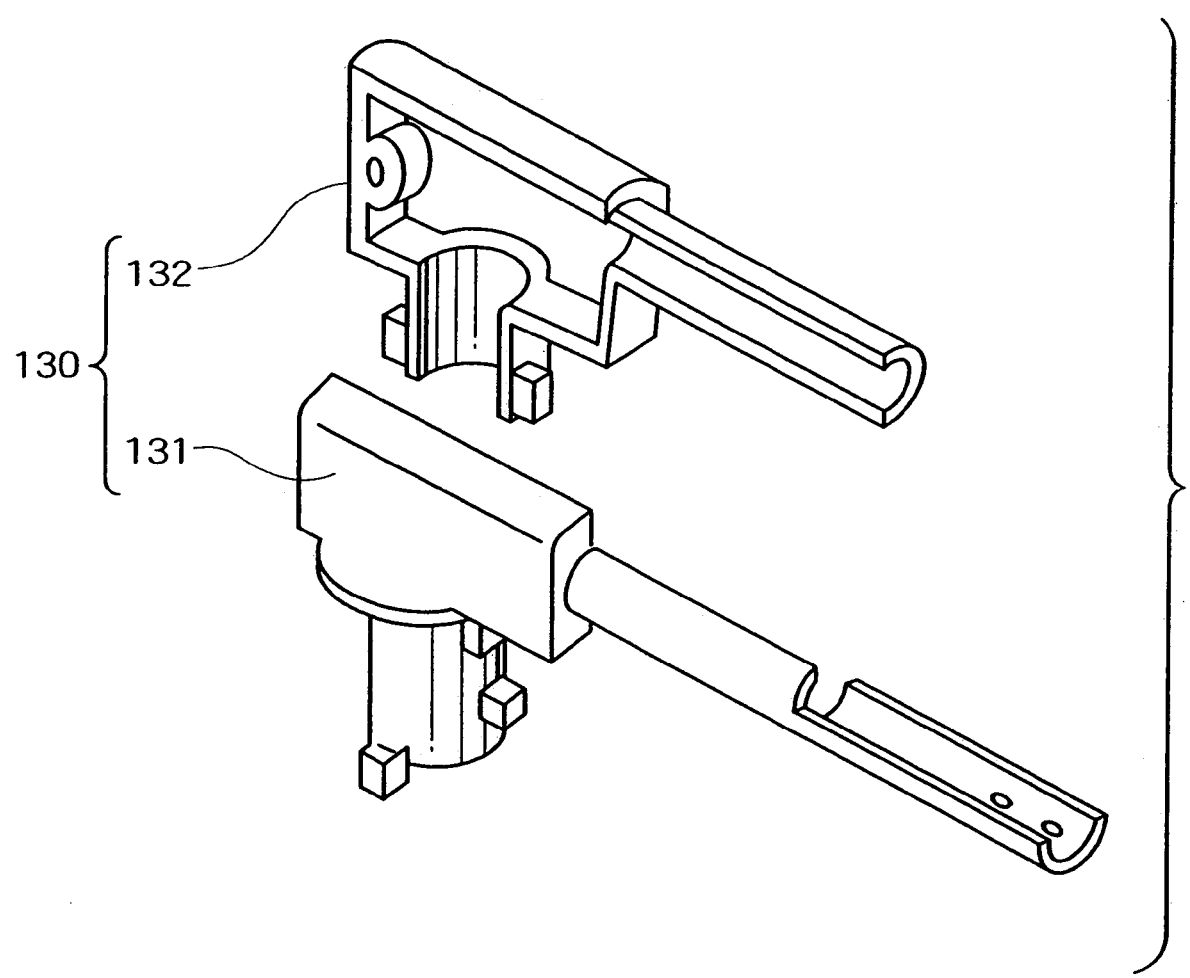
FIG. 16 is an exploded perspective view showing one example of division for another supporting shaft member.

According to this embodiment, the first turning shaft 81 of the supporting shaft member 80 is divided into two parts along the horizontal division plane parallel to the first turning shaft 81; however, the present invention is not limited thereto but may be configured such that the supporting shaft member 80 be divided along another division plane, for example, a vertical division plane containing the first turning shaft 81 and the second turning shaft 82 so that the connection wires 84 and the connection terminals 95 can be easily inserted in the supporting shaft member 80. For example, as shown in FIG. 16, another supporting shaft member 130 has a pair of divided bodies 131 and 132 which are obtained by dividing the supporting shaft member 130 into two parts along a vertical division plane containing the first turning shaft 81 and the second turning shaft 82.

The lid body opening/closing detecting mechanism 7 for detecting an opening position of the lid body 3 opened/closed with respect to the player main body 2, and switching a power inputting state of the display portion 63 on the basis of the opening position of the lid body 3 will be described below.

Figure 17:
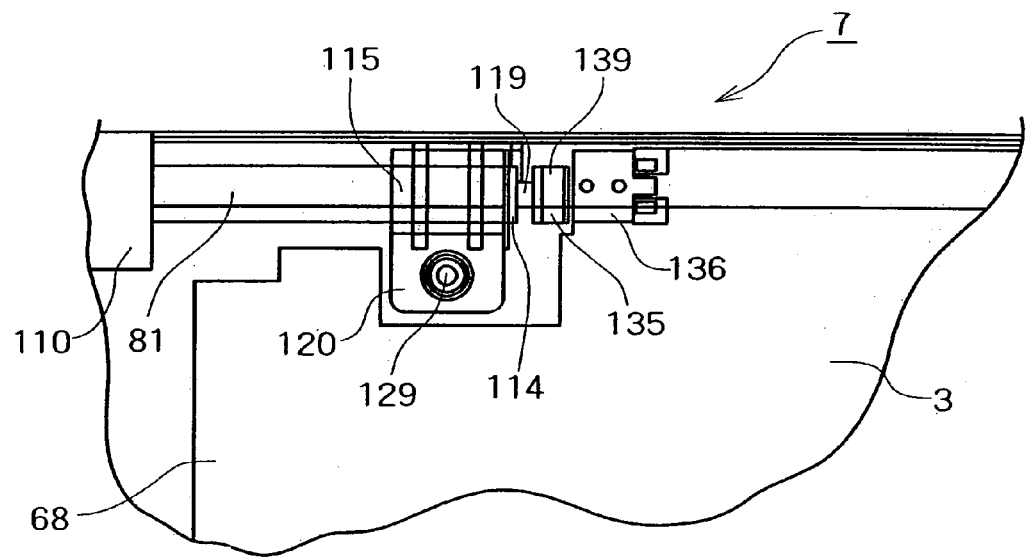
FIG. 17 is a plan view illustrating a lid body opening/closing detecting mechanism.

Referring to FIGS. 15B and 17, the lid body opening/closing detecting mechanism 7 has a detecting projection 135 turned integrally with the first turning shaft 81, and a detecting element 136 for detecting a turning position of the first turning shaft 81 around its axis on the basis of the detected turning position of the detecting projection 135.

The detecting projection 135 is integrally formed on an end face of the supporting shaft 114 of the hinge member 113 of the lid body turnably supporting mechanism 6 in such a manner as to axially project along an outer periphery of the end face of the supporting shaft 114. The detecting projection 135 is formed into an approximately semi-cylindrical shape, and is provided at a specific position of the first turning shaft 81 in the turning direction around the first turning shaft 81 so as to be detected by the detecting element 136 when an angle formed between the principal surface of the lid body 3 and the principal surface of the player main body 2 becomes, for example, 45°.

Referring to FIGS. 15B and 17, the detecting element 136 is configured as a switch having a detecting piece 139 depressed in the detecting element 136. The detecting element 136 is disposed at a position facing to the end face of the supporting shaft 114 in such a manner that the detecting piece 139 is located in a turning region of the detecting projection 135. That is to say, the detecting element 136 is located within a plane on which a cross-section of the supporting shaft 114 is projected. More specifically, the detecting element 136 is provided on the circuit board 68 mounted in the lid body 3 in such a manner that when the detecting piece 139 of the detecting element 136 is brought into contact with the detecting projection 135, the detecting piece 139 is depressed in the detecting element 136 in axial direction of the supporting shaft 114. The detecting element 136 is electrically connected to the circuit board 68.

Figure 18:
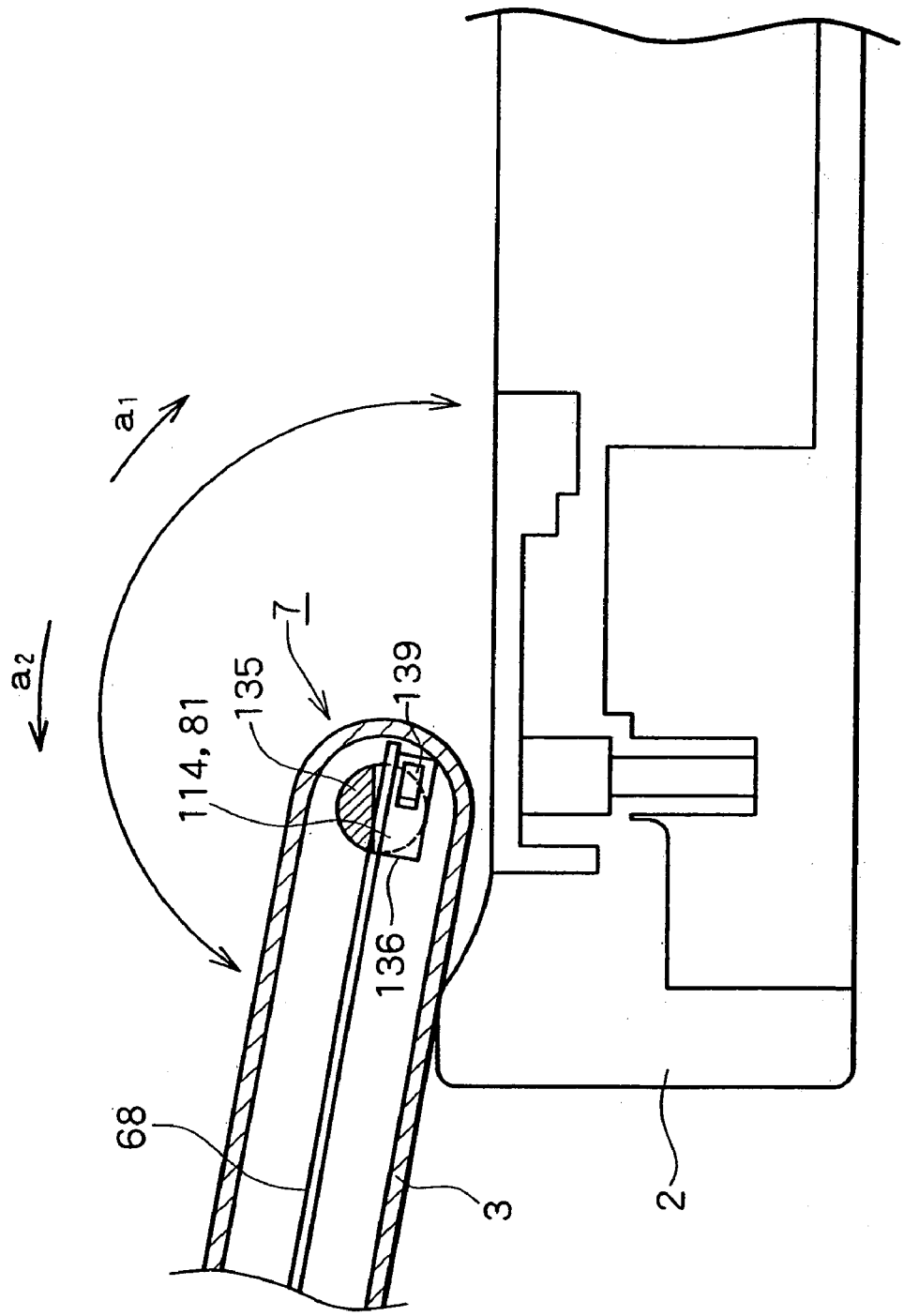
FIG. 18 is a vertical sectional view illustrating a motion of the lid body opening/closing detecting mechanism.

Accordingly, the lid body opening/closing detecting mechanism 7 is operated as follows: namely, as shown in FIG. 18, when the lid body 3 is opened/closed around the first turning shaft 81, the detecting element 136 provided integrally with the lid body 3 is turned relative to the detecting projection 135 provided on the supporting shaft 114 provided integrally with the first turning shaft 81, whereby the detecting piece 139 of the detecting element 136 is depressed in the detecting element 136 by the detecting projection 135, to detect a turning position of the lid body 3 with respect to the player main body 2. That is to say, the lid body opening/closing detecting mechanism 7 detects a turning position of the lid body 3 with respect to the player main body 2 by a relative positional change between the detecting element 136 on the lid body 3 side and the detecting projection 135 on the first turning shaft 81 side.

In the lid body opening/closing mechanism 7 configured as described above, when the lid body 3 is opened in the direction $a_2$ with respect to the player main body 2 until an angle formed between the principal surface of the player main body 2 and the principal surface of the lid body 3 becomes 45° or more, the detecting projection 135 being in contact with the detecting piece 139 of the detecting element 136 is separated from the detecting piece 139. At this time, the display portion 63 of the lid body 3 opened with respect to the player main body 2 is lighted up.

As shown in FIG. 18, when the lid body 3 is opened with respect to the player main body 2 until the angle formed between the principal surface of the player main body 2 and the principal surface of the lid body 3 becomes about 180°, the detecting projection 135 is located at an escape position separated from a position of the detecting piece 139 of the detecting element 136. At this time, the display portion 63 of the lid body 3 opened with respect to the player main body 2 is kept as lighted up.

Figure 19:
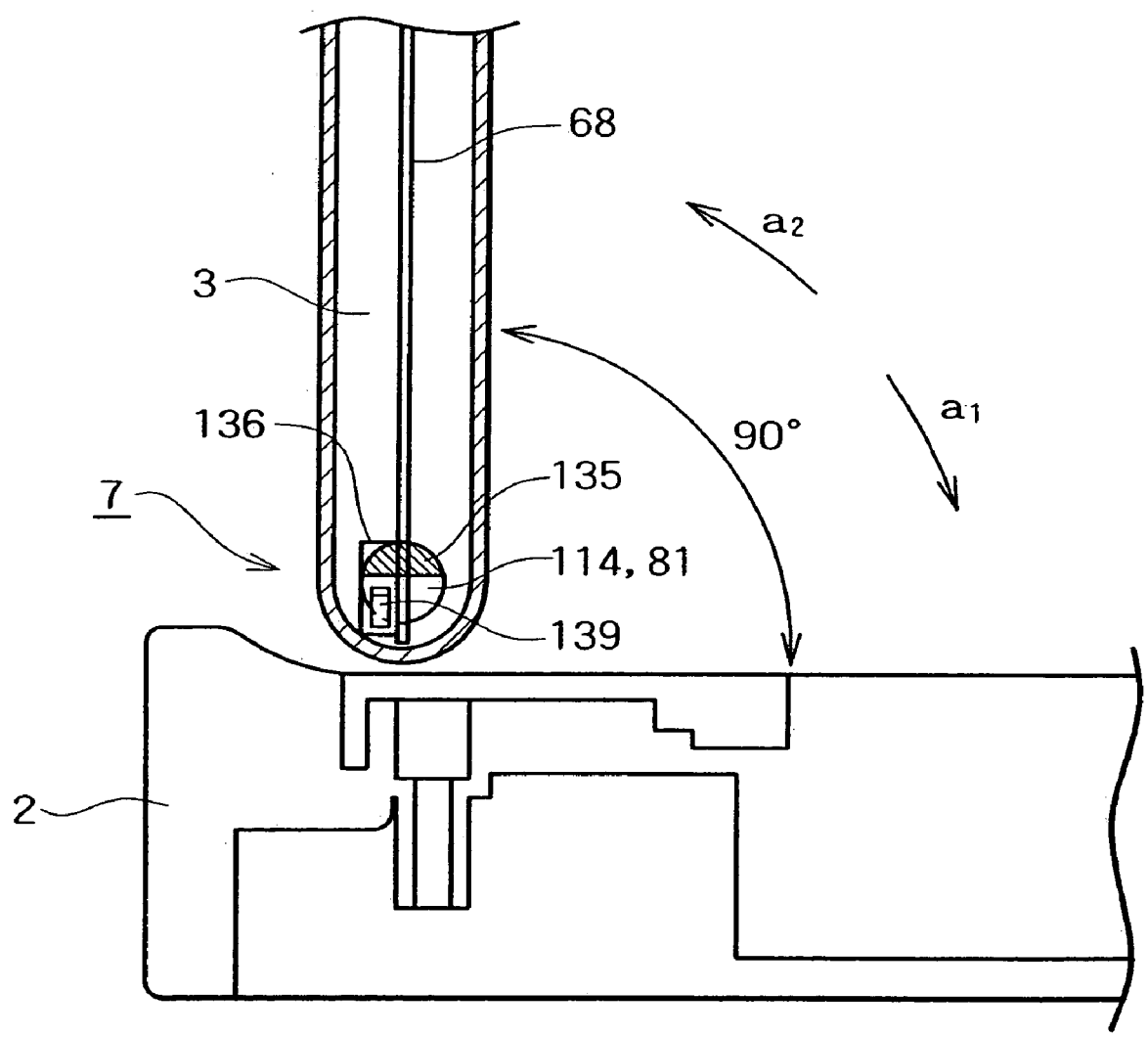
FIG. 19 is a vertical sectional view showing a state in which the lid body is further opened from the state shown in FIG. 18.

As shown in FIG. 19, when the lid body 3 is closed from the open state shown in FIG. 18 in the direction $a_1$ with respect to the player main body 2 until the angle formed between the principal surface of the player main body 2 and the principal surface of the lid body 3 becomes about 90°, the detecting piece 139 of the detecting element 136 is not brought into contact with the detecting projection 135. At this time, the display portion 63 of the lid body 3 is kept as lighted up.

Figure 20:
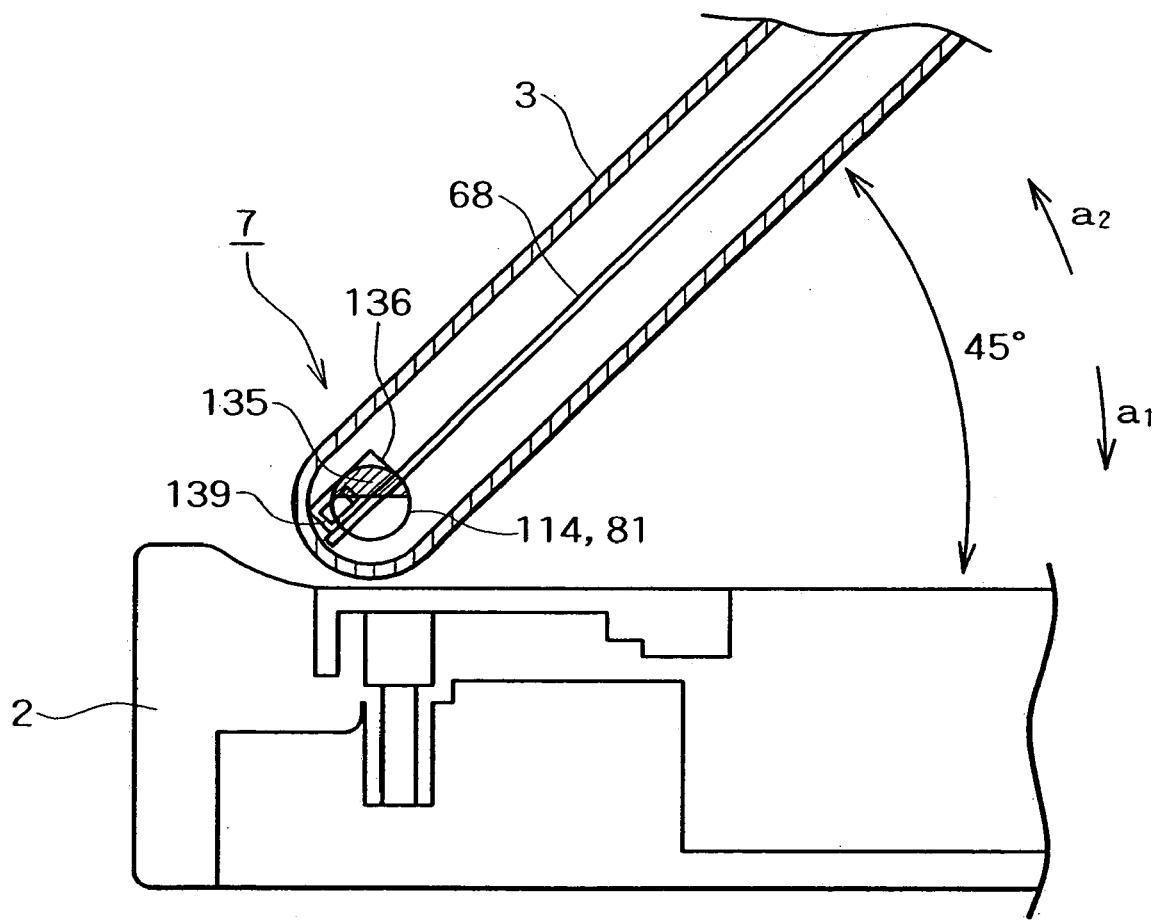
FIG. 20 is a vertical sectional view showing a state in which the lid body is partially closed from the state shown in FIG. 18.

When the lid body 3 is further closed in the direction $a_1$ with respect to the player main body 2 until the angle formed between the principal surface of the player main body 2 and the principal surface of the lid body 3 becomes about 60°, the detecting piece 139 of the detecting element 136 begins to be brought into contact with the detecting projection 135. At this time, however, the display portion 63 of the lid body 3 is kept as lighted up yet. Subsequently, as shown in FIG. 20, when the lid body 3 is further closed in the direction $a_1$ with respect to the player main body 2 until the angle formed between the principal surface of the player main body 2 and the principal surface of the lid body 3 becomes about 45°, the detection piece 139 of the detecting element 136 is perfectly depressed in the detecting element 136 by the detection projection 135. At this time, the display portion 63 of the lid body 3 is lighted out.

Since the lid body opening/closing detecting mechanism 7 has the detecting projection 135 provided at one end of the supporting shaft 114 connected to the first turning shaft 81 and the detecting element 136 provided at a position facing to the detecting projection 135, the detecting piece 139 of the detecting element 136 can be directly depressed in the detecting element 136 without interposing any link mechanism in the lid body opening/closing detecting mechanism 7. As a result, it is possible to simplify the structure of the lid body opening/closing detecting mechanism 7, improve the operation reliability thereof, and reduce the production, cost thereof.

Since the detecting projection 135 and the detecting element 136 of the lid body opening/closing detecting mechanism 7 are disposed in the lid body 3, that is, any detecting member is not exposed outside the player main body 2 and the lid body 3, it is possible to ensure a desirable, simple appearance of the entire apparatus.

According to the lid body opening/closing detecting mechanism 7, the detecting element 136 is disposed in such a manner that the detecting piece 139 facing to the detecting projection 135 formed on the end face of the supporting shaft 114 is depressed in the detecting element 136 in the axial direction of the supporting shaft 114; however, the present invention is not limited thereto. For example, the detecting element 136 may be disposed in such a manner that the detecting piece 139 is depressed in the detecting element 136 in the direction perpendicular to the axial direction of the supporting shaft 114.

According to the lid body opening/closing detecting mechanism 7, the detecting projection 135 is formed on the end face of the supporting shaft 114 of the hinge member 113; however, the present invention is not limited thereto. For example, the detecting projection 135 may be provided on an outer peripheral surface at a mid position, in the axial direction, of the supporting shaft 114 of the hinge member 113 in such a manner as to project in the direction perpendicular to the axial direction of the supporting shaft 114, and the detecting element 136 be disposed at a position facing to the outer peripheral surface of the supporting shaft 114. The detecting element 136 may be of course replaced with another mechanical or optical type detecting element.

According to the lid body opening/closing detecting mechanism 7, a power input state of the display portion 63 is switched on the basis of a detected opened/closed position of the lid body 3; however, the present invention is not limited thereto. For example, not only a power input state of the display portion 63 but also a power input state of the player main body 2 may be switched on the basis of a detected opened/closed position of the lid body 3.

The locking mechanism 8 for holding the lid body 3 in a first closed state that the lid body 3 is closed in the direction al with respect to the player main body 2 and in a second closed state that the lid body 3 is turned in the direction $b_1$ with respect to the player main body 2 and is closed in the direction $a_1$ with respect to the player main body 2 will be described below.

Figure 21:
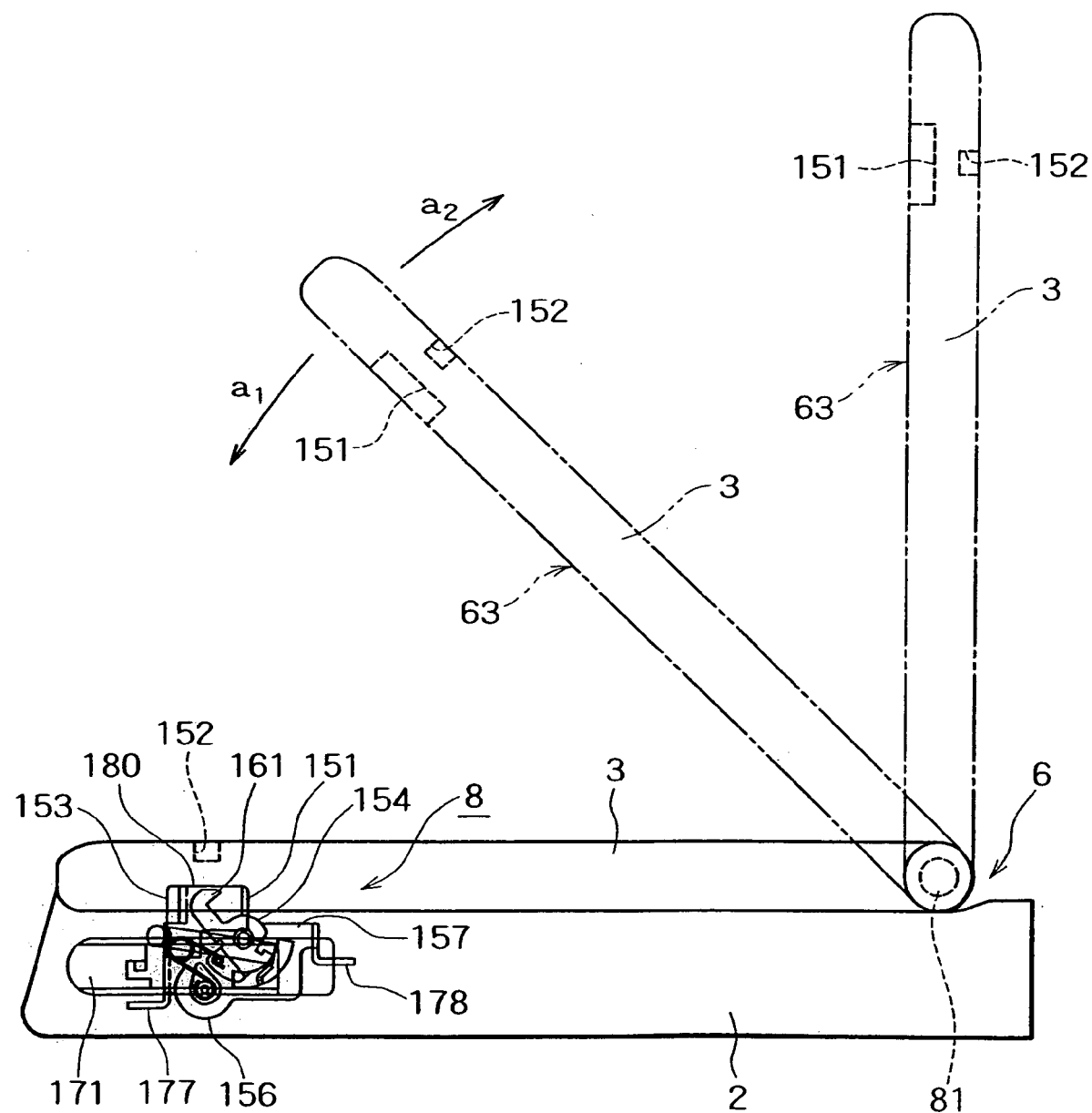
FIG. 21 is a perspective side view illustrating a locking mechanism of the disc player.
Figure 22:
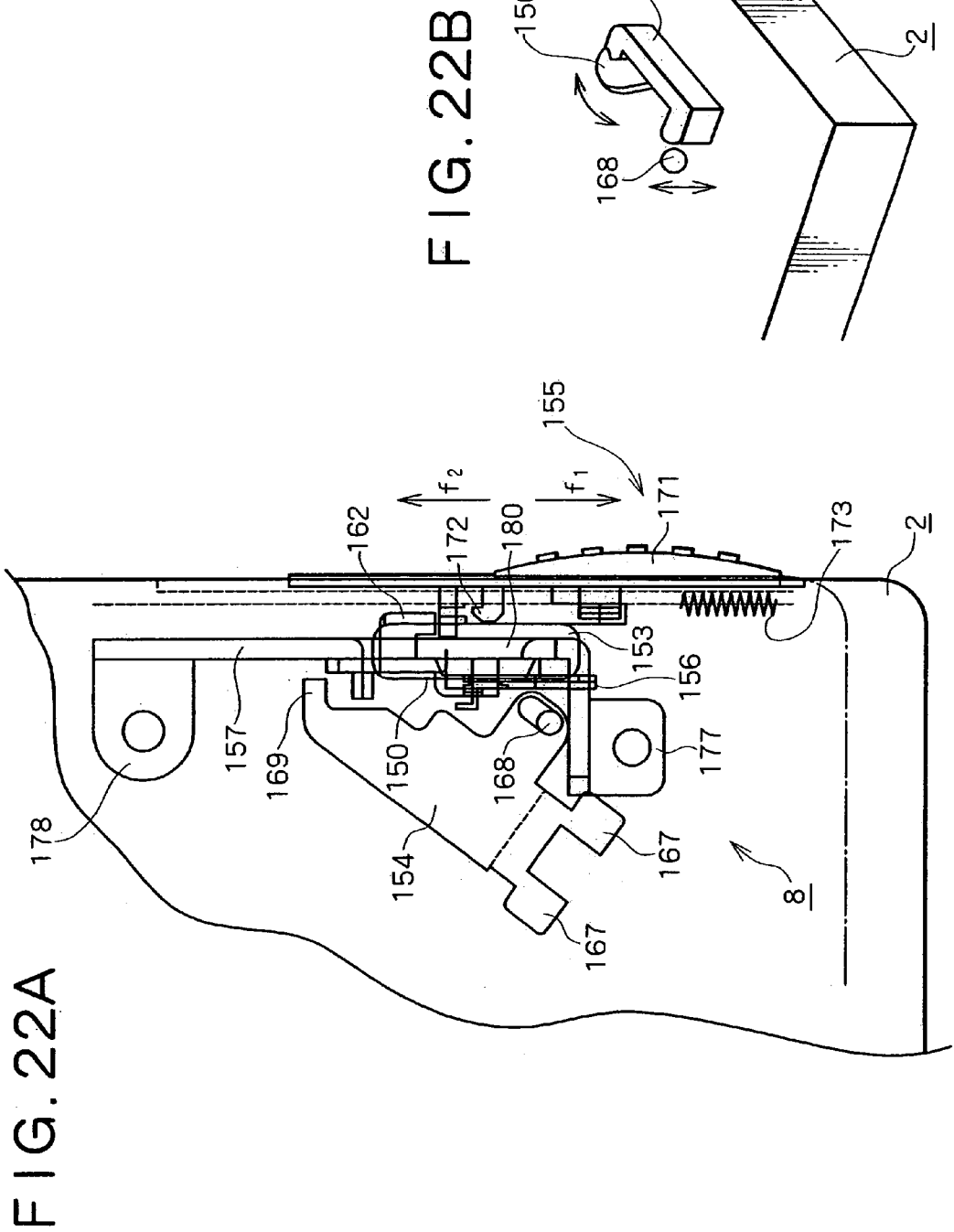
FIGS. 22A and 22B are a plan view and a perspective view illustrating the locking mechanism shown in FIG. 21.

Referring to FIGS. 21, 22A, and 22B, the locking mechanism 8 includes a locking member 150 to be engaged with the lid body 3, first and second engagement recesses 151 and 152 in which the locking member 150 is engaged in the first and second closed states, respectively, an engagement member 153 inserted in and engaged with the first engagement recess 151 or the second engagement recess 152, an operating member 154 for operating the locking member 150 and moving the lid body 3 in the opening direction, a sliding member 155 for slidably moving the locking member 150, a torsion coil spring 156 for biasing the locking member 150 in the turning direction, and a supporting plate 157 for supporting the locking member 150, the engagement member 153 and the torsion coil spring 156.

Figure 23:
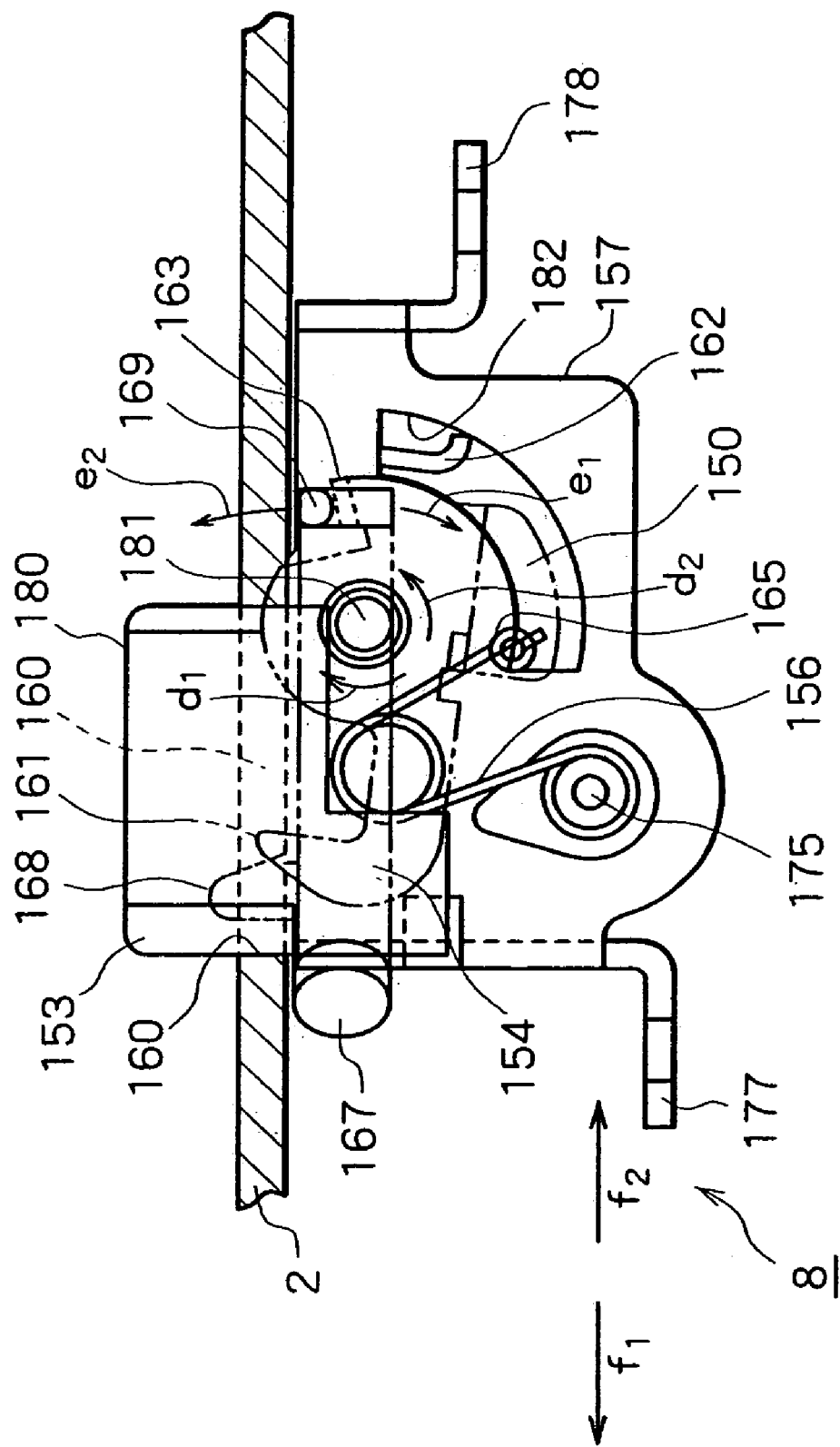
FIG. 23 is a vertical sectional view showing a state in which the lid body is opened with respect to the player main body, wherein the locking mechanism is released.

Referring to FIGS. 22A, 22B, and 23, the locking member 150 is typically made from a metal material, and an approximately central portion of the locking member 150 is supported by the supporting plate 157 in such a manner that, the locking member 150 is turnable in a direction shown by an arrow $d_1$ and in a direction shown by an arrow $d_2$. A locking claw 161 to be engaged with the first engagement recess 151 or the second engagement recess 152 of the lid body 3 is formed integrally with one end of the locking member 150. The principal surface of the player main body 2 has an opening 160 through which the locking claw 161 of the locking member 150 projects outwardly from the player main body 2. The locking claw 161 is located at a position facing to the opening 160.

An operating piece 162 to be turned in the direction d₂ when the sliding member 155 is brought into contact therewith is formed integrally with the locking member 150 in such a manner as to project therefrom. An engagement piece 163 with which the operating member 154 is to be engaged is formed integrally with the locking member 150 in such a manner as to be bent with respect to the principal surface of the locking member 150. A spring catch pin 165 by means of which one end of the torsion coil spring 156 is to be caught is provided integrally with the principal surface of the locking member 150.

Figure 24:
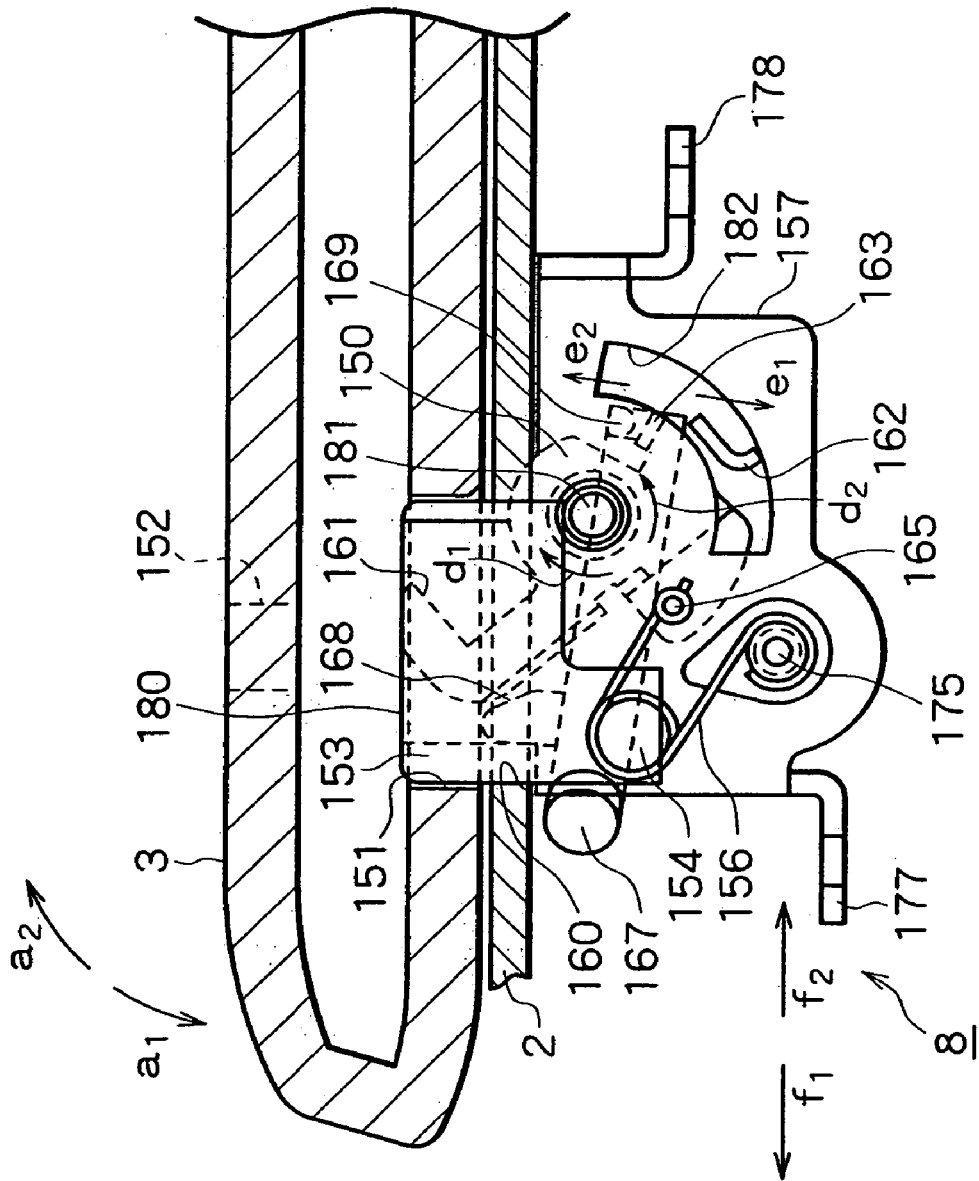
FIG. 24 is a vertical sectional view showing a state in which the lid body is closed with respect to the player main body, wherein a locking member of the locking mechanism is on the way of engagement with the lid body.

Referring to FIGS. 21 and 24, the first engagement recess 151 is provided in an outer peripheral portion of the principal surface of the lid body 3 at a position at which the lid body 3 faces to the locking claw 161 of the locking member 150 in the first closed state that the lid body 3 is closed with respect to the player main body 2 with the principal surface of the lid body 3 facing to the principal surface of the player main body 2. The second engagement recess 152 is provided in an outer peripheral portion of a back surface, opposed to the principal surface, of the lid body 3 at a position at which the lid body 3 faces to the locking claw 161 of the locking member 150 in the second closed state that the lid body 3 is closed with respect to the player main body 2 with the principal surface of the lid body 3 directed outwardly. In other words, the first and second engagement recesses 151 and 152 are provided at the positions on the principal surface and the back surface of the lid body 3, respectively.

The engagement member 153 is typically made from a resin material and is formed into an approximately U-shape. An outer size of the engagement member 153 is slightly smaller than an inner size of each of the first and second engagement recesses 151 and 152. The engagement member 153 is disposed in such a manner as to cover a movement region of the locking claw 161 of the locking member 150, and is fixed to the supporting plate 157.

Referring to FIGS. 22A, 22B, and 23, the operating member 154 is typically made from a resin material, and a principal surface portion of the operating member 154 is formed into a flat-plate shape. A turning supporting shaft 167 for turnably supporting the operating member 154 in a direction shown by an arrow e₁ and in a direction shown by an arrow e₂ is formed integrally with one end of the operating member 154. The operating member 154 is turnably supported on the player main body 2 via the turning supporting shaft 167.

An operating projection 168 is formed integrally with the principal surface portion of the operating member 154 at a position facing to the lid body 3 having been closed with respect to the player main body 2 in such a manner as to project to the lid body 3 side. The operating projection 168 is disposed in the vicinity of the engagement member 153 projecting from the principal surface of the player main body 2, and a height of the operating projection 168 in the direction perpendicular to the principal surface of the player main body 2 is smaller than a height of the engagement member 153 projecting from the principal surface of the player main body 2.

Since the operating member 168 is located in the vicinity of the engagement member 153 having a relatively large height from the principal surface of the player main body 2, the operating member 168 in the state projecting from the principal surface of the player main body 2 is prevented from being erroneously depressed by a finger or the like of a user.

An end portion, directed outwardly from the player main body 2, of the operating member 168 is formed into a sharp shape. Such a sharpened end portion gives attention to a user whose finger or the like touches the sharpened end portion and makes it difficult for a user to depress the sharpened end portion. As a result, the operating member 168 can be prevented from being erroneously depressed.

An engagement claw 169 to be engaged with the engagement piece 163 of the locking member 150 is formed integrally with a free end of the operating member 154 in such a manner as to project therefrom.

Referring to FIGS. 22A, 22B, and 23, the sliding member 155 is supported on a side surface portion of the player main body 2 in such a manner as to be movable in a direction shown by an arrow f₁ and in a direction shown by an arrow f₂. The sliding member 155 has an operating portion 171 slid by a finger or the like, and a moving portion 172 to be brought into contact with the operating piece 162 of the lock member 150 and to move the locking member 150.

The sliding member 155 is biased so as to be moved in the direction f₁ by an elastic force of a tensile coil spring 173. One end of the tensile coil spring 173 is caught by the sliding member 155 and the other end thereof is caught by the player main body 2.

Referring to FIG. 23, one end of the torsion coil spring 156 is caught by a spring catch shaft 175 provided on the supporting plate 157 and the other end thereof is caught by the spring catch pin 165 of the locking member 150. The torsion coil spring 156 biases the locking member 150 in the direction d₁ or in the direction d₂ on the basis of a relative positional relationship between the spring catch pin 165 and the spring catch shaft 175, which relative positional relationship is changed along with turning of the locking member 150.

Referring to FIGS. 22A, 22B, and 23, the supporting plate 157 is made from a metal material having a rigidity, and a principal surface of the supporting plate 157 is formed into a flat-plate shape. The supporting plate 157 has mounting pieces 177 and 178 which are bent with respect to the principal surface of the supporting plate 157 and are fixed to the player main body 2 by means of set screws (not shown).

A projecting piece 180 in which the engagement member 153 is to be fitted is formed integrally with one end, facing to the principal surface of the player main body 2, of the supporting plate 157 in such a manner as to project therefrom. The projecting piece 180 projects from the opening 160 formed in the principal surface of the player main body 2 by a projecting amount nearly equal to a depth of each of the first and second engagement recesses 151 and 152, and is fixed to the player main body 2 in such a manner as to be adjacent to the movement region of the locking claw 161 of the locking member 150.

A turning supporting shaft 181 for turnably supporting an approximately central portion of the locking member 150 is provided on the principal surface of the supporting plate 157. A circular-arc guide slit 182 in which the operating piece 162 of the locking member 150 is movably inserted is provided in the principal surface of the supporting plate 157. The operating piece 162 of the locking member 150 faces to the operating portion 172 of the sliding member 155 via the guide slit 182.

An operation of the locking mechanism 8 for holding the lid body 3 in the first closed state that the lid body 3 is closed with respect to the player main body 2 with the display portion 63 on the principal surface side of the lid body 3 facing to the principal surface of the player main body 2, and an operation of the locking member 8 for releasing the lid body 3 held in the first closed state, will be described below.

Referring to FIG. 23, in the state that the lid body 3 is opened with respect to the player main body 2, the locking claw 161 of the locking member 150 of the locking mechanism 8 is retreated inwardly from the principal surface of the player main body 2, and the sharpened end of the operating projection 168 of the operating member 154 projects from the principal surface of the player main body 2 by a specific amount.

Referring to FIG. 24, as the lid body 3 is being closed in the first closed state with respect to the player main body 2, the principal surface of the lid body 3 is brought into contact with the operating projection 168 of the operating member 154, so that the operating projection 168 is depressed inwardly from the player main body 2 by the principal surface of the lid body 3. Along with the depressing movement of the operating projection 168 by the principal surface of the lid body 3, the operating member 154 is turned around the turning supporting shaft 167 in the direction $e_1$. When the operating member 154 is turned in the direction $e_1$, the engagement claw 169 of the operating member 154 is engaged with the engagement piece 163 of the locking member 150.

The operating member 154, whose engagement claw 169 has been engaged with the engagement piece 163 of the locking member 150, is biased to be turned in the direction $d_1$ by the elastic force of the torsion coil spring 156, so that the locking member 150 is further turned in the direction $d_1$ by the biasing force of the torsion coil spring 156.

Figure 25:
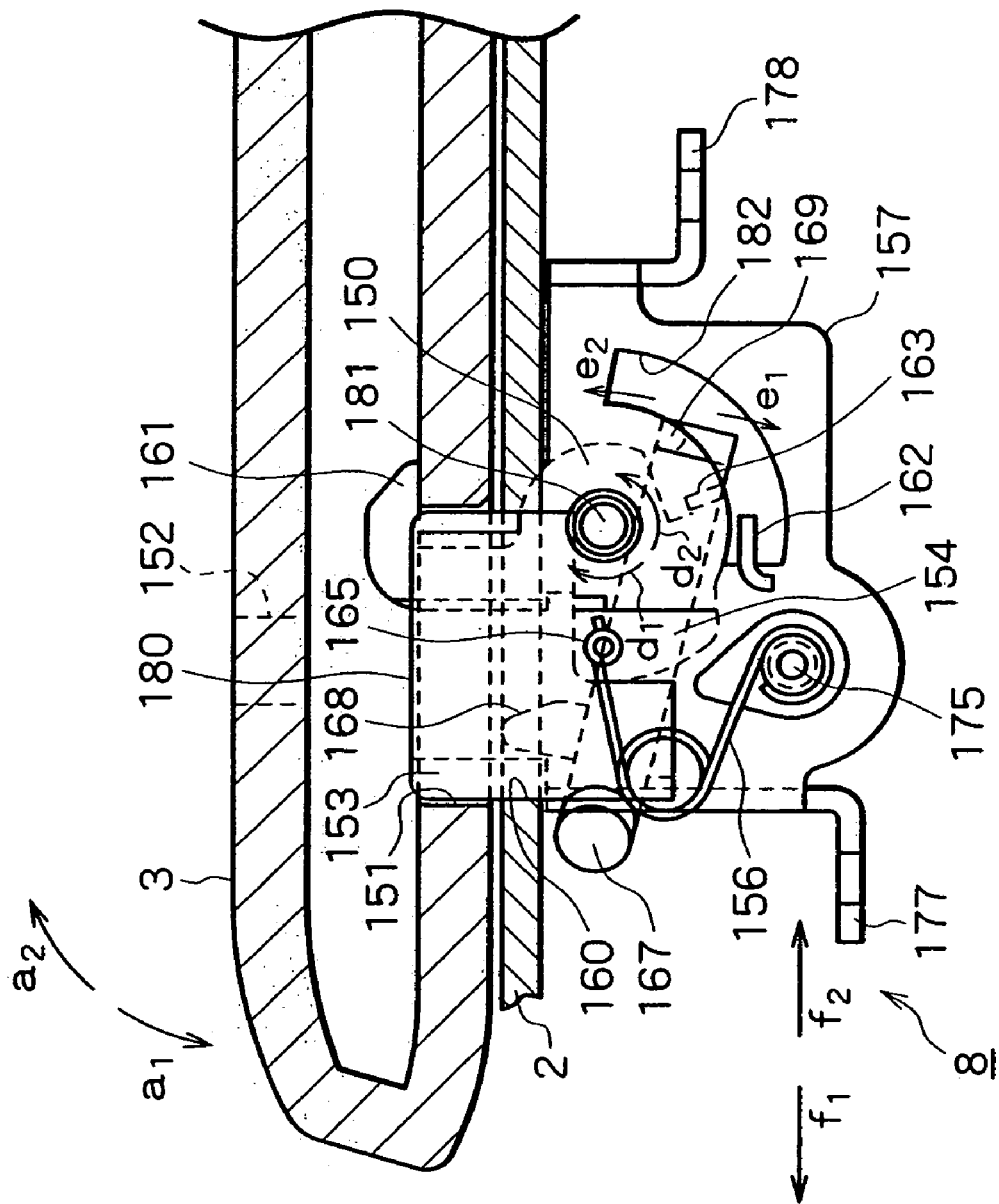
FIG. 25 is a vertical sectional view showing a state in which the locking member of the locking mechanism is engaged with the lid body.

Referring to FIG. 25, when the lid body 3 is just closed in the first closed state with respect to the player main body 2, the engagement member 153 of the locking mechanism 8, which is mounted to the projecting piece 180 of the supporting plate 157, is inserted and engaged in the first engagement recess 151 of the lid body 3, and also the locking member 150 of the locking mechanism 8 is turned in the direction $d_1$ and the locking claw 161 is certainly engaged in the first engagement recess 151 of the lid body 3. Accordingly, the lid body 3 is held in the first closed state being closed with respect to the player main body 2 by the locking mechanism 8.

With respect to the locking mechanism 8, when the lid body 3 is closed with respect to the player main body 2, the locking member 153 is engaged in the first engagement recess 151 before the locking claw 161 of the locking member 150 is engaged in the first engagement recess 151. That is to say, the locking claw 161 of the locking member 150 is engaged in the first engagement recess 151 after the relative positional relationship between the first engagement recess 151 and the locking claw 161 of the locking member 150 is determined. As a result, the locking claw 161 can be certainly engaged in the first engagement recess 151.

When an external force, such as an external impact due to erroneous drop of the entire player is applied to the lid body 3 closed with respect to the player main body 2, the external force applied to the locking member 150 in the direction parallel to the axial direction of the turning shaft 181 is applied to the engagement member 153 engaged in the first engagement recess 151 and the lid body turnably supporting mechanism 6, so that the external force is not directly applied to the locking member 150. As a result, it is possible to prevent release of the engagement state between the locking claw 161 of the locking member 150 and the first engagement recess 151 of the lid body 3 by an external force and to prevent occurrence of breakage of the locking member 150 by an external force.

Referring to FIG. 25, in the case of opening the lid body 3 closed with respect to the player main body 2, the sliding member 155 of the locking mechanism 8 is slid in the direction $f_2$ against the elastic force of the tensile coil spring 173. When the sliding member 155 is slid in the direction $f_2$, the operating portion 172 is brought into contact with the operating piece 162 of the locking member 150, to move the operating piece 162 in the guide slit 182 of the supporting plate 157.

Figure 26:
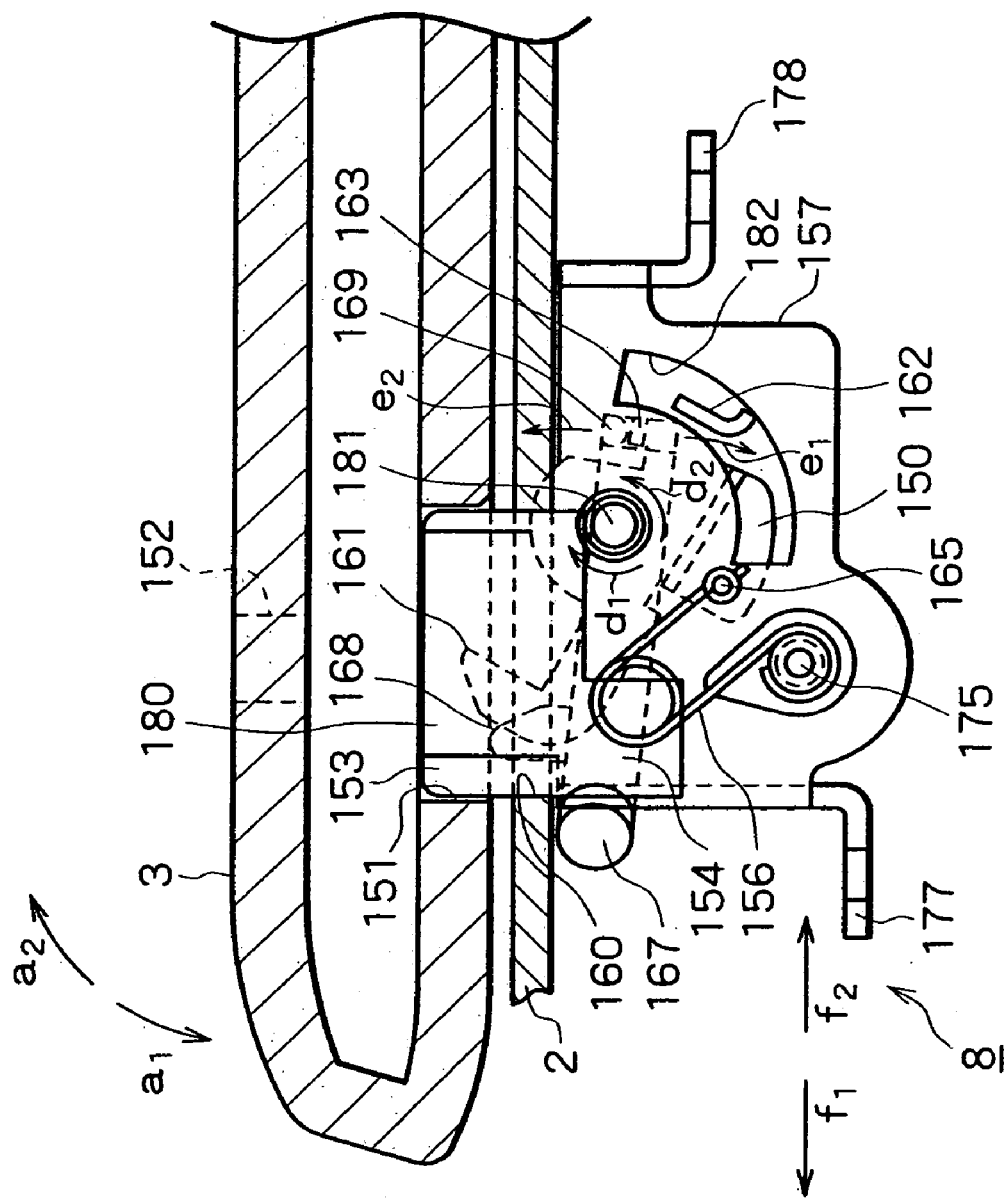
FIG. 26 is a vertical sectional view showing a state in which the engagement of the locking member of the locking mechanism with the lid body is released.

Referring to FIGS. 25 and 26, the locking member 150 is turned in the direction $d_2$ along with movement of the operating piece 162 by the sliding member 155, so that the engagement state between the locking claw 161 and the lid body 3 is released and the engagement piece 163 is engaged with the engagement claw 169 of the operating member 154. That is to say, since the holding of the lid body 3 in the first closed state by the locking mechanism 8 is released, the lid body 3 closed with respect to the player main body 2 can be opened in the direction $a_2$.

The locking member 150, whose engagement piece 163 has been brought into contact with the engagement claw 169 of the operating member 154, is biased to be turned in the direction $d_2$ by the elastic force of the torsion coil spring 156. As shown in FIG. 26, as the locking member 150 is further turned in the direction $d_2$, the engagement claw 169 of the operating member 154 is moved by the engagement piece 163 of the locking member 150, whereby the operating member 154 is turned in the direction $e_1$. Along with the turning motion of the operating member 154 in the direction $e_1$, the operating projection 168 of the operating member 154 projects outwardly from the principal surface of the player main body 2. At this time, the sharpened end of the operating projection 168 is, as shown in FIG. 27, brought into contact with the principal surface of the lid body 3 closed with respect to the player main body 2, to slightly move and open, the lid body 3 in the direction $a_1$ by an amount corresponding to the projecting amount of the operating projection 168.

Figure 27:
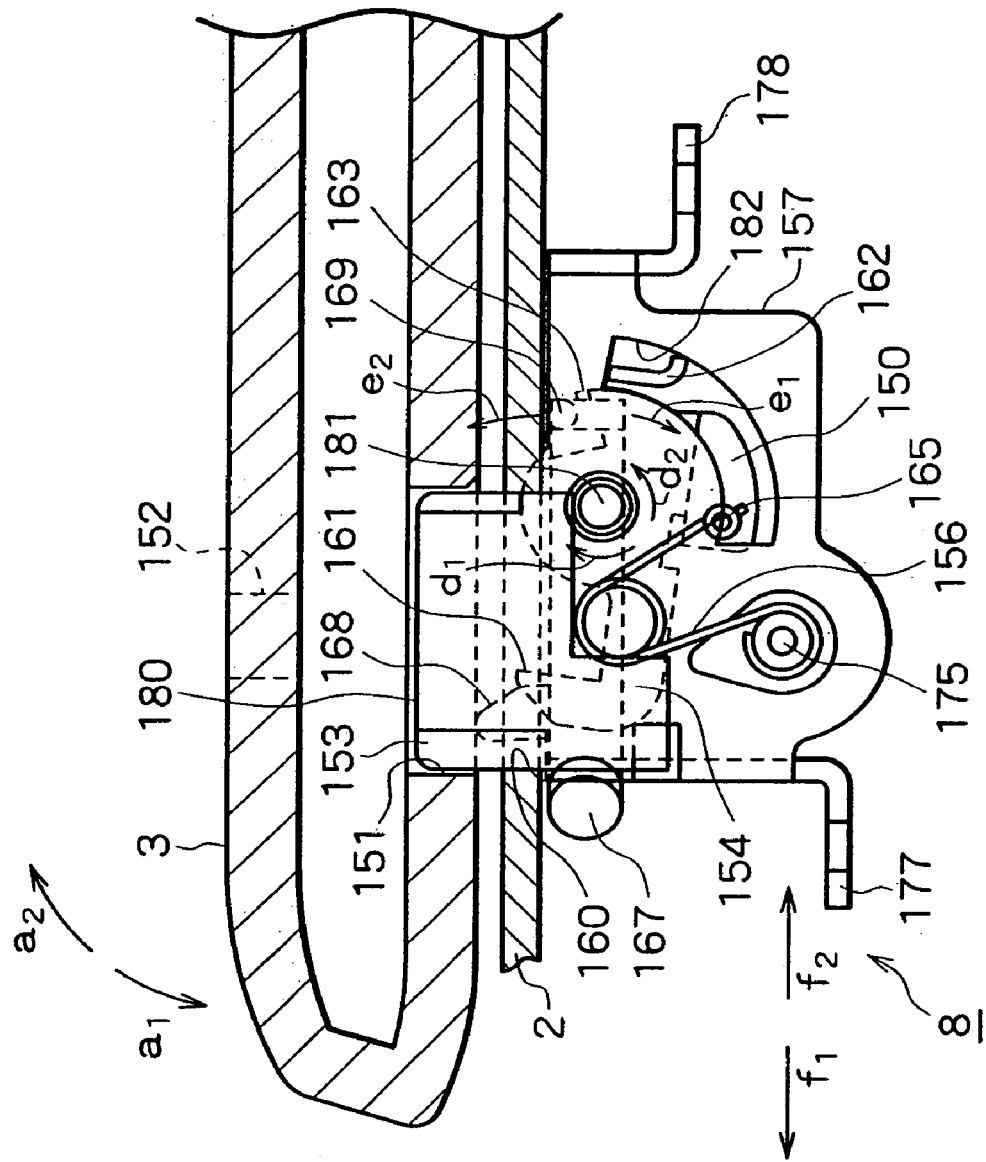
FIG. 27 is a vertical sectional view showing a state in which the lid body is opened by an operating member of the locking member.

That is to say, along with the sliding motion of the sliding member 155, the locking mechanism 8 not only releases the engagement state between the locking claw 161 of the locking member 150 and the lid body 3, but also slightly opens, the lid body 3 from the first closed state as shown in FIG. 27. Since the lid body 3 is slightly opened with respect to the player main body 2 so as to form a gap between the principal surface of the player main body 2 and the principal surface of the lid body 3, the lid body 3 can be easily opened by a finger or the like of a user inserted in the gap.

An operation of the locking mechanism 8 for holding and releasing the lid body 3 in the second closed state that the lid body 3 is turned in the direction $b_1$ with respect to the player main body 2 and is closed with respect to the player main body 2 with the display portion 63 on the, principal surface of the lid body 3 directed outwardly is basically the same as the above-described operation of the locking mechanism 8 for holding and releasing the lid body 3 in the first closed state, and therefore, the overlapped description thereof is omitted.

With respect to the disc player 1 configured as described above, the motion for opening and closing the lid body 3 in the direction $a_2$ and the direction $a_1$ with respect to the player main body 2 and the motion for turning the lid body 3 in the direction $b_1$ and the direction $b_2$ with respect to the player main body 2 will be described with reference to the drawings.

Figure 28:
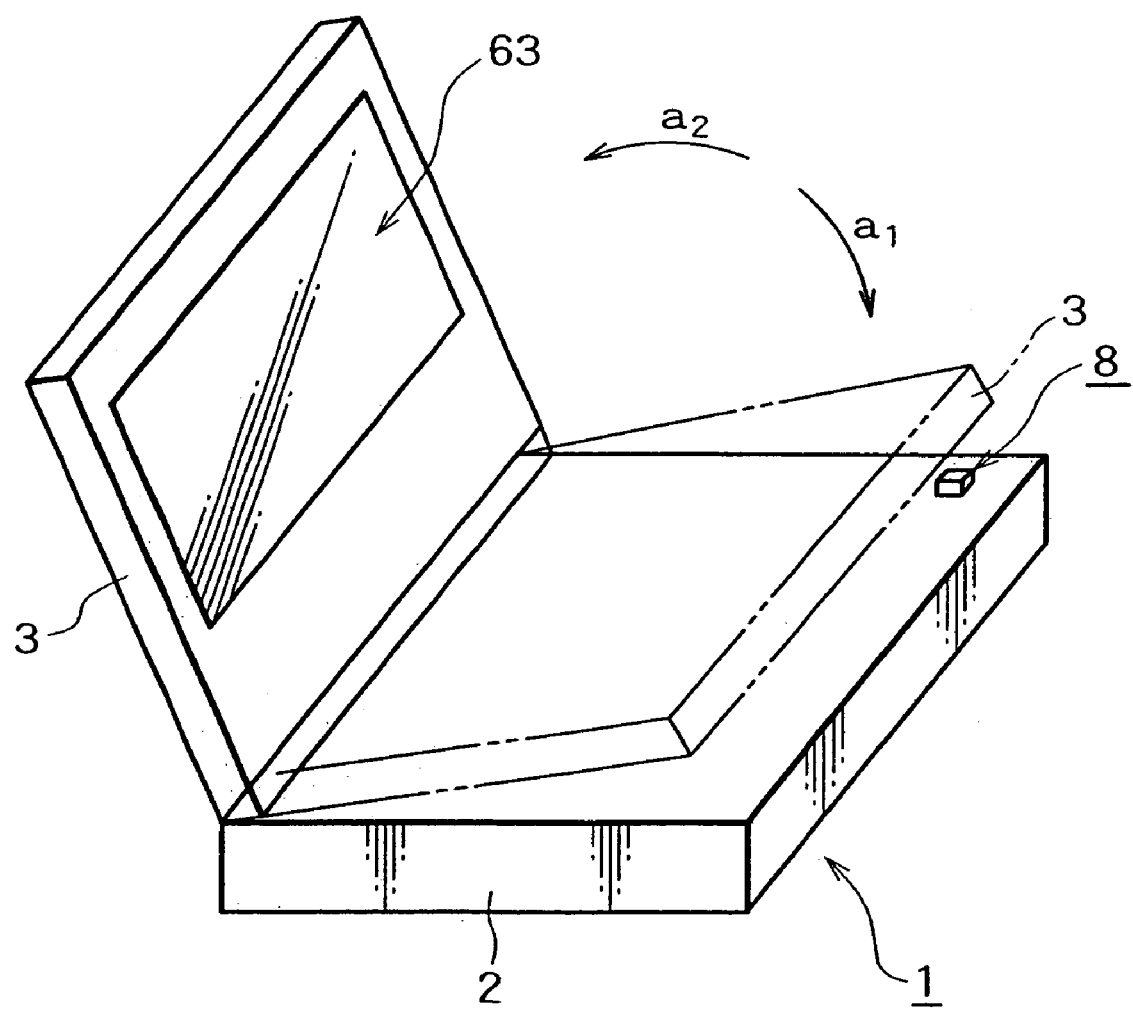
FIG. 28 is a perspective view illustrating a state in which the lid body is turned around a first turning shaft with respect to the player main body.
Figure 29:
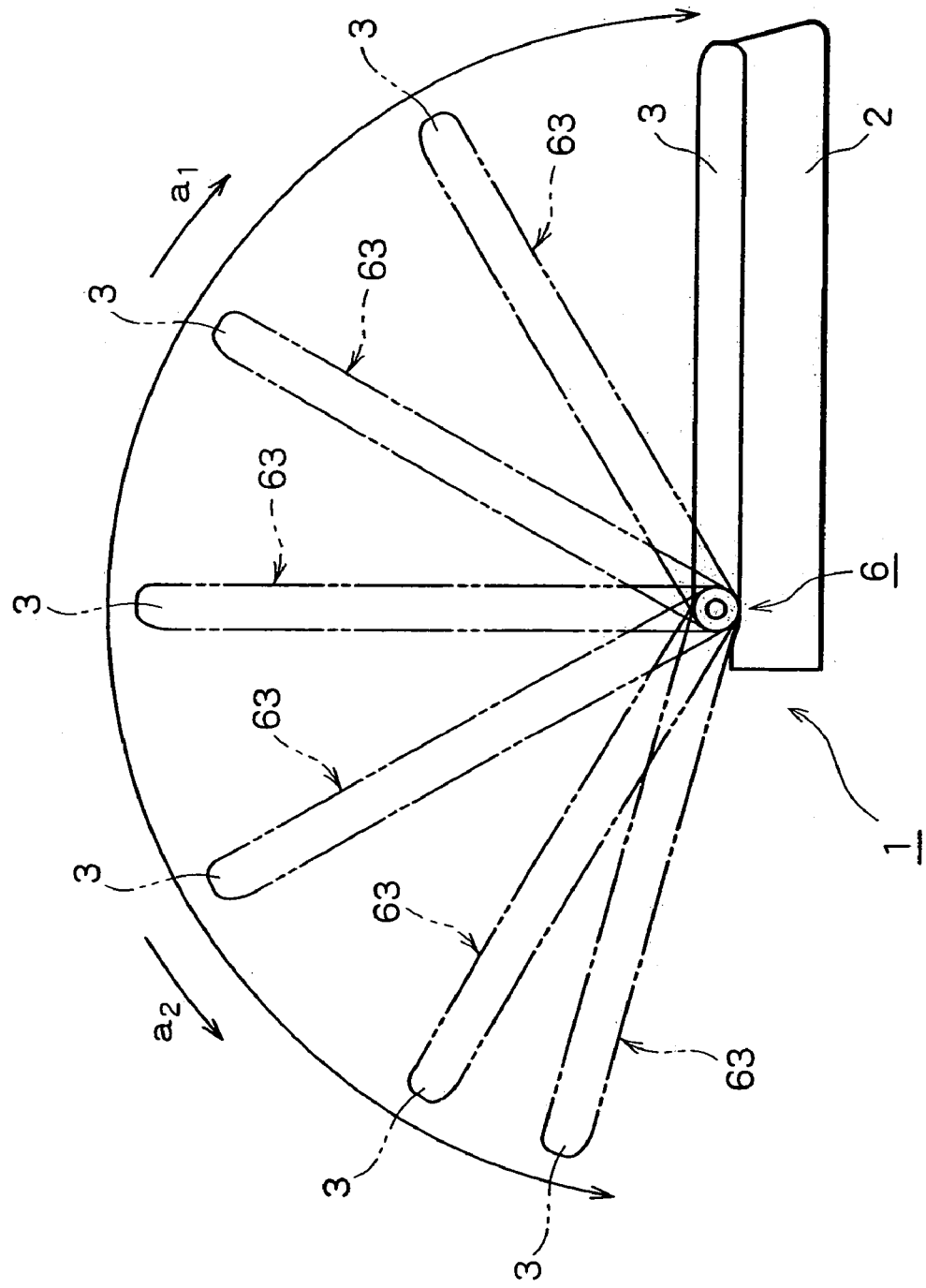
FIG. 29 is a side view illustrating a state in which the lid body is turned around a first turning shaft with respect to the player main body.

Referring to FIGS. 28 and 29, by opening and closing the lid body 3 in the direction $a_2$ and in the direction $a_1$ with respect to the player main body 2, the lid body 3 is turned around the first turning shaft 81 of the lid body turnably supporting mechanism 6. As a result, the display screen of the display portion 63 of the lid body 3 can be opened by about 180° with respect to the principal surface of the player main body 2. Also the lid body 3 can be closed in the first closed state that the lid body 3 is closed with respect to the player main body 2 with the display portion 63 of the lid body 3 facing to the principal surface of the player main body 2. In the first closed state, the display portion 63 of the lid body 3 is covered and protected by the player main body 2.

In the case of using the disc player 1 in a state that the disc player 1 is placed on a desk or the like, as shown in FIG. 28, the display portion 63 of the lid body 3 can be directed outwardly by opening the lid body 3 with respect to the player main body 2 in the direction $a_2$ with the first turning shaft 81 taken as the turning center. The display portion 63 thus directed outwardly is viewable by a user.

Figure 30:
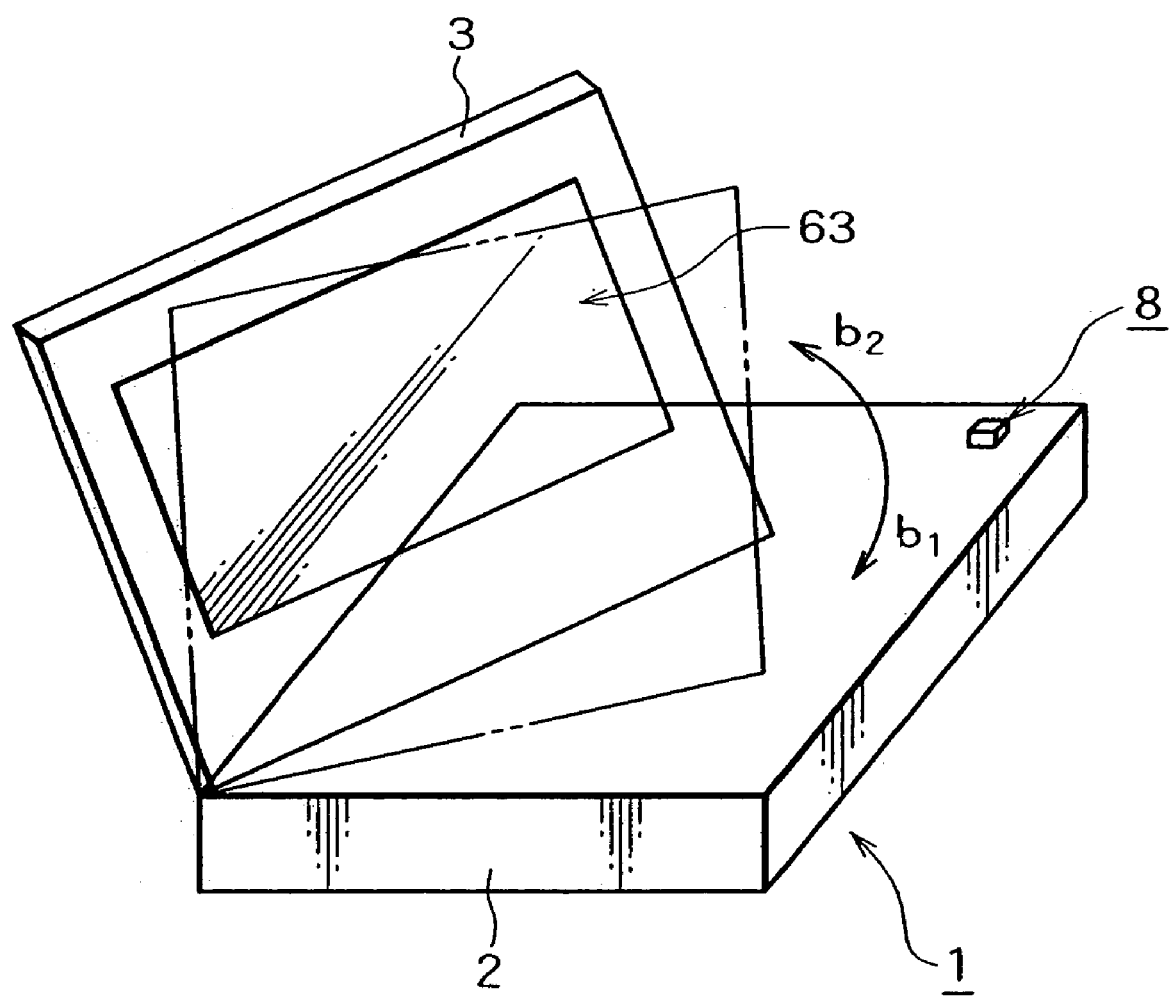
FIG. 30 is a perspective view illustrating a state in which the lid body is turned around a second turning shaft with respect to the player main body.
Figure 31:
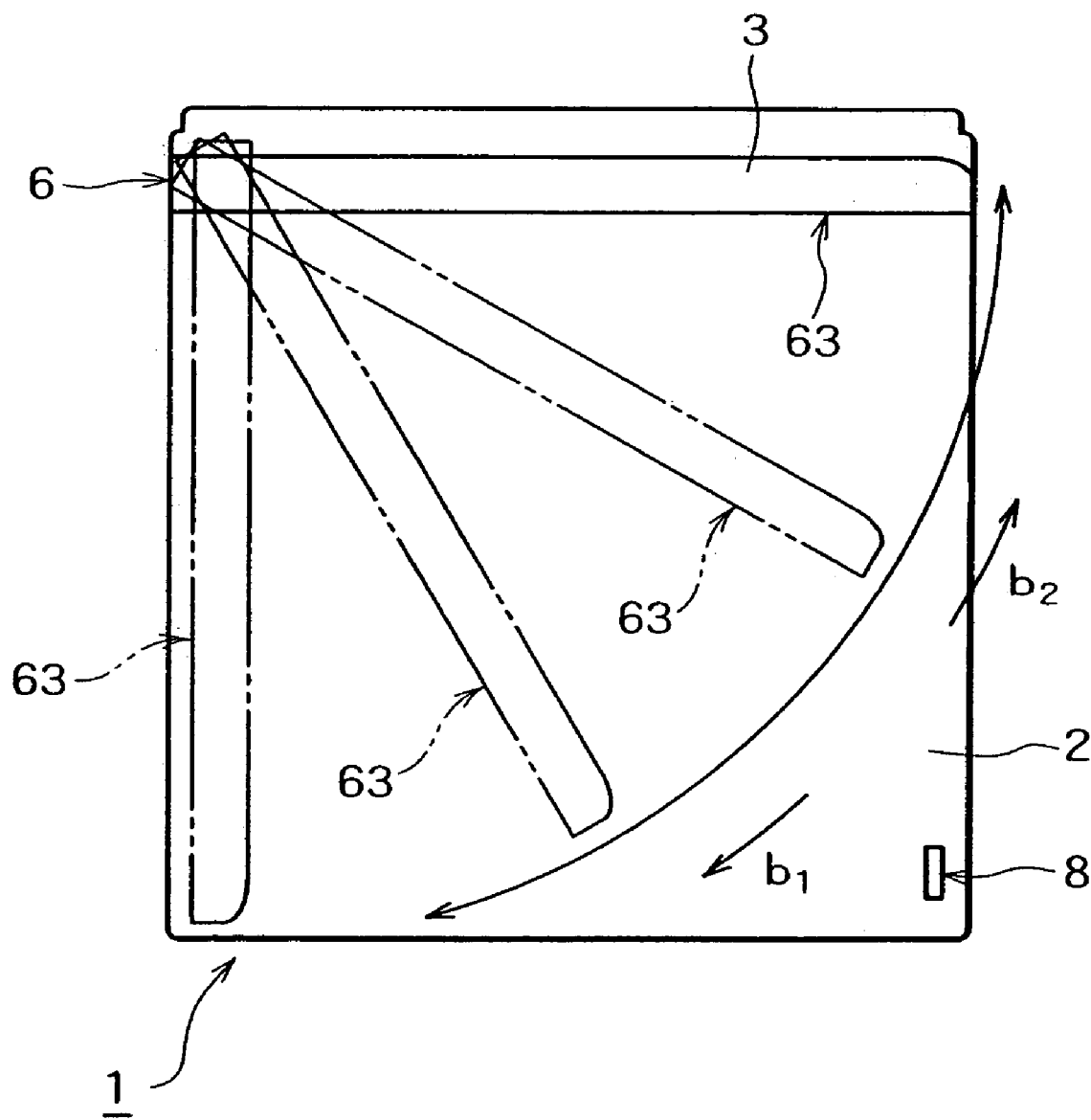
FIG. 31 is a plan view illustrating a state in which the lid body is turned around a second turning shaft with respect to the player main body.

Referring to FIGS. 30 and 31, the lid body 3 in the state being opened with respect to the player main body 2 can be further turned with respect to the player main body 2 in the direction $b_1$ and the direction $b_2$ with the second turning shaft 82 taken as the turning center. With this turning of the lid body 3 around the second turning shaft 82, the orientation of the display portion 63 of the lid body 3 can be freely changed as needed, for example, from 0° to 90°, that is, from an orientation in which the axial line of the first turning shaft 81 is parallel to the rear surface of the player main body 2 to an orientation in which the axial line of the first turning shaft 81 is parallel to a side surface of the player main body 2.

According to the disc player 1, the lid body 3 is turned around the second turning shaft 82 to an arbitrary position with respect to the player main body 2, and at the arbitrary turning position, the lid body 3 can be further turned around the first turning shaft 81 with respect to the player main body 2. Accordingly, as shown in FIGS. 32 and 33, the orientation of the display screen of the display portion 63 of the lid body 3 can be freely changed by turning the lid body 3 around the second turning shaft 82 to a position at which the axial line of the first turning shaft 81 is parallel to a side surface of the player main body 2, and turning the lid body 3 around the first turning shaft 81 in such a manner that the display portion 63 of the lid body 3 is turned by an angle in a range of 180° or less with respect to the principal plane of the player main body 2.

According to the disc player 1, the display portion 63 of the lid body 3 can be placed outside the player main body 2 by closing the lid body 3 with respect to the player main body 2 in the first closed state, and turning the lid body 3 in the direction $b_1$ with respect to the player main body 2 with the second turning shaft 82 taken as the turning center.

Figure 32:
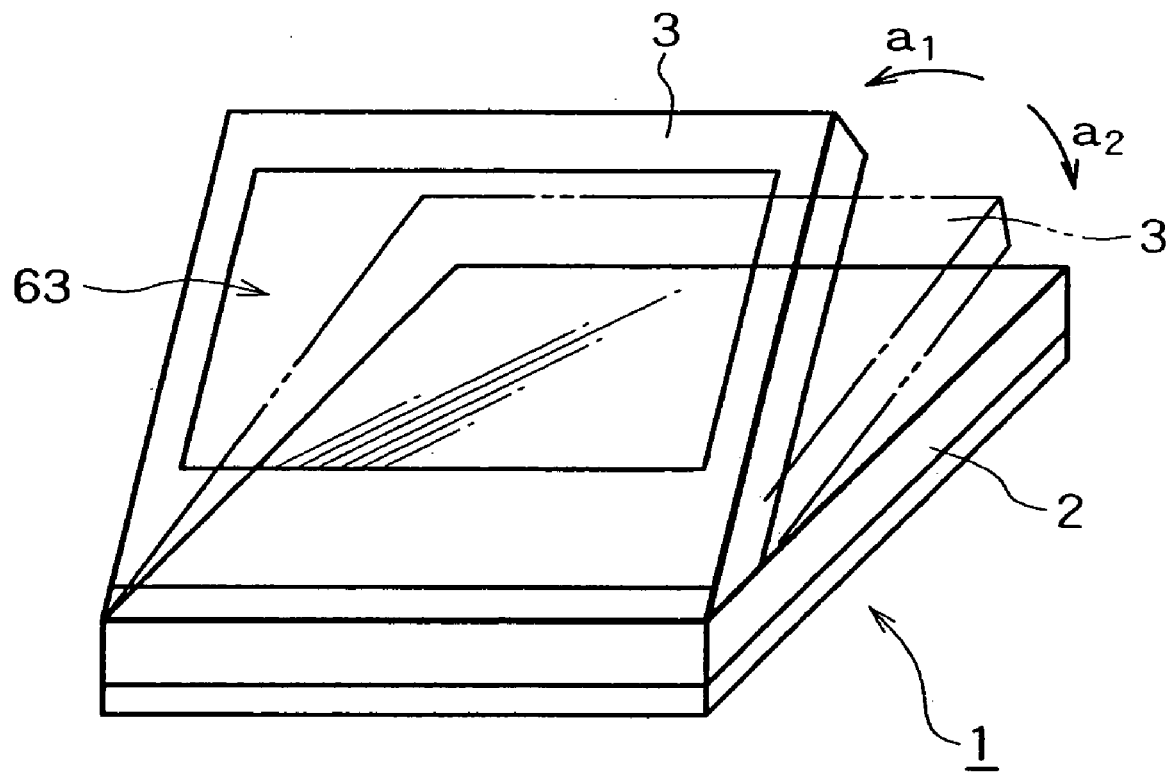
FIG. 32 is a perspective view illustrating a state in which the lid body is turned around the second turning shaft with respect to the player main body and then turned around the first turning shaft with respect to the player main body.
Figure 33:
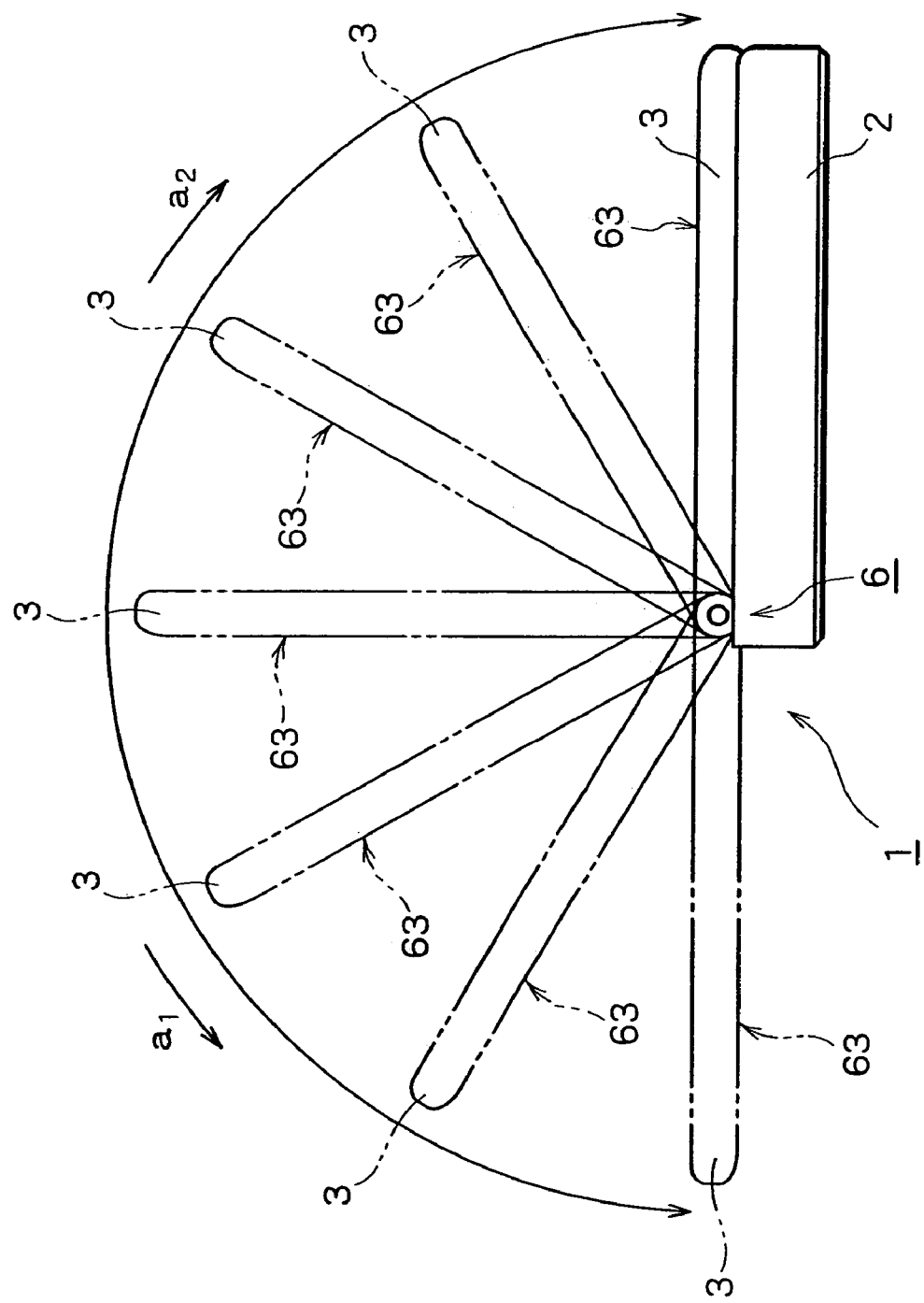
FIG. 33 is a side view illustrating a state in which the lid body is turned around the second turning shaft with respect to the player main body and then turned around the first turning shaft with respect to the player main body.
Figure 34:
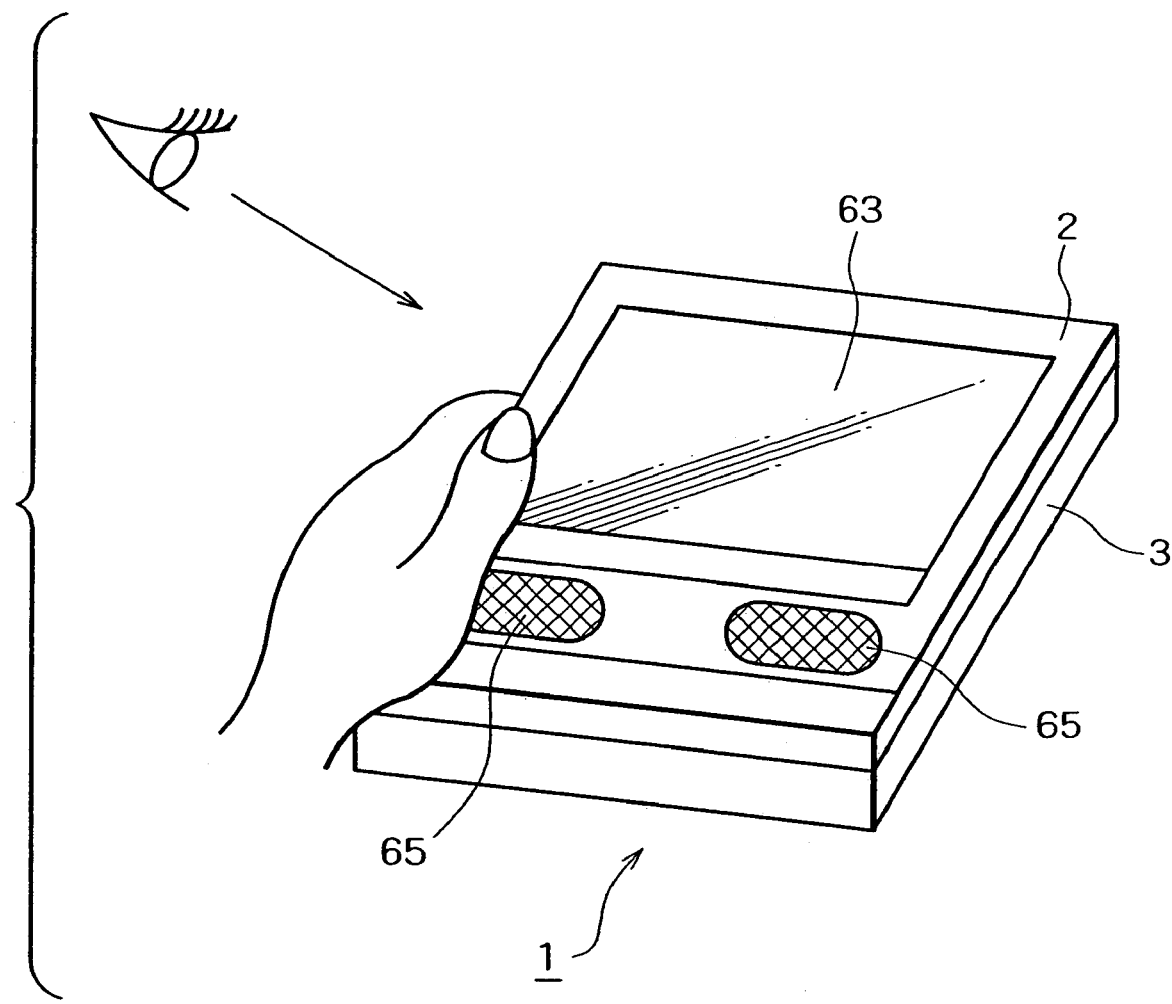
FIG. 34 is a perspective view illustrating a second closed state in which the lid body is closed with the player main body.

According to the disc player 1, in the case where the disc player 1 is used in a state that it is held by a hand or a sufficient space around a user cannot be ensured, as shown in FIGS. 32 and 34, the lid body 3 can be turned into the second closed state, in which the lid body 3 is closed with respect to the player main body 2 with the display portion 63 of the lid body 3 directed outwardly from the player main body 2, by turning the lid body 3, already opened with respect to the player main body 2, by 90° in the direction $b_1$ and closing the back surface of the lid body 3 with respect to the principal plane of the player main body 2 in the direction $a_2$. As shown in FIG. 34, in such a second closed state, the display portion 63 directed outwardly from the player main body 2 is viewable, and since the entire disc player 1 is folded into a shape of a small volume, it can be easily handled.

As described above, according to the disc player 1, since the second turning shaft 82 of the lid body turnably supporting mechanism 6 is located at a corner on the rear surface side of the player main body 2, it is possible to reduce the thickness and size of the lid body 3 and hence to thin and miniaturize the entire disc player 1.

According to the disc player 1, since the lid body 3 is turnable with respect to the player main body 2 in the directions $a_1$ and $a_2$ and the directions $b_1$ and $b_2$, the lid body 3 can be turned into the second closed state that the lid body 3 is closed with respect to the player main body 2 with the display portion 63 of the lid body 3 directed outwardly. As a result, in various environments in which the disc player 1 is used, for example, even in an environment in which a sufficient space around a user cannot be ensured; the disc player 1 can be easily, desirably used.

According to the disc player 1, since the lid body opening/closing detecting mechanism 7 is disposed at an end portion of the first turning shaft 81, it is possible to thin the lid body 3 and to improve the reliability in operation of a turning position of the lid body 3. Also, according to the disc player 1, since the lid body opening/closing detecting mechanism 7 is disposed in the lid body 3 unlike the related art lid body opening/closing detecting mechanism in which the detecting projection projects outwardly from the player main body side or the lid body side, it is possible to desirably ensure the appearance of the entire disc player.

According to the disc player 1, since the lid body opening/closing detecting mechanism 7 is configured to detect a turning position of the lid body 3 opened/closed with respect to the player main body 2, it is possible to light up the display portion 63 when the lid body 3 is opened with respect to the player main body 2 and to light out the display portion 63 when the lid body 3 is closed with respect to the player main body 2.

According to the disc player 1, since the locking mechanisms 8 is configured such that the engagement member 153 of the player main body 2 is engaged in the first engagement recess 151 or the second engagement recess 152 in the first or second closed state that the lid body 3 is closed with respect to the player main body 2, even if an impact or the like is applied to the lid body 3 in the first or second closed state, the external force is not directly applied to the locking member 150, so that it is possible to certainly hold the first or second closed state and to certainly prevent occurrence of breakage of the locking claw 161 or the like of the locking member 150.

According to the disc player 1, since the locking mechanism 8 includes the operating member 154 which moves the locking member 150 when being depressed by the closed lid body 3, it is possible to engage the locking member 150 with the lid body 3 along with the closing operation of the lid body 3, and to easily open the lid body 3 while slightly floating it along with the opening operation of the lid body 3.

In the above-described disc player 1, the principal surface of each of the player main body 2 and the lid body 3 is formed into an approximately square shape; however, each of the player main body 2 and the lid body 3 may be formed into a shape different from an approximately square shape. Another disc player having a lid body turnably supporting mechanism 6, in which each of a player main body and a lid body is formed into a different shape, will be described with reference to the drawings.

Figure 35:
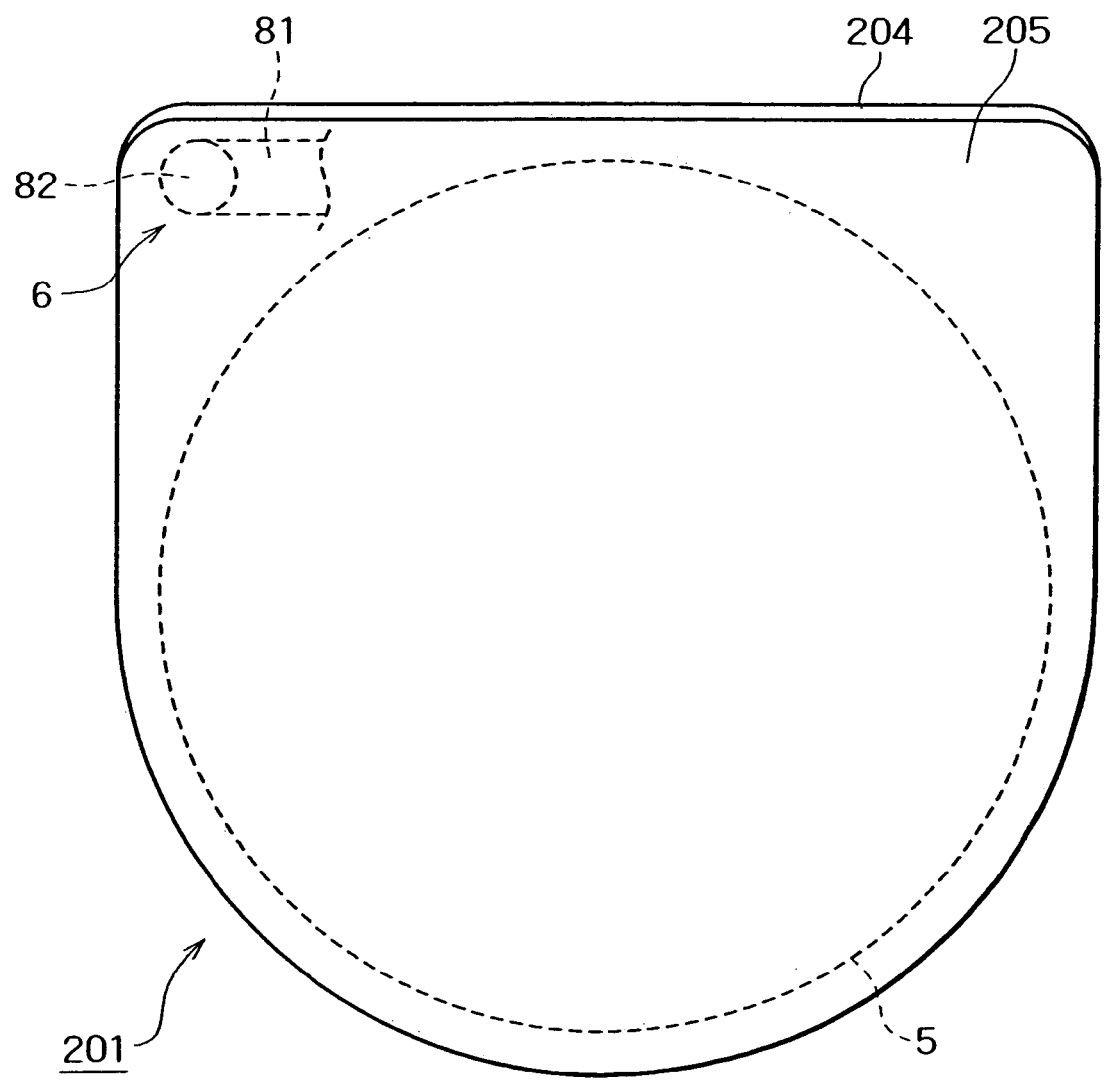
FIG. 35 is a plan view illustrating another player main body.

Referring to FIG. 35, there is shown a disc player 201 including a player main body 204 for reproducing information from an optical disc 5, and a lid body 205 supported by the player main body 204 via a lid body turnably supporting mechanism 6 in such a manner as to be openable/closable in a direction $a_2$ and a direction $a_1$ and to be turnable in a direction $b_1$ and a direction $b_2$.

As shown in FIG. 35, a principal surface of the player main body 204 is formed by cutting part of an approximately square shape. Concretely, a front side, opposed to a rear surface side provided with the lid body turnably supporting mechanism 6, of the approximately square shaped principal surface of the player main body 2 is cut into a circular-arc shape along an outer periphery of the optical disc 5. Similarly, a front side of an approximately square shaped principal surface of the lid body 205 is cut into a circular-arc shape along the outer periphery of the optical disc 5.

As described above, according to the disc player 201, since a second turning shaft 82 of the lid body turnably supporting mechanism 6 is disposed at a corner on the rear surface side of the player main body 204, the second turning shaft 82 is not overlapped to a space used for rotating the optical disc 5, with a result that it is possible to further miniaturize the entire disc player 201.

In the above-described disc player 1, the lid body turnably supporting mechanism 6 is located at a corner on the rear surface side of the player main body 2; however, the lid body turnably supporting mechanism 6 may be located at an approximately central portion on the rear surface side of the player main body 2. A further disc player in which a lid body turnably supporting mechanism for turnably supporting a lid body is located at an approximately central portion on the rear surface side of a player main body will be briefly described below. The further disc player has a basic configuration substantially the same as that of the disc player 1 except for the lid body turnably supporting mechanism, and therefore, parts corresponding to those in the disc player 1 are designated by the same reference numerals, and the overlapped explanation is omitted.

Figure 36:
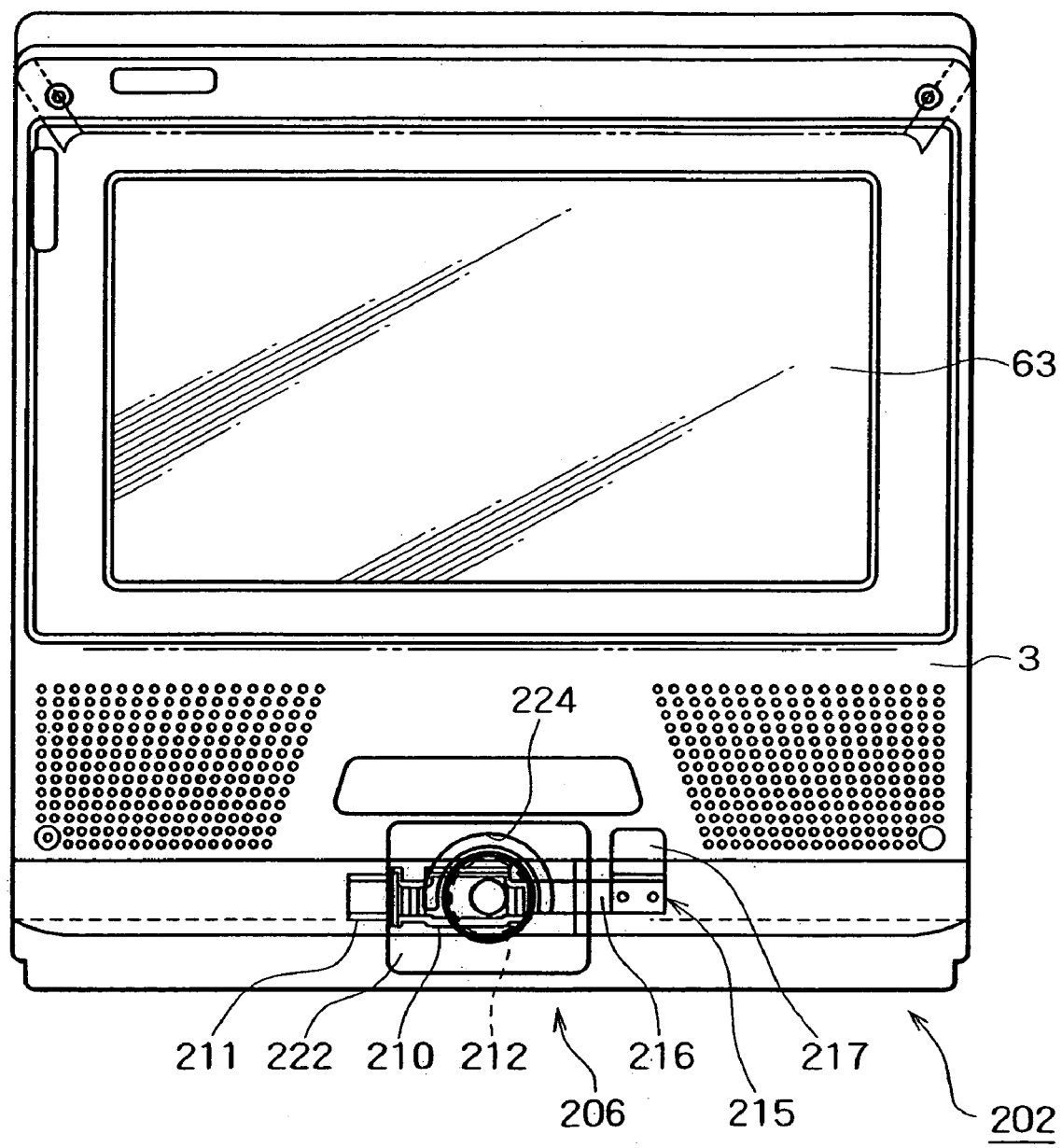
FIG. 36 is a front view illustrating another lid body turnably supporting mechanism.

Referring to FIG. 36, there is shown a further disc player 202 including a lid body turnably supporting mechanism 206 for supporting a lid body 3 in such a manner that the lid body 3 is openable/closable with respect to a player main body 2 in a direction $a_2$ and a direction $a_1$, and supporting the lid body 3 in such a manner that the lid body 3 is turnable with respect to the player main body 2 in a direction $b_1$ and a direction $b_2$.

Figure 37:
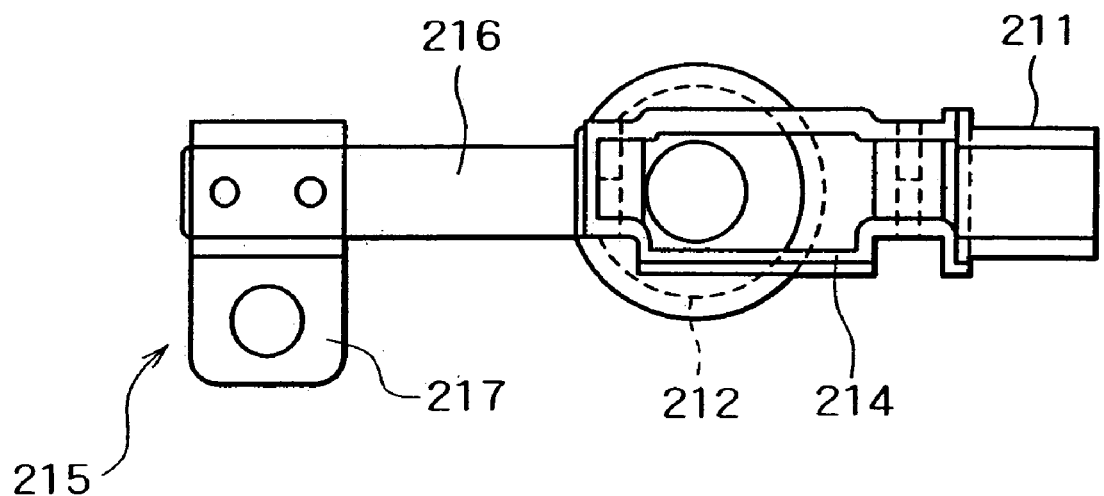
FIG. 37 is a horizontal sectional view showing another supporting shaft member and another hinge member of another lid body turnably supporting mechanism shown in FIG. 36.
Figure 38:
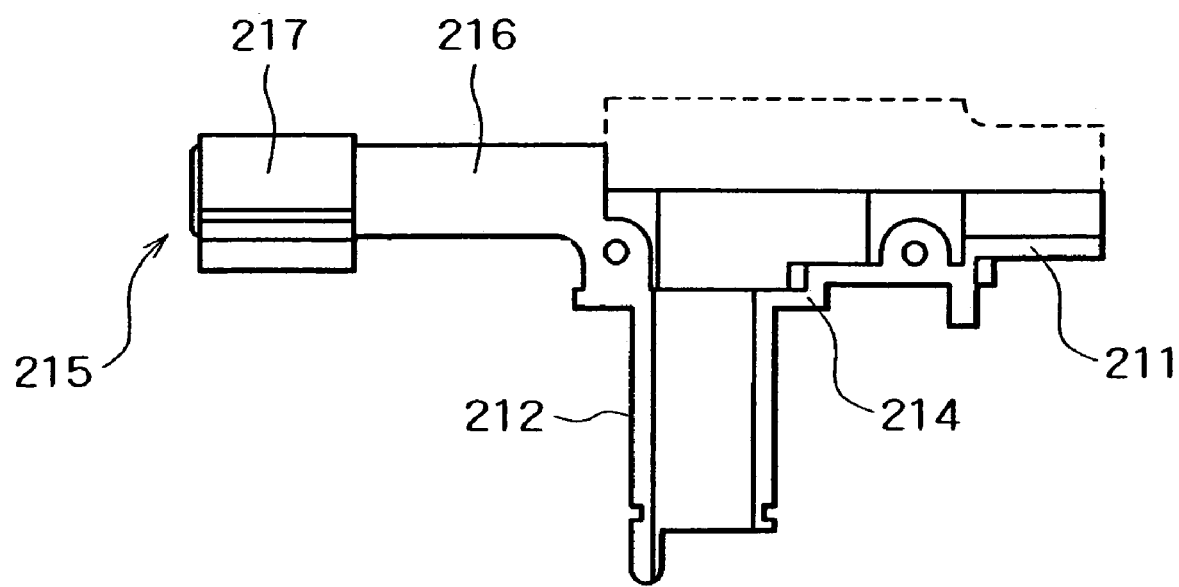
FIG. 38 is a vertical sectional view showing another supporting shaft member and another hinge member shown in FIG. 37.

Referring to FIG. 36, the lid body turnably supporting mechanism 206 includes a supporting shaft member 210 having a first turning shaft 211 for openably/closably supporting the lid body 3 in the direction $a_2$ and the direction $a_1$ and a second turning shaft 212 for turnably supporting the lid body 3 in the direction $b_1$ and the direction $b_2$. Referring to FIGS. 37 and 38, the first turning shaft 211 of the supporting shaft member 210 includes a set of upper divided body (not shown) and a lower divided body 214 which are divided from the first turning shaft 211 along a division plane parallel to an axial direction of the first turning shaft 211.

Referring to FIG. 36, the first turning shaft 211 of the supporting shaft member 210 is located at a central portion in the width direction of the lid body 3, which corresponds to an approximately central portion in the width direction on the rear surface side of the player main body 2, with the axial direction of the first turning shaft 211 extending in the direction parallel to a principal surface of the player main body 2. The second turning shaft 212 of the supporting shaft member 210 is located at an approximately central portion in the width direction on the rear surface side of the player main body 2, with the axial direction of the second turning shaft 212 extending in the direction perpendicular to the principal surface of the player main body 2.

Referring to FIGS. 37 and 38, a hinge member 215 for giving a turning resistance to the first turning shaft 211 turned around its axis is provided on the lower divided body 214 of the supporting shaft member 210 at one end of the first turning shaft 211. The hinge member 215 has a supporting shaft 216 formed at one end of the first turning shaft 211 with its axial direction extending along the axial direction of the first turning shaft 211, and a bearing member 217 for turnably supporting the supporting shaft 216 and giving a specific turning resistance to the supporting shaft 216 turned around its axis. Since the supporting shaft 216 turned along with turning of the first turning shaft 211 around its axis receives a turning resistance by the bearing member 217, the supporting shaft member 210 can hold the lid body 3 at an arbitrary turning position around the first turning shaft 211.

Referring to FIG. 38, a position restricting pin for restricting a turning position of the second turning shaft 212 turned around its axis is provided integrally with the lower divided body 214 of the supporting shaft member 210 at a position separated from a turning center of the second turning shaft 212.

Referring to FIG. 36, a mounting plate 222 for turnably supporting the second turning shaft 212 of the supporting shaft member 210 is mounted on the player main body 2. A bearing portion (not shown) for turnably supporting the second turning shaft 212 of the supporting shaft member 210 is formed integrally with a principal surface of the mounting plate 222, which principal surface is substantially parallel to the principal surface of the player main body 2. A circular-arc guide slit 224 in which the position restricting pin provided on the supporting shaft member 210 is to be movably engaged is provided in the principal surface of the mounting plate 222 at a position separated from the bearing portion. The guide slit 224 extends around the second turning shaft 212 along a concentric circle centered at the turning center of the second turning shaft 212.

While not shown, the disc player 202 includes a lid body opening/closing detecting mechanism for detecting an opening/closing state of the lid body with respect to the player main body and a locking mechanism for holding a first or second closed state in which the lid body is closed with respect to the player main body. Both the mechanisms are located at positions opposed to an end portion of the supporting shaft 216.

With respect to the disc player 202 configured as described above, a motion for opening/closing the lid body 3 with respect to the player main body 2 in a direction $a_2$ and a direction $a_1$ and a motion for turning the lid body 3 with respect to the player main body 2 in a direction $b_1$ and a direction $b_2$ will be described with reference to the drawings.

Figure 39:
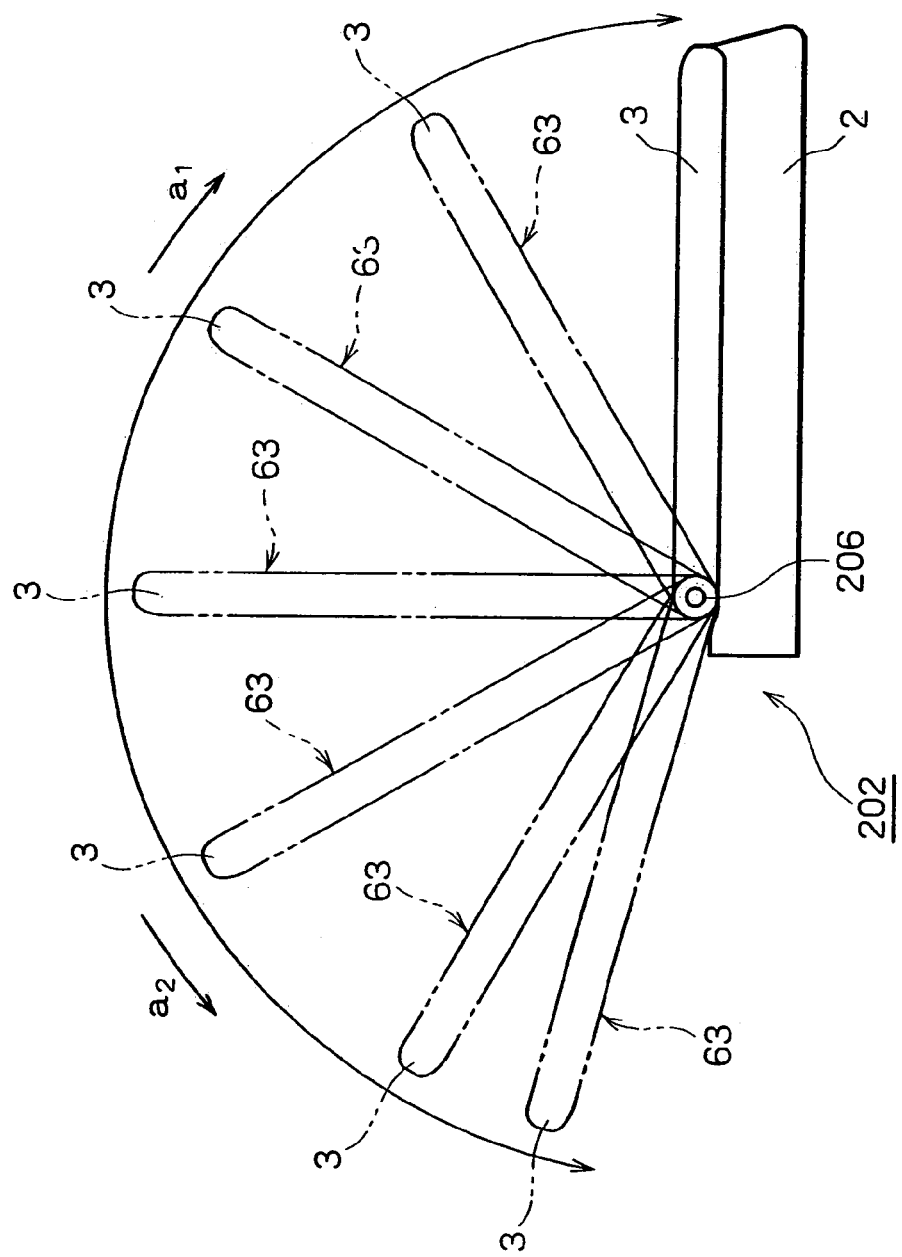
FIG. 39 is a side view illustrating a state in which the lid body is turned around a first turning shaft of another lid body turnably supporting mechanism shown in FIG. 36 with respect to the player main body.

Referring to FIG. 39, by opening and closing the lid body 3 in the direction $a_2$ and in the direction $a_1$ with respect to the player main body 2, the lid body 3 is turned around the first turning shaft 211 of the lid body turnably supporting mechanism 206. As a result, the display screen the display portion 63 of the lid body 3 can be opened by about 180° with respect to the principal surface of the player main body 2. Also the lid body 3 can be closed in the first closed state that the lid body 3 is closed with respect to the player main body 2 with the display portion 63 of the lid body 3 facing to the principal surface of the player main body 2. In the first closed state, the display portion 63 of the lid body 3 is covered and protected by the player main body 2.

In the case of using the disc player 202 in a state that the disc player 202 is placed on a desk or the like, as shown in FIG. 39, the display portion 63 of the lid body 3 can be directed outwardly by opening the lid body 3 with respect to the player main body 2 in the direction $a_2$ with the first turning shaft 211 taken as the turning center. The display portion 63 thus directed outwardly is viewable by a user.

Figure 40:
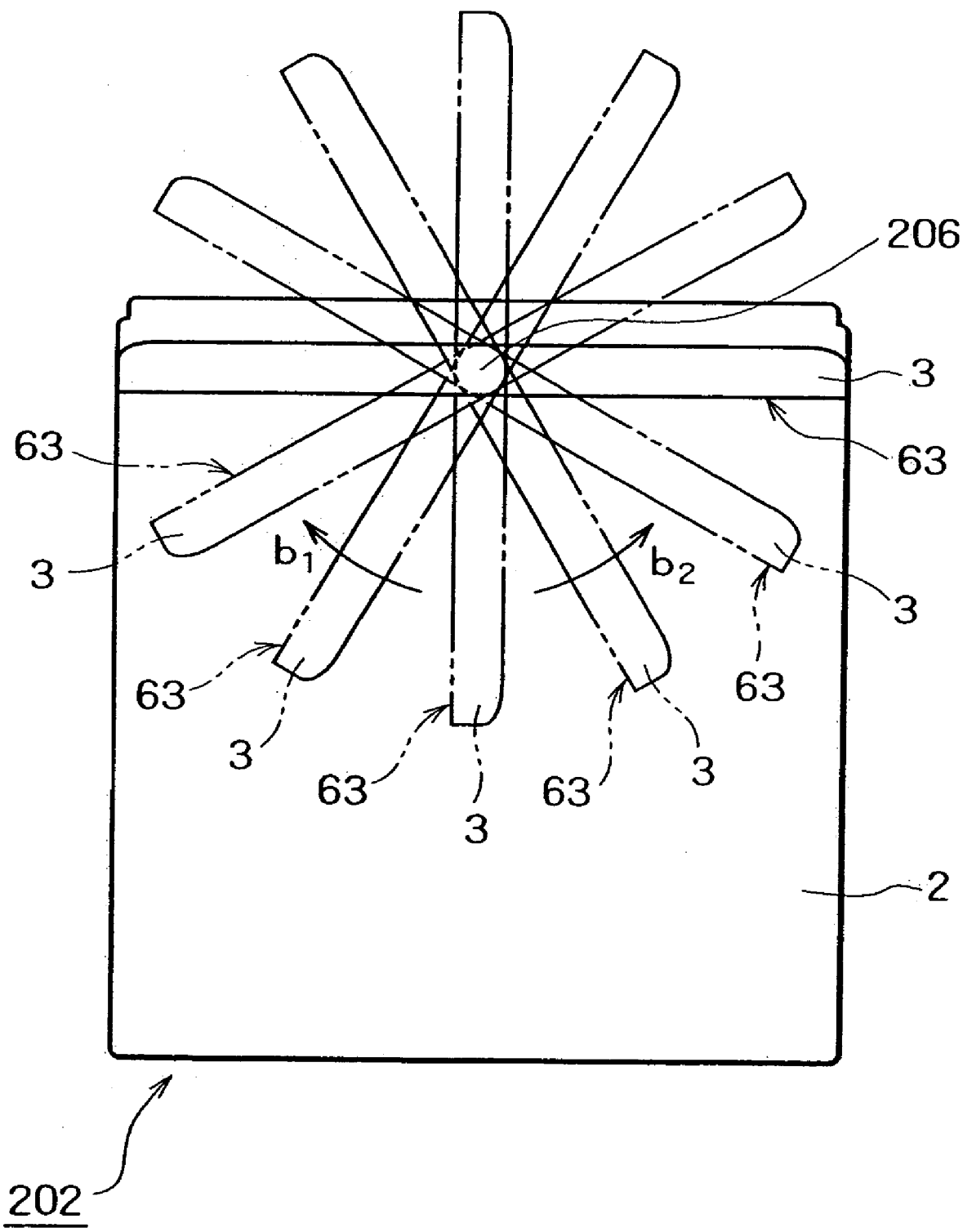
FIG. 40 is a plan view illustrating a state in which the lid body is turned around a second turning shaft of another lid body turnably supporting mechanism shown in FIG. 36 with respect to the player main body.

Referring to FIG. 40, the lid body 3 in the state being opened by 90° in the direction $a_2$ with respect to the player main body 2 can be further turned with respect to the player main body 2 in the direction $b_1$ and the direction $b_2$ with the second turning shaft 212 taken as the turning center. With this turning of the lid body 3. around the second turning shaft 212, the orientation of, the display portion 63 of the lid body 3 can be freely changed as needed, for example, from 0° to 180°, that is, from an orientation in which the display screen of the display portion 63 is directed to a front surface side of the player main body 2 and an orientation in which the display screen of the display portion 63 is directed to a rear surface side of the player main body 2.

According to the disc player 202, as shown in FIG. 41, the lid body 3 is opened by 90° in the direction $a_2$ with respect to the player main body 2. At this time, the display screen of the display portion 63 is directed in the direction parallel to a rear surface of the player main body 2. From such a state, the lid body 3 can be turned by 90° around the second turning shaft 82 with respect to the player main body 2, and further turned around the first turning shaft 211 with respect to the player main body 2. Accordingly, the display screen of the display portion 63 can be folded in a state being parallel to the principal surface of the player main body 2. That is to say, the display screen of the display portion 63 can be brought into contact with the principal surface of the player main body 2 or can be directed outwardly.

According to the disc player 202, in the case where the disc player 202 is used in a state that it is held by a hand or a sufficient space around a user cannot be ensured, as shown in FIGS. 39 and 40, the lid body 3 can be closed in a second closed state by turning the lid body 3 by 90 around the first turning shaft 211 in such a manner that the display screen of the display portion 63 is perpendicular to the principal surface of the player main body 2, turning the lid body 3 by 180° in such a manner that the display screen of the display portion 63 is directed to the rear surface side of the player main body 2, and closing the lid body 3 in such a manner that the back surface of the display portion 63 of the lid body 3 is brought into contact with the principal surface of the player main body 2. In such a second closed state, the display portion 63 directed outwardly from the player main body 2 is viewable by a user, and since the entire disc player 202 is folded into a shape of a small volume, it can be easily handled.

According to the disc player 202 configured as described above, since the lid body turnably supporting mechanism 206 is provided, the lid body 3 can be closed with respect to the player main body 2 with the display portion 63 of the lid body 3 directed outwardly from the player main body 2. That is to say, according to the disc player 202, like the disc player 1, since the display portion 63 of the lid body 3 folded on the player main body 2 can be directed outwardly, the disc player 202 can be easily, desirably used in various environments in which the disc player 202 is used, for example, even in an environment in which a sufficient space around a user cannot be ensured.

The disc player described in the above-described embodiments includes the reproducing mechanism for reproducing information from a DVD representative of the optical disc 5; however, the present invention is not limited thereto. For example, another optical disc such as a CD (Compact Disc)-ROM (Read-Only Memory) or DVD-ROM may be used as the optical disc 5. Further, the disc player of the present invention may include a magnetic head for applying a magnetic field at a position facing to an optical pickup of a reproducing mechanism, wherein information is recorded or reproduced on or from another recording medium such as a magneto-optical disc or a magnetic disc.

While the preferred embodiments of the present invention have been described using specific terms, such description is for illustrative purposes only, and it is to be understood that changes and variations may be made without departing from the spirit or scope of the following claims.

What is claimed is:

1. An electronic apparatus comprising:
    an apparatus main body;
    a lid body provided in such a manner as to be turnable with respect to said apparatus main body, said lid body having a display portion for displaying information; and
    a lid body turnably supporting mechanism having a first turning shaft with its axial direction extending in parallel to a principal surface of said apparatus main body, and a second turning shaft provided at one end of said first turning shaft in such a manner as to be perpendicular to the first turning shaft;
    wherein said second turning shaft of said lid body supporting mechanism is located at one of said corners of said apparatus main body or said lid body; and
    said first turning shaft is relatively turnable around a turning center of said second turning shaft.

2. The electronic apparatus of claim 1 wherein said lid body turnably supporting mechanism has an elastic member for providing a turning resistance to said second turning shaft turned around its axis.

3. The electronic apparatus of claim 1 wherein said second turning shaft of said lid body turnably supporting mechanism is located at one of the corners of said apparatus main body or said lid body.

4. The electronic apparatus of claim 1 and further comprising:
    a connection wire for electrically connecting said apparatus main body to said display portion;
    wherein a hollow portion, in which said connection wire is inserted, is formed in said first and second turning shafts of said supporting shaft member; and
    wherein said supporting shaft member has a pair of divided members obtained by dividing said first turning shaft into two parts along a division plane extending substantially in parallel to an axial direction of said first turning shaft and assembling said divided parts to each other.

5. The electronic apparatus of claim 1 and further comprising:
    a connection wire for electrically connecting said apparatus main body to said display portion;
    wherein a hollow portion, in which said connection wire is inserted, is formed in said first and second turning shafts of said supporting shaft member; and
    wherein an opening, through which said connection wire inserted in said first turning shaft is led outwardly therefrom, is provided in a leading end portion of said first turning shaft; and
    a bearing portion is provided on said lid body, said bearing portion having a supporting shaft fixedly inserted in said leading end portion of said first turning shaft, and a bearing member for turnably supporting said supporting shaft and providing a turning resistance to said supporting shaft turned around its axis.

6. The electronic apparatus of claim 1 wherein said lid body turnably supporting mechanism has an elastic member for providing a turning resistance to said second turning shaft about its axis.

* * * * *